(12) United States Patent
Bryant et al.

(10) Patent No.: US 8,760,464 B2
(45) Date of Patent: Jun. 24, 2014

(54) SHAPE MASKS

(75) Inventors: Andrew Bryant, Los Gatos, CA (US); Daniel Pettigrew, Pacific Palisades, CA (US); Olivier Fedkiw, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 346 days.

(21) Appl. No.: 13/134,313

(22) Filed: Jun. 3, 2011

(65) Prior Publication Data

US 2012/0206479 A1 Aug. 16, 2012

Related U.S. Application Data

(60) Provisional application No. 61/443,708, filed on Feb. 16, 2011, provisional application No. 61/443,718, filed on Feb. 16, 2011, provisional application No. 61/443,730, filed on Feb. 17, 2011.

(51) Int. Cl.

| | |
|---|---|
| *G09G 5/00* | (2006.01) |
| *G09G 5/02* | (2006.01) |
| *H04N 5/445* | (2011.01) |
| *H04N 5/44* | (2011.01) |
| *H04N 9/64* | (2006.01) |
| *H04N 9/74* | (2006.01) |
| *H04N 9/67* | (2006.01) |
| *H04N 1/40* | (2006.01) |
| *H04N 1/387* | (2006.01) |
| *H04N 1/46* | (2006.01) |
| *G03F 3/08* | (2006.01) |
| *G06K 9/40* | (2006.01) |
| *G06K 9/00* | (2006.01) |
| *G06K 9/36* | (2006.01) |
| *G06K 9/32* | (2006.01) |

(52) U.S. Cl.
USPC ........... 345/594; 345/581; 345/589; 345/619; 345/653; 345/660; 348/560; 348/563; 348/581; 348/577; 348/661; 358/517; 358/518; 358/537; 358/538; 358/453; 382/167; 382/274; 382/276; 382/283; 382/298; 715/700; 715/722

(58) Field of Classification Search
USPC ......... 345/418–419, 581, 589–594, 597–600, 345/618–619, 649–650, 653, 657, 660–661, 345/442, 472, 156; 348/252–254, 552–553, 348/557, 560–564, 569, 576–577, 578, 348/580–583, 599, 601, 630, 650, 661; 358/515, 517, 518–520, 525, 537, 538, 358/448, 452–453; 382/162, 167, 254, 266, 382/274, 276, 282–283, 293, 295, 296, 382/298–300; 715/700, 716, 719, 722–723, 715/726, 815, 851, 856
See application file for complete search history.

(56) References Cited

U.S. PATENT DOCUMENTS

| 5,051,928 A | 9/1991 | Gruters |
|---|---|---|
| 5,130,789 A | 7/1992 | Dobbs et al. |

(Continued)

FOREIGN PATENT DOCUMENTS

EP 1326425 7/2003

(Continued)

OTHER PUBLICATIONS

Portions of prosecution history of EP09767263.8, Jun. 1, 2012 (mailing date), Apple Inc.

(Continued)

*Primary Examiner* — Wesner Sajous
(74) *Attorney, Agent, or Firm* — Adeli LLP

(57) ABSTRACT

Some embodiments provide a program that provides a graphical user interface (GUI). The GUI includes a display area for displaying an image that includes several pixels. The GUI includes a selectable masking tool for displaying in the display area an adjustable closed curve to identify a region in the image to apply a color correction operation. The selectable masking tool includes a selectable control for modifying the adjustable closed curve through a range of elliptical shapes that ranges from a pure ellipse to an approximate rectangle. The GUI includes a selectable GUI item for applying the color correction operation based on the selectable masking tool.

36 Claims, 47 Drawing Sheets
(23 of 47 Drawing Sheet(s) Filed in Color)

(56) References Cited

U.S. PATENT DOCUMENTS

| | | | |
|---|---|---|---|
| 5,487,020 | A | 1/1996 | Long |
| 5,715,325 | A | 2/1998 | Bang et al. |
| 5,751,845 | A | 5/1998 | Dorff et al. |
| 6,201,581 | B1 | 3/2001 | Moriwake et al. |
| 6,351,557 | B1 | 2/2002 | Gonsalves |
| 6,362,829 | B1 | 3/2002 | Omvik et al. |
| 6,456,328 | B1 | 9/2002 | Okada |
| 6,469,747 | B1* | 10/2002 | Rai et al. ............... 348/584 |
| 6,477,271 | B1 | 11/2002 | Cooper et al. |
| 6,496,599 | B1 | 12/2002 | Pettigrew |
| 6,683,982 | B1 | 1/2004 | Kohn |
| 6,731,800 | B1 | 5/2004 | Barthel et al. |
| 6,741,755 | B1 | 5/2004 | Blake et al. |
| 6,751,347 | B2 | 6/2004 | Pettigrew et al. |
| 6,757,425 | B2 | 6/2004 | Pettigrew et al. |
| 6,763,134 | B2 | 7/2004 | Cooper et al. |
| 6,870,945 | B2 | 3/2005 | Schoepflin et al. |
| 7,123,269 | B1 | 10/2006 | Bourdev et al. |
| 7,280,117 | B2 | 10/2007 | Fayan |
| 7,403,568 | B2 | 7/2008 | Dumitras et al. |
| 7,430,335 | B2 | 9/2008 | Dumitras et al. |
| 7,430,339 | B2 | 9/2008 | Rother et al. |
| 7,598,964 | B2 | 10/2009 | Olson |
| 7,602,991 | B2 | 10/2009 | Kokemohr |
| 7,623,138 | B2 | 11/2009 | Fukao et al. |
| 7,672,022 | B1 | 3/2010 | Fan |
| 7,693,341 | B2 | 4/2010 | Pettigrew et al. |
| 7,702,149 | B2 | 4/2010 | Ohkubo et al. |
| 7,809,207 | B2 | 10/2010 | Dumitras et al. |
| 7,827,491 | B2 | 11/2010 | Tran |
| 7,853,094 | B2 | 12/2010 | Pan et al. |
| 7,940,995 | B2 | 5/2011 | Lee et al. |
| 7,954,067 | B2 | 5/2011 | Breglio |
| 7,978,938 | B1 | 7/2011 | Wilensky |
| 8,009,177 | B2 | 8/2011 | Kawano et al. |
| 8,081,821 | B1 | 12/2011 | Schaem |
| 8,098,259 | B2 | 1/2012 | Kondo et al. |
| 8,208,565 | B2 | 6/2012 | Dumitras et al. |
| 8,280,171 | B2 | 10/2012 | Pettigrew et al. |
| 8,331,685 | B2 | 12/2012 | Pettigrew et al. |
| 8,548,251 | B2 | 10/2013 | Pettigrew et al. |
| 2001/0028735 | A1 | 10/2001 | Pettigrew et al. |
| 2001/0036310 | A1 | 11/2001 | Pettigrew et al. |
| 2002/0041707 | A1 | 4/2002 | Newman |
| 2003/0016866 | A1 | 1/2003 | Cooper et al. |
| 2003/0103234 | A1 | 6/2003 | Takabayashi et al. |
| 2004/0167806 | A1* | 8/2004 | Eichhorn et al. ............. 705/3 |
| 2004/0227768 | A1 | 11/2004 | Bates et al. |
| 2004/0264767 | A1 | 12/2004 | Pettigrew |
| 2005/0238217 | A1 | 10/2005 | Enomoto et al. |
| 2006/0012840 | A1* | 1/2006 | Fukuda ............... 358/518 |
| 2006/0029275 | A1 | 2/2006 | Li et al. |
| 2006/0039611 | A1 | 2/2006 | Rother et al. |
| 2006/0045332 | A1 | 3/2006 | Park |
| 2006/0055708 | A1 | 3/2006 | Fayan |
| 2006/0126719 | A1 | 6/2006 | Wilensky |
| 2006/0204034 | A1 | 9/2006 | Steinberg et al. |
| 2007/0065006 | A1 | 3/2007 | Wilensky |
| 2007/0171443 | A1 | 7/2007 | Pan |
| 2007/0189627 | A1 | 8/2007 | Cohen et al. |
| 2007/0247475 | A1 | 10/2007 | Pettigrew et al. |
| 2008/0117333 | A1 | 5/2008 | Walsh |
| 2008/0131010 | A1 | 6/2008 | Wilensky |
| 2009/0169066 | A1 | 7/2009 | Yang et al. |
| 2009/0220149 | A1 | 9/2009 | Menadeva et al. |
| 2010/0054549 | A1 | 3/2010 | Steinberg et al. |
| 2010/0073401 | A1 | 3/2010 | Zaklika et al. |
| 2010/0080448 | A1 | 4/2010 | Tam et al. |
| 2010/0110101 | A1 | 5/2010 | Relyea et al. |
| 2011/0219329 | A1 | 9/2011 | Breglio |
| 2012/0020553 | A1* | 1/2012 | Pettigrew et al. ............. 382/164 |
| 2012/0051658 | A1 | 3/2012 | Tong et al. |
| 2012/0081580 | A1* | 4/2012 | Cote et al. ............... 348/231.99 |
| 2012/0206475 | A1 | 8/2012 | Bryant et al. |
| 2012/0206655 | A1 | 8/2012 | Pettigrew et al. |
| 2012/0210229 | A1 | 8/2012 | Bryant et al. |
| 2012/0210274 | A1 | 8/2012 | Pettigrew et al. |
| 2013/0067380 | A1 | 3/2013 | Pettigrew et al. |
| 2013/0215143 | A1 | 8/2013 | Pettigrew et al. |

FOREIGN PATENT DOCUMENTS

| | | |
|---|---|---|
| EP | 2458552 | 5/2012 |
| EP | 2458560 | 5/2012 |
| EP | 2286384 | 6/2012 |
| EP | 2431942 | 9/2013 |
| GB | 2312120 | 10/1997 |
| JP | 2004-228734 | 8/2004 |
| WO | WO 01/26050 | 4/2001 |
| WO | WO 2005/020584 | 3/2005 |
| WO | WO 2009/154951 | 12/2009 |
| WO | WO 2012/154258 | 11/2012 |

OTHER PUBLICATIONS

Portions of prosecution history of EP11188901.0, Mar. 13, 2013 (mailing date), Apple Inc.

Portions of prosecution history of EP12156769.7, Jul. 16, 2013 (mailing date), Apple Inc.

Portions of prosecution history of EP12156770.5, May 14, 2013 (mailing date), Apple Inc.

International Preliminary Report on Patentability for PCT/US2004/017415, Feb. 13, 2006 (issuance date), Apple Inc.

Invitation to Pay Additional Fees with Partial Search Report for PCT/US2009/045094, Nov. 25, 2009 (mailing date), Apple Inc.

Invitation to Pay Additional Fees with Partial Search Report for PCT/US2012/025525, Jun. 14, 2012 (mailing date), Apple Inc.

International Search Report and Written Opinion for PCT/US2012/025525, Nov. 2, 2012 (mailing date), Apple Inc.

International Preliminary Report on Patentability for PCT/US2012/025525, Aug. 29, 2013 (mailing date), Apple Inc.

International Search Report and Written Opinion for PCT/US2004/017415, Jan. 28, 2005 (mailing date), Apple Inc.

Invitation to Pay Additional Fees and Partial International Search Report for PCT/US2004/017415, Nov. 22, 2004 (mailing date), Apple Inc.

International Preliminary Report on Patentability for PCT/US2009/045094, Nov. 30, 2010 (issuance date), Apple Inc.

International Search Report and Written Opinion for PCT/US2009/045094, Jan. 28, 2010 (mailing date), Apple Inc.

Author Unknown, "Adobe Director 11: User Guide," Month Unknown, 2008, 498 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Author Unknown, "Using Adobe Flash CS4 Professional," Updated Mar. 5, 2009, 474 pages, Adobe Systems Incorporated, San Jose, California, USA.

Author Unknown, "Adobe Photoshop 5.0 Limited Edition, Chapter 4: Making Color and Tonal Adjustments," Jan. 1, 1998, 11 pages, Adobe Systems Incorporated, San Jose, California, USA.

Author Unknown, "Adobe Photoshop 5.0 User Guide, Chapter 7: Selecting," Month Unknown, 1998, pp. 137-164, Adobe Systems Incorporated, San Jose, California, USA.

Author Unknown, "Using Adobe Premiere Elements 8 Editor", last updated Aug. 12, 2010, 313 pages, Adobe Systems Incorporated, San Jose, California, USA.

Bai, Xue, et al., "A Geodesic Framework for Fast Interactive Image and Video Segmentation and Matting," Dec. 26, 2007, 8 pages, IEEE Xplore, USA.

Biafore, Bonnie, "VISIO 2003 Bible," Month Unknown, 2004, 19 pages, Wiley Publishing, Inc., Indianapolis, Indiana.

Dawood, Mohammad, et al., "Reliable Dual-Band Based Contour Detection: A Double Dynamic Programming Approach," ICIAR 2004, Sep. 29, 2004, pp. 544-551, Springer-Verlag, Berlin Heidelberg.

Franklin, WM. Randolph, et al., "Faster Calculation of Superquadric Shapes," IEEE Computer Graphics and Applications, Jul. 1981, pp. 41-47, IEEE Service Center, New York, NY, USA.

(56) References Cited

OTHER PUBLICATIONS

Neophytou, Neophytos, et al., "Color-Space CAD: Direct Gamut Editing in 3D," IEEE Computer Graphics and Applications, May 2008, pp. 88-98, IEEE Service Center, New York, NY, USA.

Orzan, Alexandrina, et al., "Diffusion Curves: A Vector Representation for Smooth-Shaded Images," Screenshots of Online Video, Month Unknown, 2008, 3 pages, available online at http://artis.imag.fr/Publications/2008/OBWBTS08/.

Orzan, Alexandrina, et al., "Diffusion Curves: A Vector Representation for Smooth-Shaded Images," Proceedings of SIGGRAPH '08, Month Unknown, 2008, 8 pages.

Phillips, Clifton B., et al, "Local Color Image Segmentation Using Singular Value Decomposition," Image Analysis and Interpretation, Apr. 5-7, 1998, pp. 148-153, IEEE Southwest Symposium on Tucson, AZ, USA.

U.S. Appl. No. 13/134,280, filed Jun. 3, 2011, Bryant, Andrew, et al.
U.S. Appl. No. 13/134,289, Jun. 3, 2011, Pettigrew, Daniel, et al.
U.S. Appl. No. 13/134,308, filed Jun. 3, 2011, Pettigrew, Daniel, et al.
U.S. Appl. No. 13/134,319, filed Jun. 3, 2011, Bryant, Andrew, et al.
Portions of prosecution history of U.S. Appl. No. 13/134,289, Nov. 8, 2011, Pettigrew, Daniel, et al.
Portions of prosecution history of U.S. Appl. No. 13/134,308, Nov. 8, 2011, Pettigrew, Daniel, et al.
Portions of prosecution history of U.S. Appl. No. 13/134,319, Nov. 8, 2011, Bryant, Andrew, et al.
Portions of prosecution history of U.S. Appl. No. 13/134,280, Nov. 8, 2011, Bryant, Andrew, et al.

\* cited by examiner

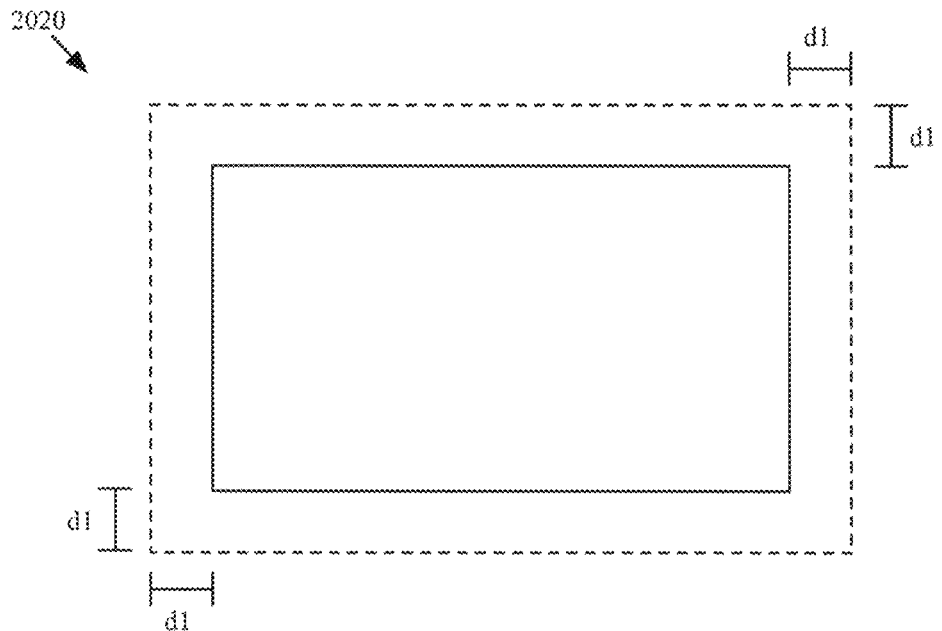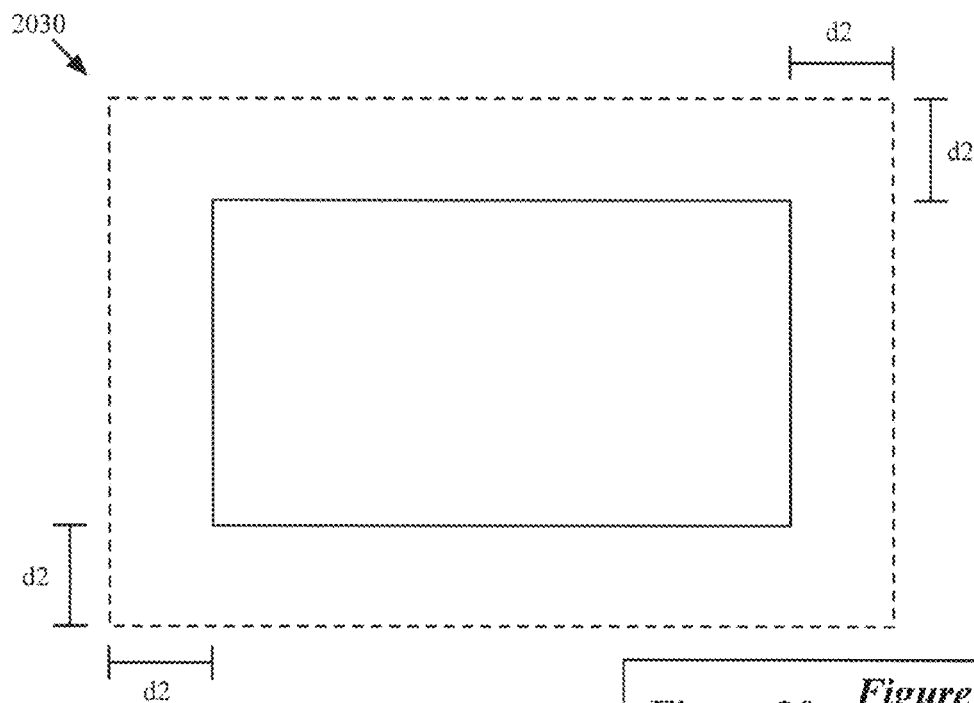
Figure 20B | Figure 20: Figure 20A / Figure 20B

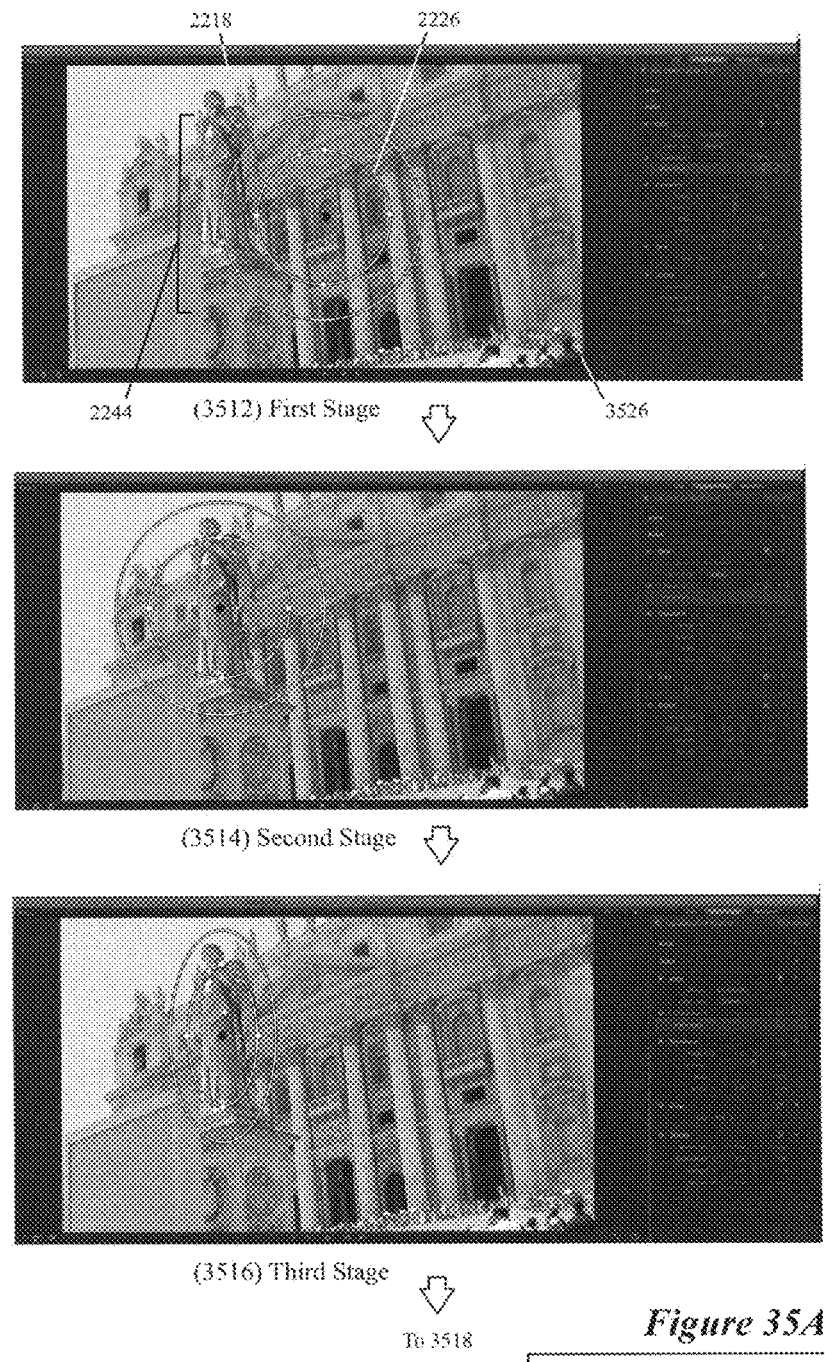
Figure 35: Figure 35A / Figure 35B

(3518) Fourth Stage
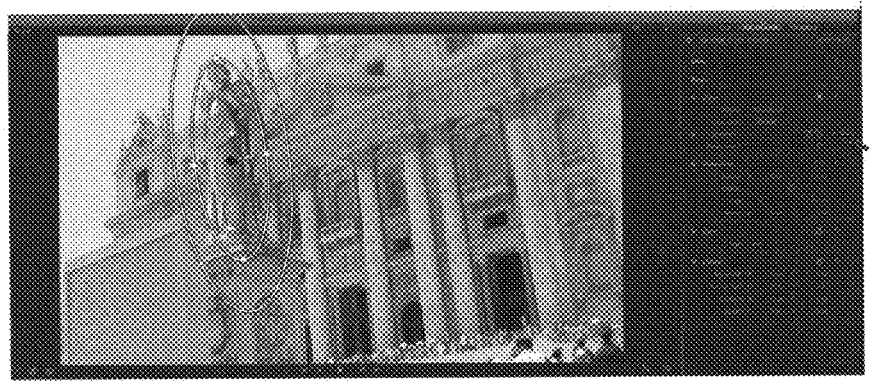
(3520) Fifth Stage
3532
(3522) Sixth Stage
*Figure 35B*
*Figure 35:* *Figure 35A* / *Figure 35B*

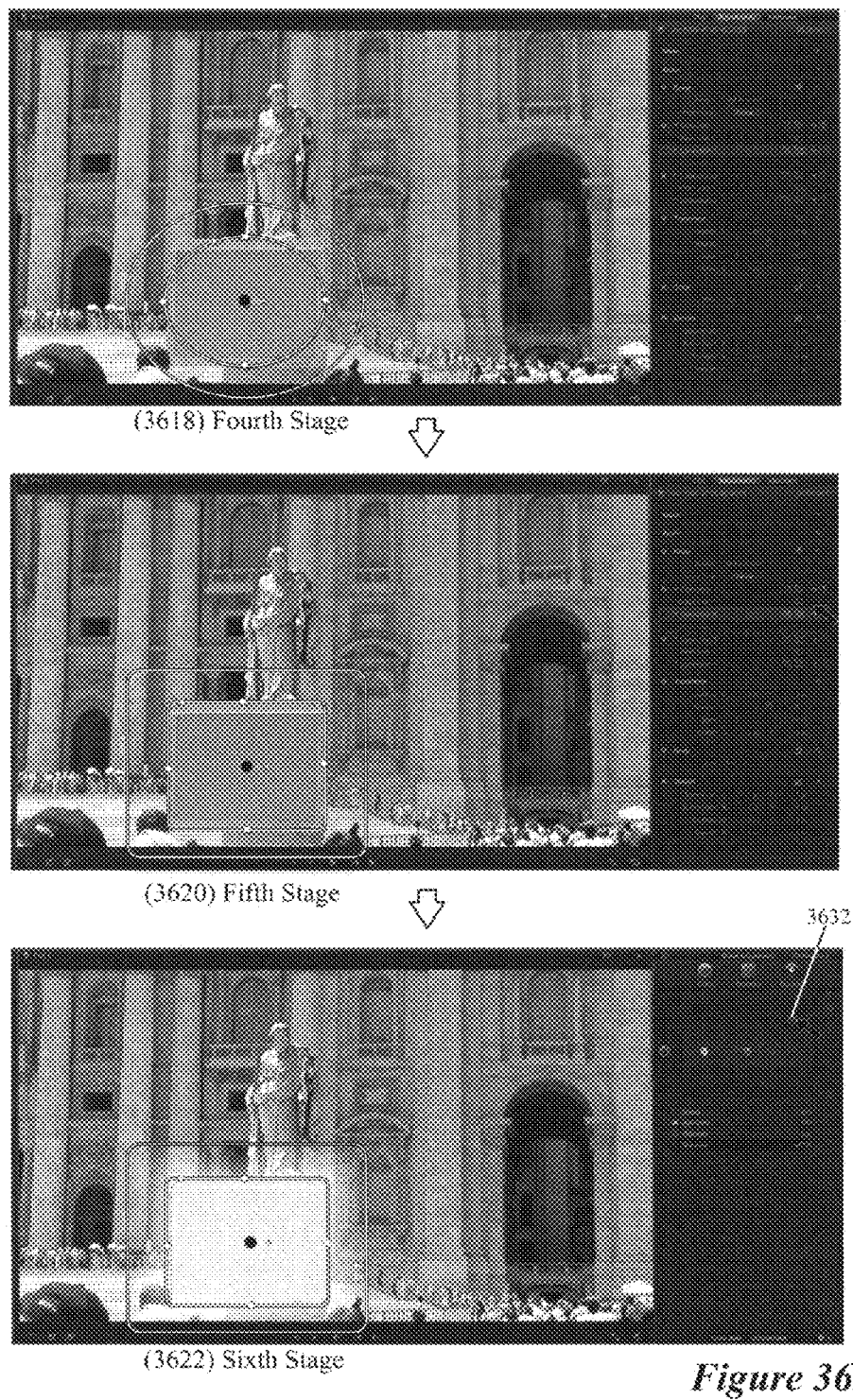
Figure 36: Figure 36A / Figure 36B

(3718) Fourth Stage
(3720) Fifth Stage
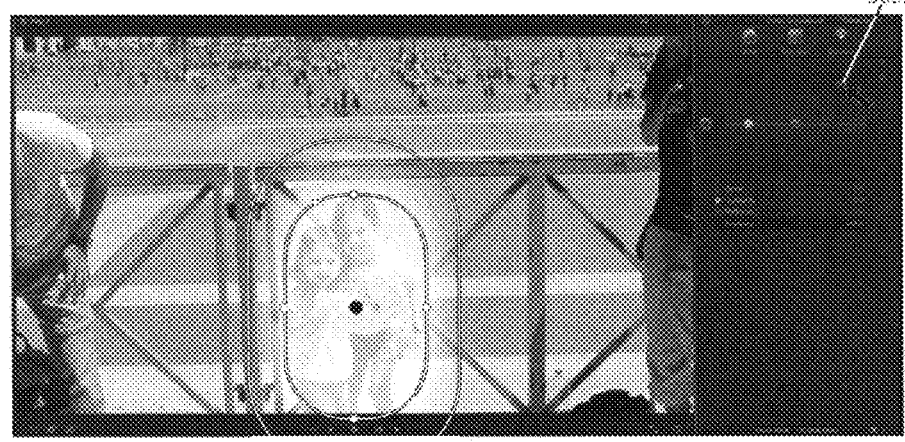
(3722) Sixth Stage
*Figure 37B*
*Figure 37:* *Figure 37A* / *Figure 37B*

SHAPE MASKS

CLAIM OF BENEFIT TO PRIOR APPLICATIONS

This application claims the benefit of U.S. Provisional Patent Application 61/443,708, filed Feb. 16, 2011, U.S. Provisional Patent Application 61/443,718, filed Feb. 16, 2011, and U.S. Provisional Patent Application 61/443,730, filed Feb. 17, 2011. The contents of U.S. Provisional Patent Application 61/443,708, filed Feb. 16, 2011 are hereby incorporated by reference.

CROSS REFERENCE TO RELATED APPLICATIONS

This Application is related to the following applications: U.S. patent application Ser. No. 13/134,280, filed Jun. 3, 2011, now published as U.S. Patent Publication 2012-0206475; U.S. patent application Ser. No. 13/134,289, filed Jun. 3, 2011, now published as U.S. Patent Publication 2012-0206655; U.S. patent application Ser. No. 13/134,308, filed Jun. 3, 2011, now published as U.S. Patent Publication 2012-0210274; and U.S. patent application Ser. No. 13/134,319, filed Jun. 3, 2011, now published as U.S. Patent Publication 2012-0210229.

BACKGROUND

When editing a video clip, many different operations may be performed to the video clip. For example, a frame (or frames) of the video clip may be modified in order to achieve a particular appearance, look, or feel. One of the many ways to modify the frame of the video clip is to modify the colors of the frame. Sometimes a user (e.g., an editor, colorist) may wish to modify the colors of the entire frame of the video clip. However, the user may also wish to modify the colors of only a portion of the frame of the video clip.

Many different video editing tools exist for identifying a portion of the frame that is going to be modified. For instance, some video editing tools allow the user to specify a particular range(s) of color attributes (e.g., luminance, saturation, hues, etc.) in order to identify a portion of the frame to modify the colors of the portion of the frame. Some video editing tools even allow the user to use geometric shapes to specify a particular area of the frame in order to identify a portion of the frame to modify the colors of the portion of the frame.

BRIEF SUMMARY

Some embodiments of the invention provide a novel masking tool for a media-editing application. The masking tool of some embodiments identifies a portion of an image (e.g., a still image, a frame or field of a video clip, etc.) to which a color correction operation (e.g., hue adjustments, saturation adjustments, brightness adjustments, etc.) is applied. These color correction operations are also referred to as secondary color correction operations. Different embodiments of the masking tool identify a portion of an image differently. For instance, some embodiments provide a novel color-based masking tool (also referred to as a color masking tool). The color masking tool of some embodiments identifies a portion of an image based on the colors in the image (i.e., the color values of pixels in the image). Alternatively, or in conjunction with the color-based masking tool, some embodiments provide a novel spatial-based masking tool (also referred to as a shape masking tool). The shape masking tool of some embodiments identifies a portion of an image based on a spatial region in the image (i.e., the location of pixels in the image).

As mentioned above, some embodiments of the invention provide a novel color masking tool for a media-editing application. The color masking tool of some embodiments defines a first portion of a three-dimensional color space based on a selection (e.g., received from a user through a Graphical User Interface ("GUI") of the media-editing application) of a first portion of an image. In some embodiments, the first portion of the three-dimensional color space is a superellipse-based shape (e.g., a super-ellipsoid or superellipsoid) that includes pixel values in the three-dimensional color space of pixels in the first portion of the image. In some embodiments, the three-dimensional color space is an RGB (red, green, blue) color space.

Based on the first portion of the image, the color masking tool of some embodiments defines a color mask. In some embodiments, a color mask specifies pixels in the image that have pixel values included in (i.e., inside) the defined first portion of the three-dimensional color space. In other words, the color mask specifies pixels in the image that have the same or similar pixel values as the pixel values of the pixels in the first portion of the image. In some embodiments, the first portion of the three-dimensional color space is a representation of the color mask in the three-dimensional color space. The color masking tool of some embodiments applies color correction operations (e.g., invoked by a user through selection of a GUI item provided by the media-editing application) to a portion or region of the image (also referred to as secondary color corrections) by using the color mask to isolate pixels in the image that have particular color values and applying color correction operations (e.g., hue adjustments, saturation adjustments, brightness adjustments, etc.) to the isolated pixels.

As mentioned above, some embodiments of the color masking tool define the first portion of the three-dimensional color space as a superellipse-based shape (e.g., a super-ellipsoid or superellipsoid) that includes pixel values in the three-dimensional color space of pixels in the first portion of the image. To determine the first portion, some embodiments identify a first rectangular cuboid in the three-dimensional color space that encompasses pixel values in the three-dimensional color space of pixels in the first portion of the image (also referred to as a bounding box).

In some embodiments, the color masking tool performs Principal Component Analysis (PCA) to the pixel values in the three-dimensional color space of the pixels in the first portion of the image. The PCA identifies three orthogonal axes (e.g., x-, y-, and z-axis) for determining the orientation of the first rectangular cuboid in the three-dimensional color space. In addition, the PCA identifies a set of transforms (e.g., a set of matrices) for converting pixel values from the three-dimensional color space to a coordinate system (also referred to as a Bounding Color Sample (BCS) coordinate system) in which the color masking tool of some embodiments defines the first rectangular cuboid.

After performing PCA to the pixel values in the three-dimensional color space of the pixels in the first portion of the image, the color masking tool of some embodiments uses the set of transforms to convert those pixel values from the three-dimensional color space to corresponding pixel values in the BCS coordinate system. Based on the pixel values in the BCS coordinate system, some embodiments of the color masking tool identify the boundaries of the first rectangular cuboid (e.g., the minimum and maximum pixel values along each axis). The color masking tool defines the faces (i.e., sides) of the first rectangular cuboid based on the identified boundaries. In this manner, the color masking tool defines a rectangular cuboid that encompasses the pixel values in the BCS coordinate system of the pixels in the first portion of the image.

Once the faces of the first rectangular cuboid are defined, some embodiments of the color masking tool center the axes of the BCS coordinate system in the middle of the first rectangular cuboid. In some embodiments, the axes of the BCS coordinate system are centered by translating the origin of the BCS coordinate system to the middle of the first rectangular cuboid. Moreover, the color masking tool of some embodiments scales the axes of the coordinate system so that the faces of the first rectangular cuboid along each axis correspond to particular values (e.g., −1 and 1).

Based on the centered and scaled rectangular cuboid (which is now a cuboid) in the BCS coordinate system, some embodiments of the color masking tool define a superellipse-based shape in the BCS coordinate system. The color masking tool uses the faces of the first rectangular cuboid as the boundaries of the superellipse-based shape. Different embodiments use different superellipse-based shapes defined by different equations. For instance, some embodiments use a pure ellipsoid while other embodiments use a superellipsoid that is similar to a cube except the corners (i.e., vertices) are rounded. In some embodiments, the color masking tool scales the defined superellipse-based shape by a predefined amount to prevent pixel values near the corners from being cut off by the defined superellipse-based shape.

When the color masking tool defines a superellipse-based shape in the BCS coordinate system, some embodiments of the color masking tool identify a set of transforms (e.g., a set of matrices) for converting pixel values from the BCS coordinate system to corresponding pixel values in the three-dimensional color space. In this way, the color masking tool can identify the corresponding superellipse-based shape in three-dimensional color space based on the superellipse-based shape defined in the BCS coordinate system.

As mentioned above, some embodiments of the color masking tool define a color mask that specifies pixels in the image that have pixel values included in the first portion of the three-dimensional color space. In some embodiments, the color masking tool defines a color mask by converting the pixel values of each pixel in the image to corresponding pixel values in the BCS coordinate system and determining whether the pixel values in the BCS coordinate system are included (i.e., inside) in the superellipse-based shape defined in the BCS coordinate system. In some embodiments, pixels in the image that have pixel values within the superellipse-based shape are specified as being included in the color mask and pixels in the image that have pixel values outside the superellipse-based shape are not specified as being included in the color mask.

In some embodiments, the color masking tool modifies the first portion of the three-dimensional color space based on a second selection of a second portion of the image. The color masking tool of some embodiments defines a second portion of the three-dimensional color space that includes pixel values in the three-dimensional color space of pixels in the second portion of the image. Based on the second portion of the three-dimensional color space, some embodiments of the color masking tool modify the first portion of the three-dimensional color space to exclude the second portion of the three-dimensional color space. In some embodiments, the modified first portion of the three-dimensional color space is a superellipse-based shape that includes pixel values in the three-dimensional color space of pixels in the second selected portion of the image but excludes pixel values in the three-dimensional color space of pixels in the second selected portion of the image. Instead of modifying the first portion of the three-dimensional color space, some embodiments define a new portion of the three-dimensional color space that includes pixel values in the three-dimensional color space of pixels in the second selected portion of the image but excludes pixel values in the three-dimensional color space of pixels in the second selected portion of the image.

To determine the modified first portion of the three-dimensional color space, some embodiments identify a second rectangular cuboid that encompasses pixel values in the three-dimensional color space of pixels in the second portion of the image in a similar manner as described above for identifying the first rectangular cuboid that encompasses pixel values in the three-dimensional color space of pixels in the first portion of the image. Based on the first and second rectangular cuboids, the color masking tool identifies a set of rectangular cuboids that each is a portion of the first rectangular cuboid that includes a face of the first rectangular cuboid and does not intersect the second rectangular cuboid in the three-dimensional color space. In some embodiments, the rectangular cuboid in the identified set of rectangular cuboids with the largest volume is determined to be the modified first portion of the three-dimensional color space.

Some embodiments of the color masking tool identify the set of rectangular cuboids noted above by using a triangle-triangle collision (or hit) detection technique that, in some embodiments, determines whether two triangles, given the triangles' coordinates in a three-dimensional space, intersect in the three-dimensional space. For instance, the color masking tool uses the triangle-triangle collision detection technique to determine whether a particular portion of the first rectangular cuboid intersects the second rectangular cuboid in the three-dimensional color space. Using this technique, the color masking tool can identify portions of the first rectangular cuboid that includes a face of the first rectangular cuboid and does not intersect the second rectangular cuboid in the three-dimensional color space.

In some embodiments, the color masking tool defines an offset portion of the three-dimensional color space (e.g., a transition region) that encompasses, but does not include, the first portion (or modified first portion) of the three-dimensional color space. The offset portion of some embodiments is a scaled version of the first portion (or modified first portion) of the three-dimensional color space. In some embodiments, the offset portion is scaled such that, for each point on the surface of the offset portion, a distance from the point on the surface of the offset portion to a corresponding point on the surface of the first portion (or modified first portion) is the same or similar distance.

Some embodiments indicate pixels in the image whose pixel values are within the first portion (or modified first portion) of the three-dimensional color space as fully selected pixels, and indicate pixels in the image whose pixel values are within the second portion of the three-dimensional color space (which are not within the first portion of the three-dimensional color space) as partially selected pixels. When color correction operations are applied to the image, the color correction operation is fully applied to pixels that are fully selected, and the color correction operation is partially applied to pixels that are partially selected, in some embodiments. In this manner, partially selected pixels provide a smooth transition between pixels in the image to which the color correction operation is applied and pixels in the image to which the color correction operation is not applied.

As mentioned above, some embodiments of the invention provide a novel shape masking tool for a media-editing application. The shape masking tool of some embodiments provides a shape mask for identifying a region in an image. In some embodiments, a shape mask is a manipulatable two-dimensional shape that is displayed over the image in order to identify the region in the image that is within the two-dimensional shape. In other words, the shape mask is for identifying pixels in the image that are located within the two-dimensional shape. Some embodiments of the shape masking tool apply color correction operations (e.g., invoked by a user through selection of a GUI item provided by the media-editing application) to the region in the image by using the shape mask to isolate pixels in the image that are located within the shape mask and applying color correction operations (e.g., hue adjustments, saturation adjustments, brightness adjustments, etc.) to the isolated pixels.

The shape masking tool of some embodiments allows a user of the shape masking tool to manipulate the shape mask into a plethora of different shapes and sizes. This way, the user may use a single masking tool to identify a variety of different regions (e.g., faces, buildings, people, etc.) of different shapes and sizes in an image. Different embodiments of the shape masking tool allow the user to manipulate the shape mask in different ways. For instance, some embodiments allow the user to adjust the shape of a shape mask, adjust the curvature of a shape mask, adjust the size of a shape mask, and move the shape mask with respect to the image.

In some embodiments, the shape masking tool provides a set of user-selectable GUI controls, which are displayed along with the shape mask over an image, for performing such manipulations of the shape mask. The set of GUI controls includes, in some of these embodiments, GUI controls for adjusting the shape of the shape mask, adjusting the curvature of the shape mask, adjusting the size of the shape mask, and moving the shape mask with respect to the image.

Some embodiments of the shape masking tool provide a shape mask that is for identifying the first and second regions in an image. The shape mask of some of these embodiments is a pair of differently-size, manipulatable, concentric, and two-dimensional shapes that is displayed over the image in order to identify the first and second regions in the image. In some embodiments, the smaller shape of the shape mask (also referred to as an inner shape) are for identifying the first region in the image, and the larger shape of the shape mask (also referred to as an outer shape) is for identifying the second region in the image (e.g., a transition region of the shape mask). Specifically, the shape masking tool identifies pixels in the image that are within the inner shape as pixels included in the first region of the image, and identifies pixels in the image that are within the outer shape but outside the inner shape as pixels included in the second region of the image.

Some embodiments of the shape mask that is for identifying the first and second regions in an image allow the user to manipulate the shape mask in a similar manner described above. In some of these embodiments, manipulating the inner shape (e.g., adjusting the size of the inner shape, adjusting the shape of the inner shape, adjusting the curvature of the inner shape) causes a corresponding manipulation of the outer shape of the shape mask, and manipulating the outer shape (e.g., adjusting the size of the inner shape, adjusting the shape of the inner shape, adjusting the curvature of the inner shape) causes a corresponding manipulation of the inner shape of the shape mask. However, manipulations to the outer shape of the shape (e.g., scaling the outer shape), in some embodiments, may have no affect on the inner shape of the shape mask.

In some embodiments, the inner shape of the shape mask is for indicating pixels that are within smaller shape as fully selected pixels, and the outer shape of the shape mask is for indicating pixels that are within the larger shape but outside the smaller shape as partially selected pixels. The shape mask of these embodiments is also referred to as an inner shape mask. Some embodiments indicate pixels that are outside the outer shape of the shape mask as fully selected pixels, and indicate pixels that are inside the outer shape of the shape mask but outside the inner shape of the shape mask as partially selected pixels. The shape mask of these embodiments is also referred to as an outer shape mask. When color correction operations are applied to the image, the color correction operation is fully applied to pixels that are fully selected, and the color correction operation is partially applied to pixels that are partially selected, in some embodiments, so that a smooth transition exists between pixels in the image to which the color correction operation is applied and pixels in the image to which the color correction operation is not applied.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features of the invention are set forth in the appended claims. However, for purposes of explanation, several embodiments of the invention are set forth in the following figures.

FIG. 20B conceptually illustrates two-dimensional views of the defined transition regions illustrated in FIG. 20A.

FIGS. 35-37 illustrate operations of manipulating a shape mask to cover areas of interest of different sizes and shapes according to some embodiments of the invention.

DETAILED DESCRIPTION

In the following description, numerous details are set forth for purpose of explanation. However, one of ordinary skill in the art will realize that the invention may be practiced without the use of these specific details. For instance, many of the examples illustrate defining color masks in a three-dimensional RGB color space. However, various embodiments may define color masks in another three-dimensional color space, such as a gamma corrected RGB color space, a Y'CbCr color space, or a Hue, Saturation, and Lightness (HSL) color space.

Some embodiments of the invention provide a novel color masking tool for a media-editing application. The color masking tool of some embodiments defines a first portion of a three-dimensional color space based on a selection (e.g., received from a user through a GUI of the media-editing application) of a first portion of an image (e.g., a still image, a frame or field of a video clip, etc.). In some embodiments, the first portion of the three-dimensional color space is a superellipse-based shape (e.g., a super-ellipsoid or superellipsoid) that includes pixel values in the three-dimensional color space of pixels in the first portion of the image.

An image in some embodiments is an array of pixels (e.g., 800×600 pixels, 1024×768 pixels, 1600×1200 pixels). Each pixel represents a portion of the image and includes the color and brightness information for such portion of the image. Different embodiments represent the color and brightness information of pixels in an image differently for different color spaces. For instance, for an image defined in an RGB color space, the pixels' color and brightness information is represented by a red component value, a green component value, and a blue component value in some embodiments. In other embodiments, the color and brightness of pixels of an image defined in a Y'CbCr color space are represented by using a luma (Y') component value for brightness and a blue-difference (Cb) component value and a red-difference (Cr) component value for chrominance (i.e., color). In some embodiments, the luma component is the weighted sum of the nonlinear gamma compressed R'G'B' components. In some of these embodiments, R'G'B' is gamma corrected red, green, and blue components. Other ways of representing the pixels' color and brightness are possible for images defined in other color spaces.

Figure 1:
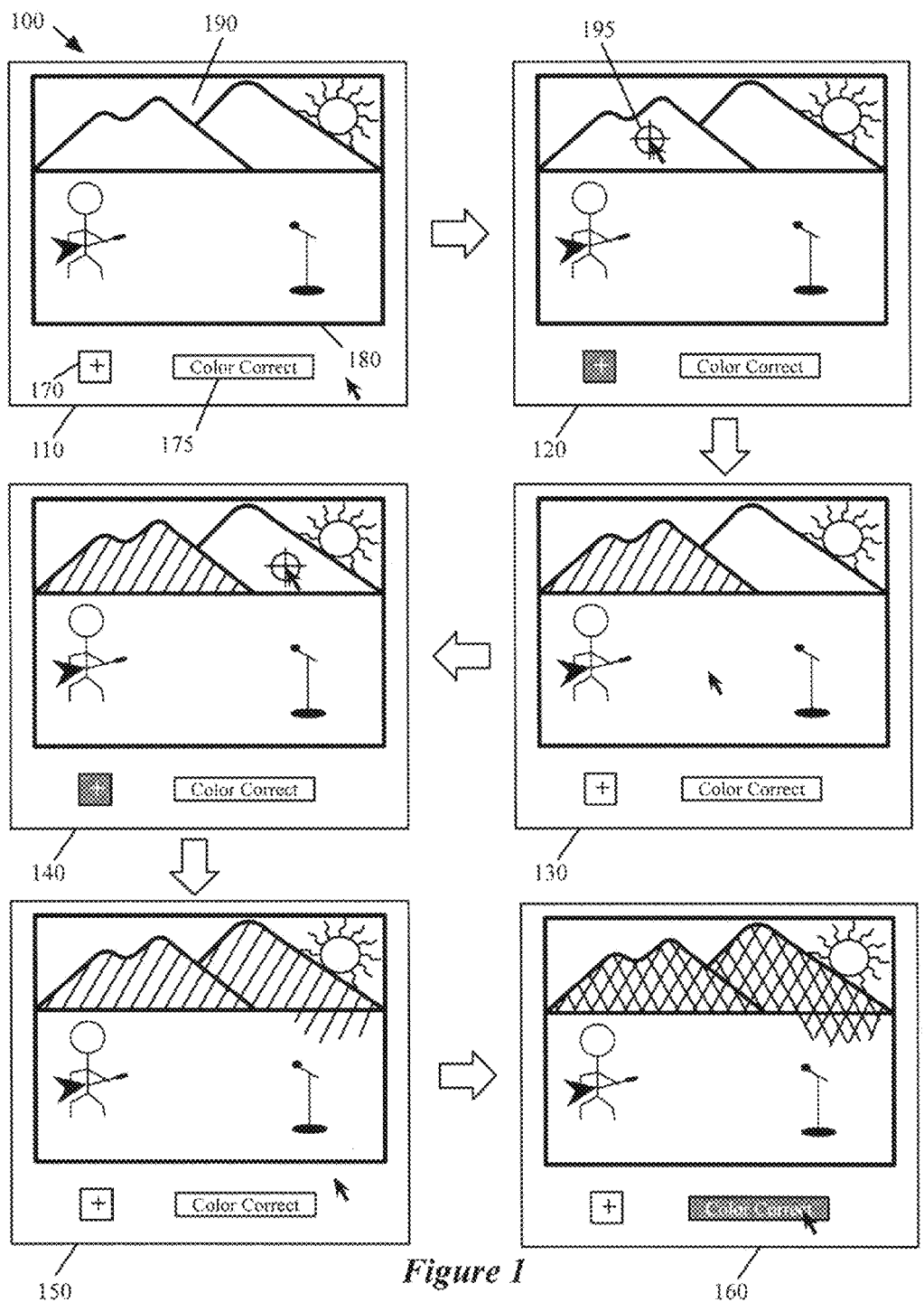
FIG. 1 conceptually illustrates a graphical user interface (GUI) of a media-editing application that provides a color masking tool of some embodiments.

FIG. 1 conceptually illustrates a graphical user interface (GUI) 100 of a media-editing application of some embodiments that provides a color masking tool. Specifically, FIG. 1 illustrates the GUI 100 at six different stages 110-160 of a color masking operation of the color masking tool that defines a color mask.

As shown, the GUI 100 includes a user-selectable user interface (UI) item 170, a user-selectable UI item 175, and an image display area 180. The image display area 180 displays an image for a user to edit with a set of editing tools (not shown). In some embodiments, the image display area 180 allows the user to select portions of the image (e.g., using a selection tool) through the image display area 180.

The user-selectable UI item 170 is a conceptual illustration of one or more UI items that allows a positive (or additive) color masking tool to be invoked (e.g., by a cursor operation such as clicking a mouse button, tapping a touchpad, or touching the UI item on a touchscreen). When the positive color masking tool is invoked, the user can select a portion of the image through the image display area 180 in order to create a color mask or to modify (e.g., by adding colors to) an existing color mask. Based on the selected portion of the image, the positive color masking tool of some embodiments defines a color mask. In some embodiments, a color mask specifies a set of pixels in the image that has the same or similar color values as the color values of the pixels in the selected portion of the image.

Different embodiments implement the UI item 170 differently. Some such embodiments implement the UI item 170 as a UI button while other embodiments implement the UI item 170 as a menu selection command that can be selected through a pull-down, a drop-down, or a pop-up menu. Still other embodiments implement the UI item 170 as a keyboard command that can be invoked through one or more keystrokes or a series of keystrokes (e.g., pressing and holding a key to activate the positive color masking tool and releasing the key to deactivate the positive color masking tool). Yet other embodiments allow the user to activate the positive color masking tool through two or more of such UI implementations or other UI implementations.

The user-selectable UI item 175 is also a conceptual illustration of one or more UI items that allows a color correction operation to be invoked (e.g., by a cursor operation such as clicking a mouse button, tapping a touchpad, or touching the UI item on a touchscreen). Examples of color correction operations include hue adjustments, saturation adjustments, brightness adjustments, or any other type of color correction operation. When the color correction operation is invoked, the positive color masking tool applies the color correction operation to the image. In some embodiments, the positive color masking tool applies the color correction operation to the image by modifying pixels in the image that are included in the color mask. In some cases where a color mask has not been created, the color correction operation is applied to all the pixels in the image. Additionally, the UI item 175 can be implemented any number of different ways, including those described for the UI item 170, in different embodiments.

The operation of the GUI 100 will now be described by reference to the six different stages 110-160 that are illustrated in FIG. 1. The first stage 110 illustrates an image 190 displayed in the image display area 180. In some embodiments, the media-editing application displays the image 190 in the image display area 180 when the media-editing application receives a selection (e.g., through a keyboard command(s) or a cursor operation) of a representation of the image 190 (e.g., a thumbnail, text, icon, etc.) in another region (not shown) of the media-editing application (e.g., a file browser, an event library, a compositing display area, etc.).

As shown, the image 190 displayed in the image display area 180 is of a person playing a guitar with mountains and a sun in the background. In some embodiments, the image 190 may be a still image, an image (frame or field) in a video, or any other type of image. In this example, the image 190 is a still image.

The second stage 120 of the GUI 100 illustrates that the user has activated the positive color masking tool by selecting the UI item 170 using a cursor (e.g., by clicking a mouse button, tapping a touchpad, or touching a touchscreen), as indicated by a highlighting of the UI item 170. In addition, the second stage 120 shows a selection tool 195 displayed in the image display area 180. As shown, the selection tool 195 in this example is a circle with a cross hair displayed in the center of the circle. The user can control the selection tool 195 by moving the cursor (e.g., by moving a mouse across a surface, touching and dragging a finger across a touchpad, or touching and dragging a finger across a touchscreen) in some embodiments. In some embodiments, the media-editing application provides the selection tool 195 when the positive color masking tool is activated.

In addition, the second stage 120 shows that the user has selected a portion of the image 190 displayed in the image display area 180 using the selection tool 195 (e.g., by clicking a mouse button, tapping a touchpad, or touching a touchscreen) in order to create a color mask. In particular, the user has created a color mask by selecting a portion of the left mountain in the image 190. When the media-editing application receives the selection, some embodiments of the positive color masking tool of the media-editing application define a color mask based on the selection. As mentioned above, a color mask specifies a set of pixels in an image that has the same or similar color values as the color values of the pixels in the selected portion of the image. In this example, the color of the left mountain is all the same color. As such, the positive color masking tool of some embodiments defines a color mask that specifies pixels in the image 190 that have the same color values as the color values of the pixels in the selected portion of the left mountain.

The third stage 130 illustrates the GUI 100 after a color mask has been created based on the portion of the image 190 selected in the second stage 120. As shown, the portion of the image 190 (i.e., pixels) displayed in the image display area 180 that is specified as being included in the color mask is indicated by diagonal lines in order to provide the user with a visual indication of the portion of the image 190 that is included in the color mask. In particular, the left mountain in the image 190 is indicated by diagonal lines. In some embodiments, the media-editing application displays the diagonal lines after the media-editing application defines the color mask.

Although the third stage 130 illustrates diagonal lines to indicate the portion of the image 190 included in the color mask, other embodiments of the media-editing application display such indications differently. For instance, some such embodiments might indicate the portion of the image 190 included in the color mask with patterns (e.g., dots), color indicators, animations (e.g., flashing colors), textual indicators, or any other type of visual indicator.

The third stage 130 also shows that the UI item 170 is no longer highlighted and the cursor is provided instead of the selection tool 195. In some embodiments, when the media-editing application receives a selection of a portion of the image to create a color mask, the media-editing application deactivates the positive color masking tool, removes the highlighting of the UI item 170, and provides a cursor instead of the selection tool 195. Some embodiments of the media-editing application may not deactivate the positive color masking tool when the media-editing application receives a selection of a portion of the image to create a color mask in order to allow the user to continue creating or adding colors to a color mask. In some such embodiments, the media-editing application continues to highlight the UI item 170 and to provide the selection tool 195.

In the fourth stage 140, the GUI 100 illustrates using the positive color masking tool to add colors to an existing color mask. Specifically, the fourth stage 140 shows that the user has activated the positive color masking tool by selecting the UI item 170 using a cursor (e.g., by clicking a mouse button, tapping a touchpad, or touching a touchscreen), as indicated by a highlighting of the UI item 170. The fourth stage 140 also illustrates the selection tool 195 displayed in the image display area 180. In some embodiments, the media-editing application provides the selection tool 195 when the positive color masking tool is activated.

The fourth stage 140 additionally shows that the user has selected a portion of the right mountain in the image 190 displayed in image display area 180 using the selection tool 195 (e.g., by clicking a mouse button, tapping a touchpad, or touching the mountain on a touchscreen) in order to add colors in the portion of the right mountain to the color mask created in the second stage 120. For this example, the color of the right mountain is all the same color, which is similar to the color of the left mountain. In addition, the area below the right side of the right mountain is also the same color as the color of the right mountain. As such, the positive color masking tool of some embodiments modifies (e.g., redefines) the color mask that was defined in the second stage 120 so that the color mask specifies pixels in the image 190 that have the same color values as the color values of the pixels in the selected portion of the right mountain in addition to specifying pixels in the image 190 that have the same color values as the color values of the pixels in the selected portion of the left mountain. In some embodiments, the positive color masking tool of the media-editing application modifies (e.g., redefines) the existing color mask when the media-editing application receives a selection of a portion of the right mountain to add colors to the color mask.

The fifth stage 150 illustrates the GUI 100 after colors have been added to an existing color mask based on the portion of the image 190 selected in the fourth stage 140. As shown, the area below the right side of the right mountain is included in the color mask. In this example, the color values of the pixels in the right mountain are similar enough to color values of pixels below the right side of the right mountain that those pixels below the right side of the right mountain are included in the color mask. As such, the fifth stage 150 shows diagonal lines displayed on the area below the right mountain as well as the right mountain itself to indicate that this portion of the image 190 (i.e., pixels) is included in the color mask. Again, these diagonal lines are displayed in order to provide the user with a visual indication of the portion of the image 190 that is included in the color mask. Additional and/or other types of visual indicators noted above by reference to the third stage 130 may be used in different embodiments. In some embodiments, the media-editing application displays the diagonal lines after the media-editing application defines the color mask.

Like the third stage 130, the fifth stage 150 shows that the UI item 170 is not highlighted and the selection tool 195 is no longer provided. The media-editing application of some embodiments deactivates the positive color masking tool, removes the highlighting of the UI item 170, and provides a cursor instead of the selection tool 195 when the media-editing application receives a selection of a portion of the image to add colors to an existing color mask. In some embodiments, the media-editing application may not deactivate the positive color masking tool when the media-editing application receives a selection of a portion of the image to add colors to an existing color mask in order to allow the user to continue adding colors to the color mask. In some of these embodiments, the media-editing application continues to highlight the UI item 170 and to provide the selection tool 195.

The sixth stage 160 illustrates that the user has invoked a color correction operation by selecting the UI item 175 using the cursor (e.g., by clicking a mouse button, tapping a touchpad, or touching a touchscreen), which is indicated by a highlighting of the UI item 175. As mentioned above, the color correction operation can be any type of color correction operation (e.g., hue adjustments, saturation adjustments, brightness adjustments) in different embodiments. As shown, the sixth stage 160 displays crossing diagonal lines to indicate the portion of the image 190 (which is the portion of the image 190 specified by the color mask defined in the fourth stage 140) to which the color correction operation is applied.

In some embodiments, the media-editing application provides a persistent color correction operation. For instance, a user might adjust a color mask or create a new color mask after a color correction operation has been applied to an image. In such embodiments, the media-editing application continues to apply the color correction to the image using the current color mask. In other embodiments, the media-editing application may provide a transient color correction operation. In these embodiments, when the user adjusts the color mask after a color correction operation has been applied to the image, the media-editing application removes (e.g., deletes) the color correction operation and the user will have to apply another color correction operation to the image if the user wishes to apply a color correction operation to the image.

While FIG. 1 illustrates a positive color masking tool allowing a user to add colors to an existing color mask, some embodiments of the positive color masking tool create a new color mask in a similar manner described above by reference to the second stage 120 when the media-editing application receives a selection of a portion of the image after having previously received another portion of the image.

As shown, the above FIG. 1 illustrates a GUI of a media-editing application for creating a color mask for an image. As noted above, the positive color masking tool of some embodiments defines a portion of a three-dimensional color space based on a selection of a portion of an image (e.g., through a GUI of a media-editing application that provides the positive color masking tool). In some embodiments, the positive color masking tool defines a color mask for the image based on the defined portion of the three-dimensional color space.

Figure 2:
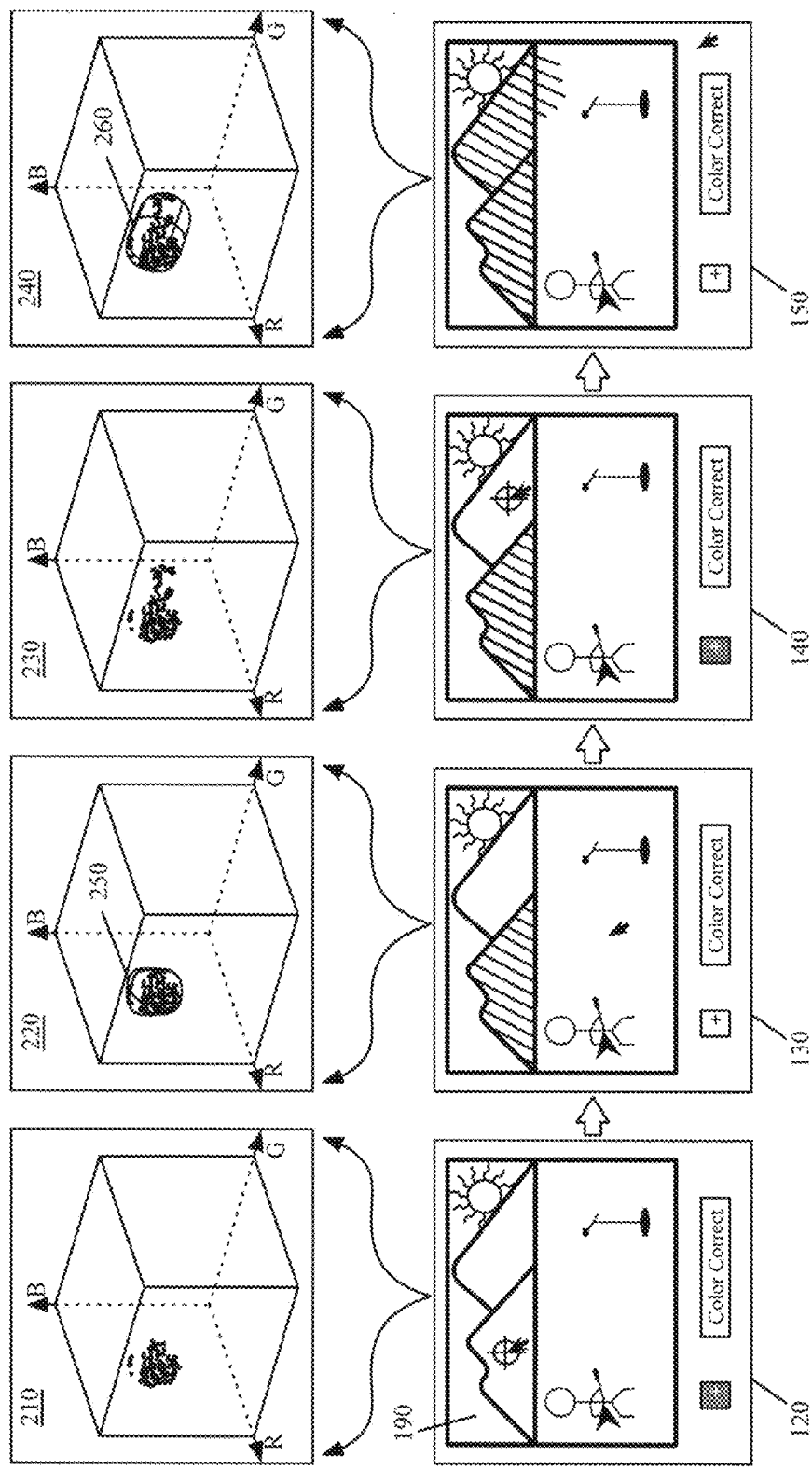
FIG. 2 conceptually illustrates several states of a three-dimensional color space that correspond to several of the stages illustrated in FIG. 1 according to some embodiments of the invention.

FIG. 2 conceptually illustrates several states of a three-dimensional color space that correspond to several of the stages illustrated in FIG. 1. Specifically, FIG. 2 conceptually illustrates four different states 210-240 of a positive color masking tool of some embodiments defining superellipse-based shapes in a three-dimensional color space.

As shown, the three-dimensional color space is an RGB color space, as indicated by the R, G, and B labels along the axes of the three-dimensional color space. A cube that is flush along the axes of the three-dimensional RGB color space is displayed to indicate the maximum values of the range of values along each axis. Different embodiments may define the range of values along the axes of the three-dimensional RGB color space differently. For instance, some embodiments define 256 values (e.g., 0-255) along each axis, which correspond to the range of values used to define a pixel in an image. In some such embodiments where the range of values is defined to be 0-255, the point in the three-dimensional RGB color space farthest from the origin would have RGB component values of 255, 255, and 255. Other ranges of values are possible in other embodiments.

In this example, image 190 is defined in RGB color space. Accordingly, the RGB component values of pixels in the image 190 are used to plot the pixels' corresponding points in the three-dimensional RGB color space. In instances where the image 190 is defined in another color space, the positive color masking tool of some embodiments converts the image 190 to the RGB color space (e.g., by applying a set of transforms for converting the color space of the image to the RGB color space) in order to determine the RGB component values of the pixels in the image 190.

The first state 210 of the three-dimensional color space corresponds to the second stage 120 illustrated in FIG. 1. As described above, the second stage 120 illustrates that the user has selected a portion of the left mountain in the image 190 in order to create a color mask. The points plotted in the three-dimensional RGB color space represent the RGB component values of the pixels in the selected portion of the image 190. When the media-editing application receives the selection of the portion of the image 190, some embodiments of the positive color masking tool identify the pixels in the selected portion of the image 190 and determine the location of corresponding points in the three-dimensional RGB color space for each of the identified pixels.

The second state 220 of the three-dimensional RGB color space corresponds to the third stage 130 illustrated in FIG. 1. The third stage 130, as described above, illustrates the GUI 100 after a color mask has been created based on the portion of the image 190 selected in the second stage 120. As noted above, some embodiments of the color masking tool define a portion of a three-dimensional color space based on a selection of a portion of an image. As shown in the second state 220 of the three-dimensional RGB color space, the positive color masking tool has defined a portion of the three-dimensional RGB color space based on RGB component values of the pixels in the portion of the image 190 that was selected in the second stage 120. Specifically, the portion of the three-dimensional RGB color space includes RGB component values that are the same or similar to the RGB component values of the pixels in the selected portion of the image 190. As illustrated in the state 220, the portion of the three-dimensional RGB color space is a superellipsoid 250 in this example. In some embodiments, the positive color masking tool defines the superellipsoid 250 when the media-editing application receives the selection of the portion of the image 190 in the second stage 120.

Figure 11:
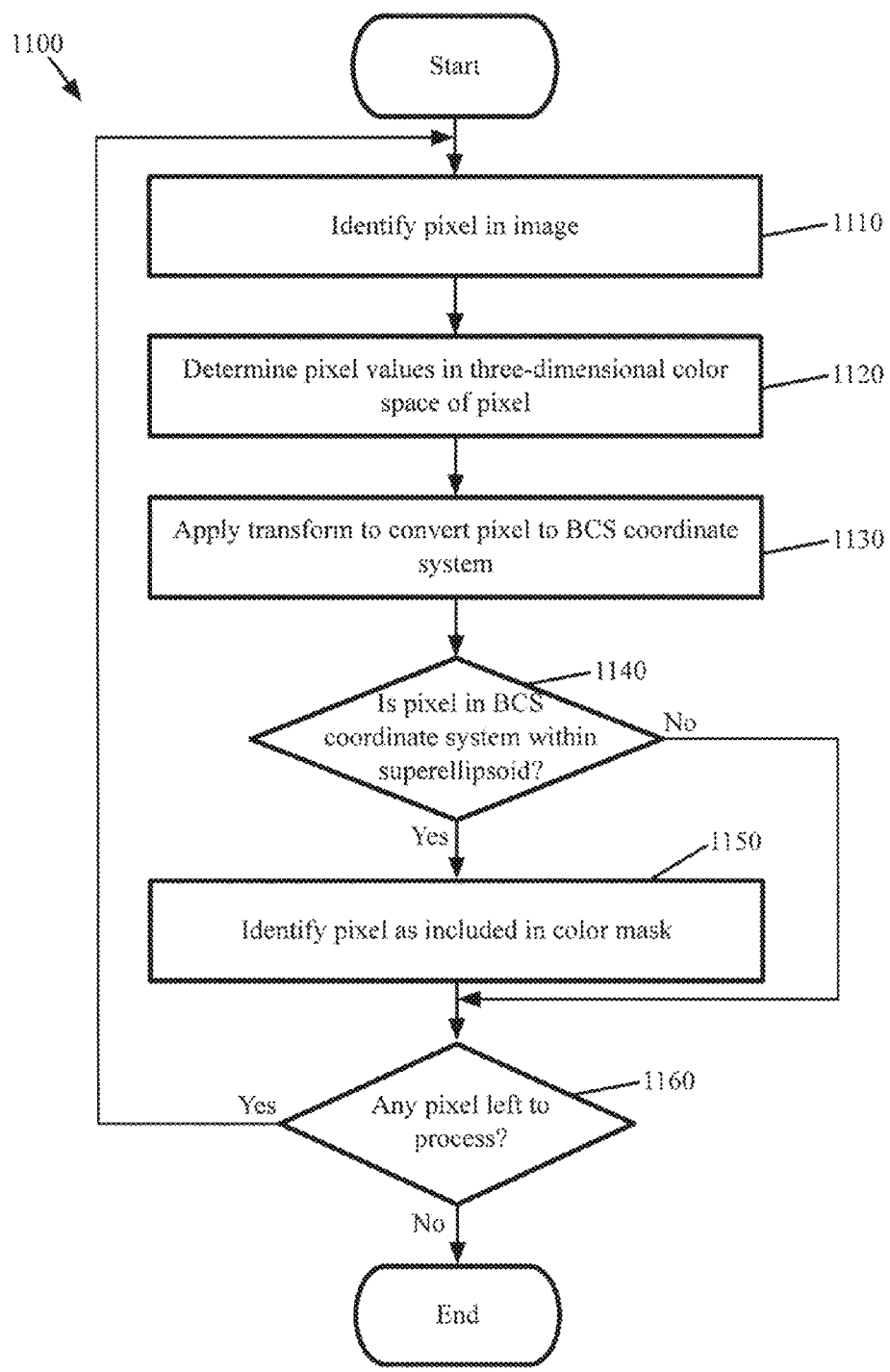
FIG. 11 conceptually illustrates a process of some embodiments for identifying a portion of an image that is included in a color mask.

Based on the superellipsoid 250, some embodiments of the positive color masking tool define a color mask. In this example, the positive color masking tool defines a color mask that specifies pixels in the image 190 that have RGB component values included in the superellipsoid 250. As illustrated in the third stage 130, diagonal lines are displayed on the portion of the image 190 (i.e., pixels) that is included in the color mask. The positive color masking tool of some embodiments uses the superellipsoid 250 to identify the portion of the image 190 (i.e., pixels) that is included in the color mask in order for the media-editing application to display visual indicators (e.g., diagonal lines in this example) on such portion of the image 190. FIG. 11, which is described in further detail below, illustrates a process of some embodiments for identifying a portion of an image that is included in a color mask.

The third state 230 of the three-dimensional RGB color space corresponds to the fourth stage 140 illustrated in FIG. 1. As mentioned above, the fourth stage 140 illustrates that the user has selected a portion of the right mountain in the image 190 in order to add colors in the portion of the right mountain to the color mask created in the second stage 120. In the third state 230, the superellipsoid 250 is not shown for the sake of clarity. However, in some embodiments, the superellipsoid 250 still exists (i.e., the color mask defined in the second state 220 still exists). As shown, additional points are plotted to the right of the points illustrated in the first state 210 of the three-dimensional RGB color space. These additional points represent the RGB component values of the pixels in the selected portion of the right mountain in the image 190. When the media-editing application receives the selection of the portion of the right mountain in the image 190, some embodiments of the positive color masking tool identify the pixels in the selected portion of the right mountain in the image 190 and determine the corresponding location in the three-dimensional RGB color space of each of the identified pixels.

The fourth state 240 of the three-dimensional RGB color space corresponds to the fifth stage 150 illustrated in FIG. 1. The fifth stage 150, as previously described, illustrates the GUI 100 after colors have been added to an existing color mask based on the portion of the image 190 selected in the fourth stage 140. As illustrated in the fourth state 240 of the three-dimensional RGB color space, the positive color masking tool has defined a portion of the three-dimensional RGB color space based on RGB component values of the pixels in the portions of the image 190 that were selected in the second stage 120 and the fourth stage 140. In particular, the portion of the three-dimensional RGB color space includes RGB component values that are the same or similar to the RGB component values of the pixels in the selected portions of the image 190. As shown, the portion of the three-dimensional RGB color space is a superellipsoid 260 in this example. In some embodiments, the positive color masking tool defines the superellipsoid 260 when the media-editing application receives the selection of the portion of the image 190 in the fourth stage 140.

Based on the superellipsoid 260, some embodiments of the positive color masking tool define a color mask. For this example, the positive color masking tool defines a color mask that specifies pixels in the image 190 that have RGB component values included in the superellipsoid 260. As shown in the fifth stage 150, diagonal lines are displayed on the portion of the image 190 (i.e., pixels) that is included in the color mask. Some embodiments of the positive color masking tool use the superellipsoid 260 to identify the portion of the image 190 (i.e., pixels) that is included in the color mask in order for the media-editing application to display visual indicators (e.g., diagonal lines in this example) on the portion of the image 190. As mentioned above, FIG. 11, which is described in more detail below, illustrates a process of some embodiments for identifying a portion of an image that is included in a color mask.

The above figures illustrate examples of creating a color mask and adding colors to an existing color mask. However, in some instances, the user may want to remove colors from an existing color mask. For instance, in the example illustrated in FIG. 1, the user might be trying to select the mountains and nothing else in the image 190. After selecting the portion of the right mountain to add colors to the color mask, the color values of the pixels in the selected portion of the right mountain are similar enough to color values of pixels below the right side of the right mountain that those pixels below the right side of the right mountain are included in the color mask. In some cases, the user might want to remove the colors of the pixels below the right side of the right mountain from the color mask.

Figure 3:
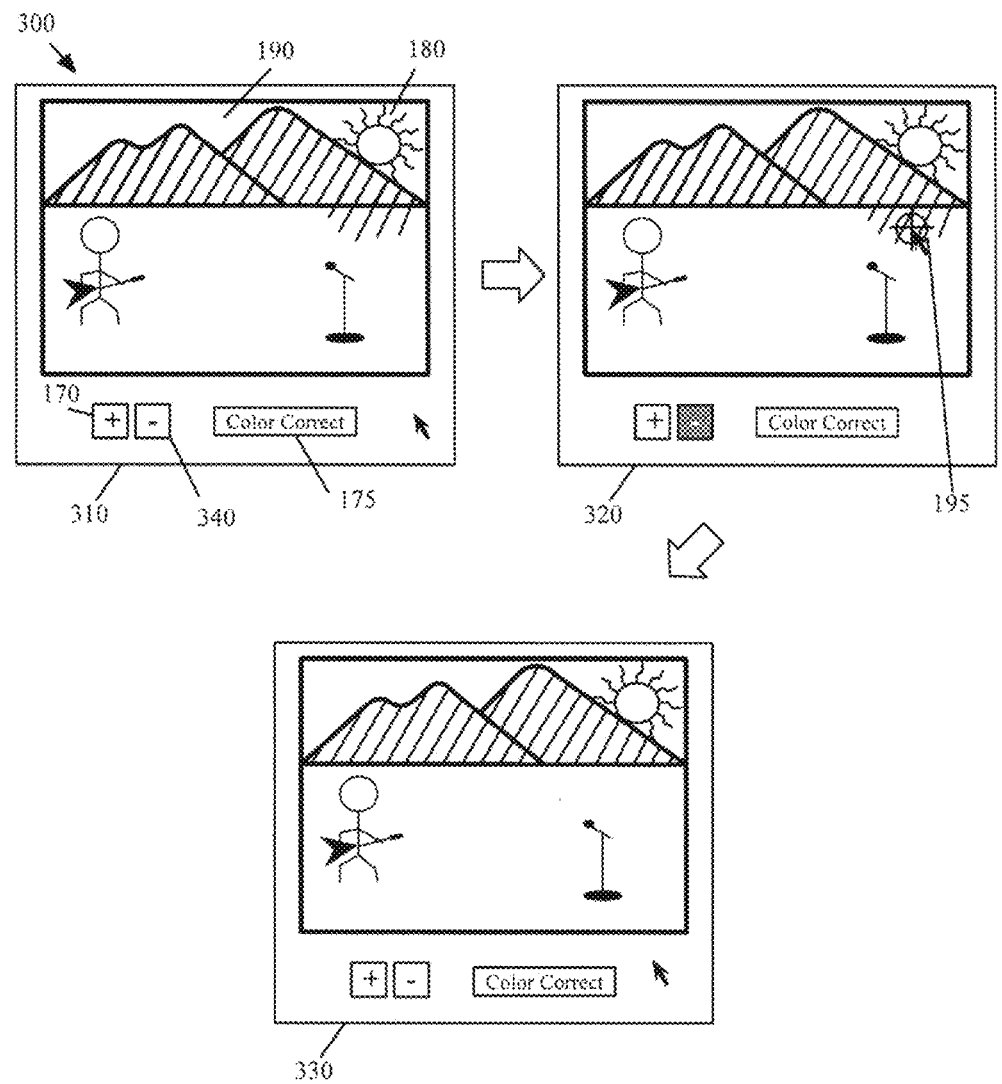
FIG. 3 conceptually illustrates a GUI of a media-editing application that provides a color masking tool of some embodiments.

FIG. 3 conceptually illustrates a GUI 300 of a media-editing application that provides a color masking tool of some embodiments. Specifically, FIG. 3 illustrates the GUI 300 at three different stages 310-330 of a color masking operation of the color masking tool that removes colors from an existing color mask.

The GUI 300 is similar to the GUI 100 illustrated in FIG. 1 but the GUI 300 includes an additional user-selectable UI item 340. The user-selectable UI item 340 is a conceptual illustration of one or more UI items that allows a negative (or subtractive) color masking tool to be invoked (e.g., by a cursor operation such as clicking a mouse button, tapping a touchpad, or touching the UI item on a touchscreen). When the negative color masking tool is invoked, the user can select a portion of the image through the image display area 180 in order to remove colors from an existing color mask. Based on the selected portion of the image, the negative color masking tool of some embodiments defines a color mask. As mentioned above, a color mask of some embodiments specifies a set of pixels in the image that has the same or similar color values as the color values of the pixels in the selected portion of the image.

Different embodiments implement the UI item 340 differently. Some embodiments implement the UI item 340 as a UI button while other embodiments implement the UI item 340 as a menu selection command that can be selected through a pull-down, drop-down, or pop-up menu. Other embodiments implement the UI item 340 as a keyboard command that can be invoked through one or more keystrokes or a series of keystrokes (e.g., pressing and holding a key to activate the negative color masking tool and releasing the key to deactivate the negative color masking tool). Yet other embodiments allow the user to invoke the negative color masking tool through two or more of such UI implementations or other UI implementations.

The first stage 310 is similar to the fifth stage 150 illustrated in FIG. 1. The first stage 310 illustrates the GUI 300 after colors have been added to an existing color mask based on the portion of the image 190 selected in the fourth stage 140. In addition, diagonal lines are displayed on the portion of the image 190 (i.e., pixels) in the image display area 180 that is specified as being included in the color mask.

The second stage 320 illustrates that the user has activated the negative color masking tool by selecting the UI item 340 using a cursor (e.g., by clicking a mouse button, tapping a touchpad, or touching a touchscreen), as indicated by a highlighting of the UI item 340. The second stage 320 also shows the selection tool 195 displayed in the image display area 180.

In some embodiments, the media-editing application provides the selection tool 195 when the negative color masking tool is activated.

In addition, the second stage 320 illustrates that the user has selected a portion of the image 190 displayed in the image display area 180 using the selection tool 195 (e.g., by clicking a mouse button, tapping a touchpad, or touching a touchscreen) in order to remove colors from the existing color mask. Specifically, the user has removed colors from the existing color mask by selecting a portion of the image 190 below the right side of the right mountain. When the media-editing application receives the selection, some embodiments of the negative color masking tool of the media-editing application define a color mask based on the selection. As mentioned above, a color mask specifies a set of pixels in an image that has the same or similar color values as the color values of the pixels in the selected portion of the image. In this example, the color of the area below the right side of the right mountain that is included in the color mask is all the same color but different than the color of the left and right mountains. Thus, the negative color masking tool of some embodiments defines a color mask that excludes pixels in the image 190 that have the same color values as the color values of the pixels in the selected portion of the image 190 below the right side of the right mountain.

The third stage 330 illustrates the GUI 300 after colors have been removed from the existing color mask based on the portion of the image 190 selected in the second stage 320. The portion of the image 190 (i.e., pixels) displayed in the image display area 180 that is specified as being included in the color mask is indicated by diagonal lines in order to provide the user with a visual indication of the portion of the image 190 that is included in the color mask. As shown, the mountains in the image 190 are still indicated by diagonal lines, but there are no longer diagonal lines in the area below the right side of the right mountain. In some embodiments, the media-editing application displays the diagonal lines after the media-editing application defines the color mask.

Although the third stage 330 illustrates diagonal lines to indicate the portion of the image 190 included in the color mask, other embodiments of the media-editing application display such indications differently. For instance, some such embodiments might indicate the portion of the image 190 included in the color mask with patterns (e.g., dots), color indicators, animations (e.g., flashing colors), textual indicators, or any other type of visual indicator.

The third stage 330 also shows that the UI item 340 is no longer highlighted and the cursor is provided instead of the selection tool 195. In some embodiments, the media-editing application deactivates the negative color masking tool, removes the highlighting of the UI item 340, and provides a cursor instead of the selection tool 195 when the media-editing application receives a selection of a portion of the image to remove colors from an existing color mask. In some embodiments, the media-editing application may not deactivate the negative color masking tool when the media-editing application receives a selection of a portion of the image to remove colors from an existing color mask in order to allow the user to continue adding colors to or removing colors from a color mask. In some such embodiments, the media-editing application continues to highlight the UI item 340 and to provide the selection tool 195.

The negative color masking tool of some embodiments defines a portion of a three-dimensional color space based on a selection of a portion of an image (e.g., through a GUI of a media-editing application that provides the positive color masking tool) for removing colors from an existing color mask, as noted above. In some embodiments, the negative color masking tool defines a color mask for the image based on the defined portion of the three-dimensional color space.

Figure 4:
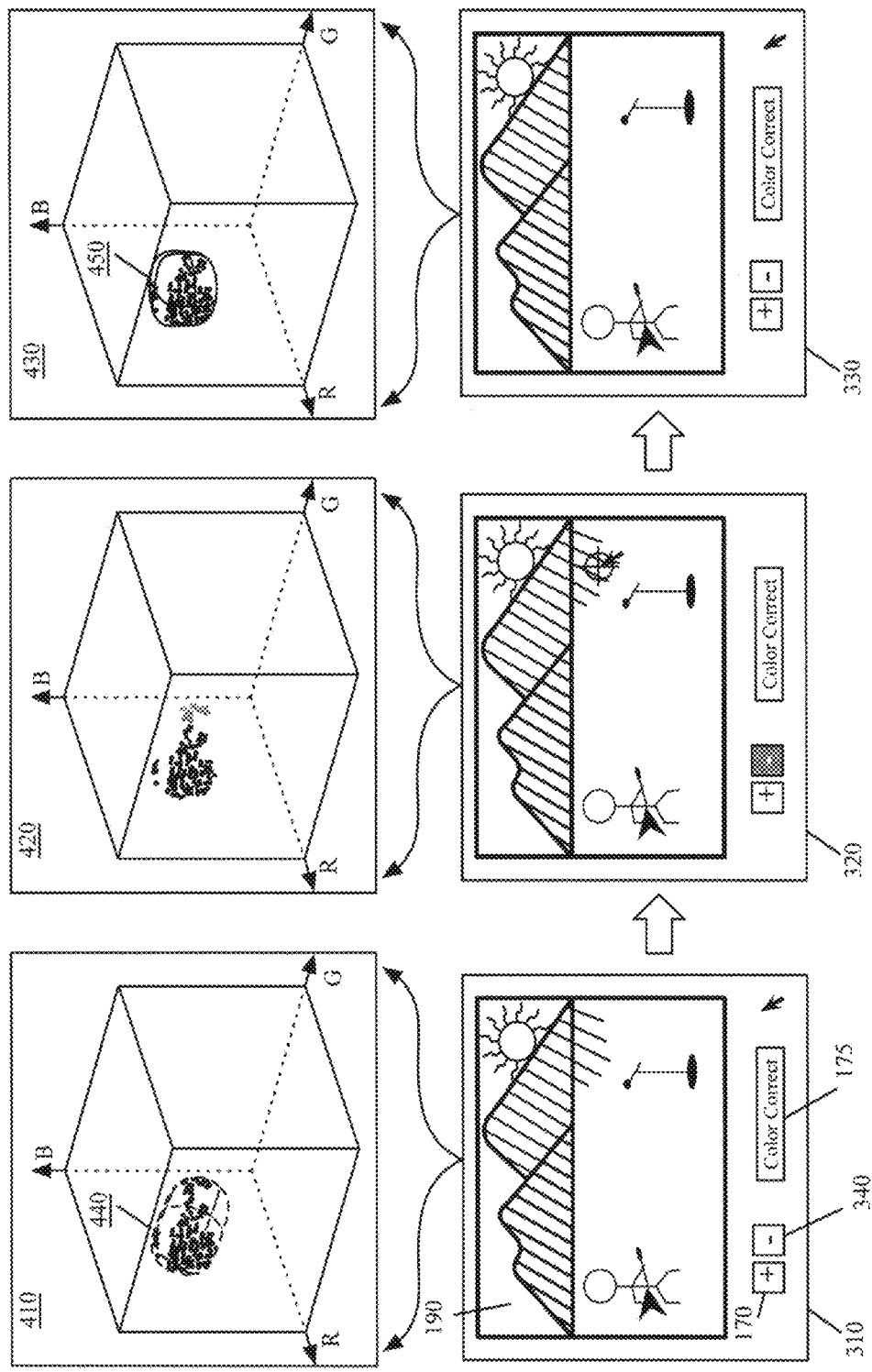
FIG. 4 conceptually illustrates several states of a three-dimensional color space that correspond to several of the stages illustrated in FIG. 3 according to some embodiments of the invention.

FIG. 4 conceptually illustrates several states of a three-dimensional color space that correspond to several of the stages illustrated in FIG. 3. Specifically, FIG. 4 conceptually illustrates three different states 410-430 of a negative color masking tool of some embodiments defining superellipse-based shapes in a three-dimensional color space. The three-dimensional color space illustrated in FIG. 4 is the same three-dimensional color space described above by reference to FIG. 2. That is, the three-dimensional color space is a three-dimensional RGB color space and the RGB component values of pixels in the image 190 are used to plot the pixels' corresponding points in the three-dimensional RGB color space.

The first state 410 of the three-dimensional color space corresponds to the first stage 310 illustrated in FIG. 3. As described above, the first stage 310 is similar to the fifth stage 150 illustrated in FIG. 1. The first stage 310 illustrates the GUI 300 after colors have been added to an existing color mask based on the portion of the image 190 selected in the fourth stage 140. Therefore, the first state 410 of the three-dimensional RGB color space is similar to the fourth state 240 of the three-dimensional RGB color space illustrated in FIG. 2. That is, the negative color masking tool has defined a portion of the three-dimensional RGB color space based on RGB component values of the pixels (which correspond to the points plotted in the three-dimensional RGB color space) in the portion of the image 190 that was selected in the second stage 120 and the fourth stage 140 of FIG. 1. As mentioned above, the portion of the three-dimensional RGB color space includes RGB component values that are the same or similar to the RGB component values of the pixels in the selected portions of the image 190. As shown, the portion of the three-dimensional RGB color space is a superellipsoid 440, which is similar to the superellipsoid 260 illustrated in FIG. 2.

Based on the superellipsoid 440, the negative color masking tool of some embodiments defines a color mask. In this example, the negative color masking tool defines a color mask that specifies pixels in the image 190 that have RGB component values included in the superellipsoid 440. As illustrated in the first stage 310, diagonal lines are displayed on the portion of the image 190 (i.e., pixels) that is included in the color mask. Some embodiments of the negative color masking tool use the superellipsoid 440 to identify the portion of the image 190 (i.e., pixels) that is included in the color mask. As mentioned above, FIG. 11, which is described in more detail below, illustrates a process of some embodiments for identifying a portion of an image that is included in a color mask.

The second state 420 of the three-dimensional color space corresponds to the second stage 320 illustrated in FIG. 3. As mentioned above, the second stage 320 illustrates that the user has selected the portion of the image 190 below the right side of the right mountain in order to remove colors from the existing color mask. The second state 420 does not show the superellipsoid 440 for the purpose of clarity. However, in some embodiments, the superellipsoid 440 still exists (i.e., the color mask defined in the first state 410 still exists). As shown in the second state 420, several points on the right side of the plotted points illustrated in the first state 410 of the three-dimensional RGB color space are grayed out. These gray points represent the RGB component values of the pixels in the selected portion of the image 190 below the right side of the right mountain. When the media-editing application receives the selection, the negative color masking tool of some embodiments identifies points in the three-dimensional RGB color space that correspond to the pixels in the selected portion of the image 190 below the right side of the right mountain and removes the identified points from the three-dimensional RGB color space.

The third state 430 of the three-dimensional color space corresponds to the third stage 330 illustrated in FIG. 3. As described above, the third stage 330 illustrates the GUI 300 after colors have been removed from the existing color mask based on the portion of the image 190 selected in the second stage 320. Some embodiments of the color masking tool define a portion of a three-dimensional color space based on a selection of a portion of an image, as mentioned above. As shown in the third state 430 of the three-dimensional RGB color space, the negative color masking tool has defined a portion of the three-dimensional RGB color space based on RGB component values of the pixels in the portion of the image 190 that was selected in the second stage 320. In particular, the negative color masking tool has defined a portion of the three-dimensional RGB color space that includes the RGB component values in the three-dimensional RGB color space illustrated in the first state 410, but excludes the RGB component values in the three-dimensional color space of the pixels in the portion of the image 190 that was selected in the second stage 320. As shown in this example, the portion of the three-dimensional RGB color space is a superellipsoid 450. In some embodiments, the negative color masking tool defines the superellipsoid 250 when the media-editing application receives the selection of the portion of the image 190 in the second stage 320.

Based on the superellipsoid 450, some embodiments of the negative color masking tool define a color mask. In this example, the negative color masking tool defines a color mask that specifies pixels in the image 190 that have RGB component values included in the superellipsoid 450. As illustrated in the third stage 330, diagonal lines are displayed on the portion of the image 190 (i.e., pixels) that is included in the color mask. Some embodiments of the negative color masking tool use the superellipsoid 450 to identify the portion of the image 190 (i.e., pixels) that is included in the color mask in order for the media-editing application to display visual indicators (e.g., diagonal lines in this example) on such portion of the image 190. As mentioned above, FIG. 11, which is described in further detail below, illustrates a process of some embodiments for identifying a portion of an image that is included in a color mask.

The figures above illustrate different ways of defining a color mask for an image. As previously noted above, once a color mask is defined, some embodiments apply color correction operations to the image using the color mask. When using the color mask to apply a color correction operation to a portion of an image, sharp cutoffs may exist between pixels that have colors included in the color mask (to which the color correction operation is applied) and pixels that have colors that are similar to the pixels included in the color mask, but are not included in the color mask (to which the color correction operation is not applied). As such, some embodiments of the color masking tool define a transition region for the color mask to smooth out such sharp cutoffs.

In some embodiments, a transition region specifies a set of pixels in the image that has color values that are similar to the color values of the pixels included in the color mask, but is not included in the color mask. Pixels in the image that are included in the transition region are partially selected pixels and pixels in the image that are included in the color mask are fully selected pixels, in some embodiments. Accordingly, a color correction operation that is applied to the image is fully applied to fully selected pixels and partially applied to partially selected pixels. In this fashion, the transition between pixels in the image to which the color correction operation is applied and pixels in the image to which the color correction operation is not applied is smoothed.

Figure 5:
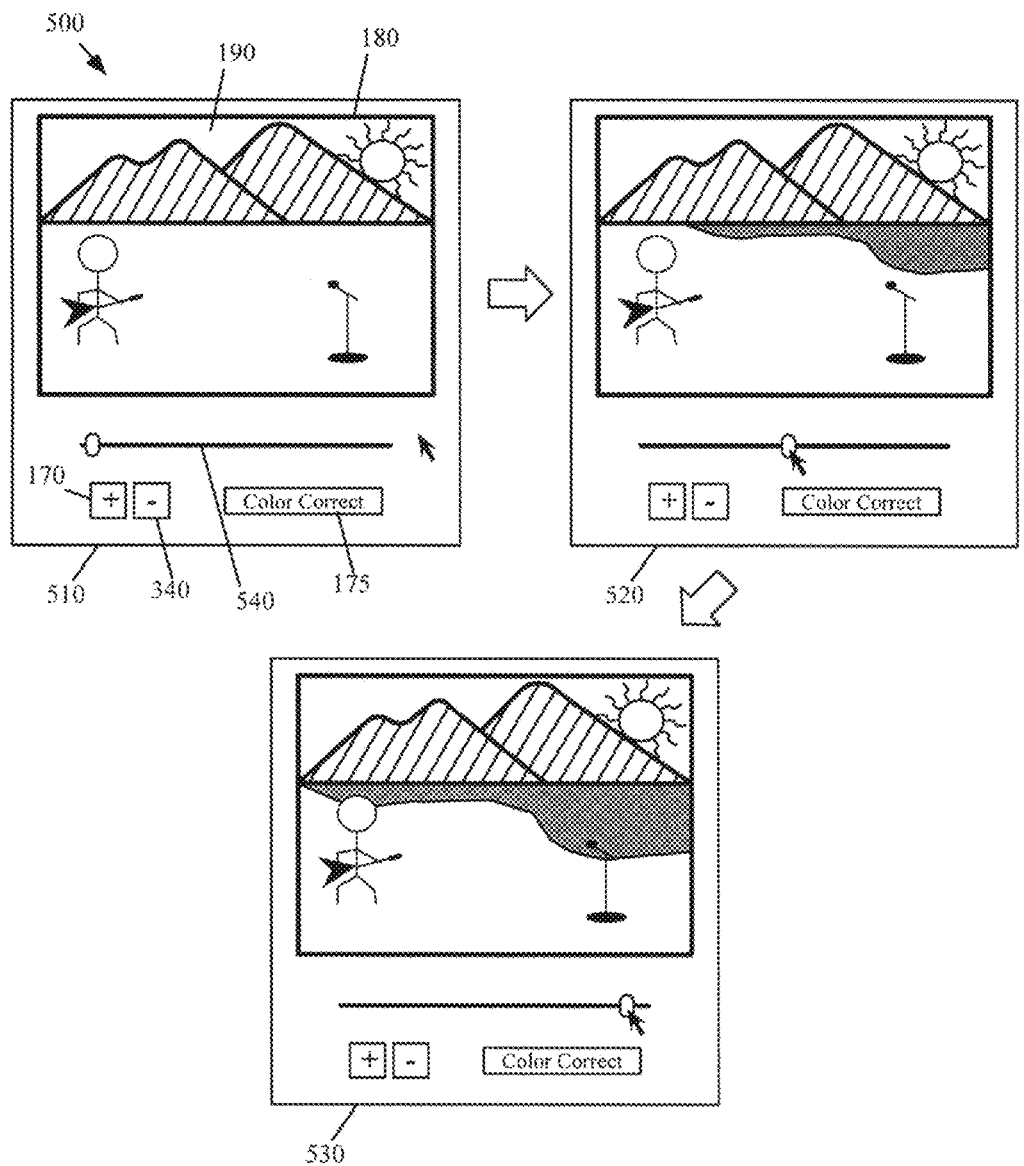
FIG. 5 conceptually illustrates a GUI of a media-editing application that provides a color masking tool of some embodiments.

FIG. 5 conceptually illustrates a GUI 500 of a media-editing application that provides a color masking tool of some embodiments. In particular, FIG. 5 illustrates the GUI 500 at three different stages 510-530 of a color masking operation of the color masking tool that defines a transition region for a color mask.

As shown, the GUI 500 is similar to the GUI 300 illustrated in FIG. 3 except the GUI 500 includes user-adjustable slider control 540. The user-adjustable slider control 540 is a conceptual illustration of one or more UI items that allows a transition region operation to be invoked (e.g., by a cursor operation such as clicking a mouse button and dragging the mouse, tapping a touchpad and dragging across the touchpad, or touching the slider control displayed on a touchscreen and dragging across the touchscreen). When the transition region operation is invoked, the color masking tool defines a transition region for a color mask based on the position of the slider indicator on the slider control 540. In some embodiments, different positions of the slider indicator along the slider control 540 corresponds to different transition region values (e.g. offset values).

Different embodiments of the user-adjustable slider control 540 define the position of the slider indicator along the slider control 540 differently. In the following example, the leftmost position on the slider control 540 does not define a transition region. However, in some embodiments of the slider control 540, the leftmost position on the slider control 540 specifies a default transition region. As the position on the slider control 540 moves from left to right, the transition region increases.

Different embodiments implement the UI item 540 differently. Some embodiments implement the slider control 540 as a textbox (in which a user can input values that correspond to the size of the transition region) while other embodiments implement the slider control 540 as a menu selection command that can be selected through a pull-down, a drop-down, or a pop-up menu. Still other embodiments implement the slider control 540 as a keyboard command that can be invoked through one or more keystrokes or a series of keystrokes. Yet other embodiments allow the user to invoke the transition region operation through two or more of such UI implementations or other UI implementations.

The first stage 510 is similar to the third stage 330 illustrated in FIG. 3. The first stage 3C0 illustrates the GUI 500 after colors have been removed from an existing color mask based on the portion of the image 190 selected in the third stage 330. Similar to the third stage 330, the first stage 510 shows diagonal lines displayed on the portion of the image 190 (i.e., pixels) in the image display area 180 that is specified as being included in the color mask. In addition, the first stage 510 illustrates that a transition region has not been defined, as indicated by the leftmost position of the slider indicator on the UI slider control 540.

The second stage 520 illustrates that the user has moved the slider indicator to the middle of the slider control 540 using the cursor (e.g., by clicking a mouse button and dragging the mouse, tapping a touchpad and dragging across the touchpad, or touching the slider control displayed on a touchscreen and dragging across the touchscreen) in order to invoke a transition region operation. In some embodiments, the color masking tool defines the transition region when the media-editing application receives the movement of the slider indicator on the slider control 540.

Additionally, the second stage 520 illustrates that a transition region for the color mask has been defined based on the position of the slider indicator on the slider control 540. In this example, the transition region is indicated by a gray color that is displayed in the image 190. As shown, the transition region is located in the right portion of the ground, which is below the right side of the mountains. As mentioned above, a transition region specifies a set of pixels in an image that has color values that are similar to the color values of pixels included in a color mask, but is not included in the color mask. As described above by reference to the fifth stage 150 of FIG. 1, the color values of pixels in the area below the right mountain are similar to the color values of the pixels in the right mountain. Therefore, this area and other areas below the mountains are included in the transition region for the color mask.

While the second stage 520 illustrates a gray color to indicate the portion of the image 190 included in the transition region, other embodiments of the media-editing application display such indicator differently. For instance, some such embodiments might indicate the portion of the image included in the transition region with patterns (e.g., dots), other color indicators, animations (e.g., flashing colors), textual indicators, or any other type of visual indicator.

The third stage 530 illustrates that the user has moved the slider indicator near the right side of the slider control 540 using the cursor (e.g., by clicking a mouse button and dragging the mouse, tapping a touchpad and dragging across the touchpad, or touching the slider control displayed on a touchscreen and dragging across the touchscreen) and that a transition region for the color mask has been defined based on the position of the slider indicator on the slider control 540.

As illustrated in the third stage 530, the transition region shown in the second stage 520 has increased. As noted above, the color values of pixels in the area below the right mountain are similar to the color values of the pixels in the right mountain. For this example, the color values of pixels below the mountains is similar to the color values of the mountains, but not as similar as the area included in the transition region illustrated in the second stage 520. Since the transition region has increased in this stage compared to the second stage 520, a larger area below the mountains are included in the transition region for the color mask. In some embodiments, the color masking tool defines the transition region when the media-editing application receives the movement of the slider indicator on the slider control 540.

As mentioned above, the color masking tool of some embodiments defines an offset portion of the three-dimensional color space that encompasses, but does not include, a portion of the three-dimensional color space defined for a color mask. In some embodiments, the color masking tool defines a transition region for the color mask based on the defined offset portion of the three-dimensional color space.

Figure 6:
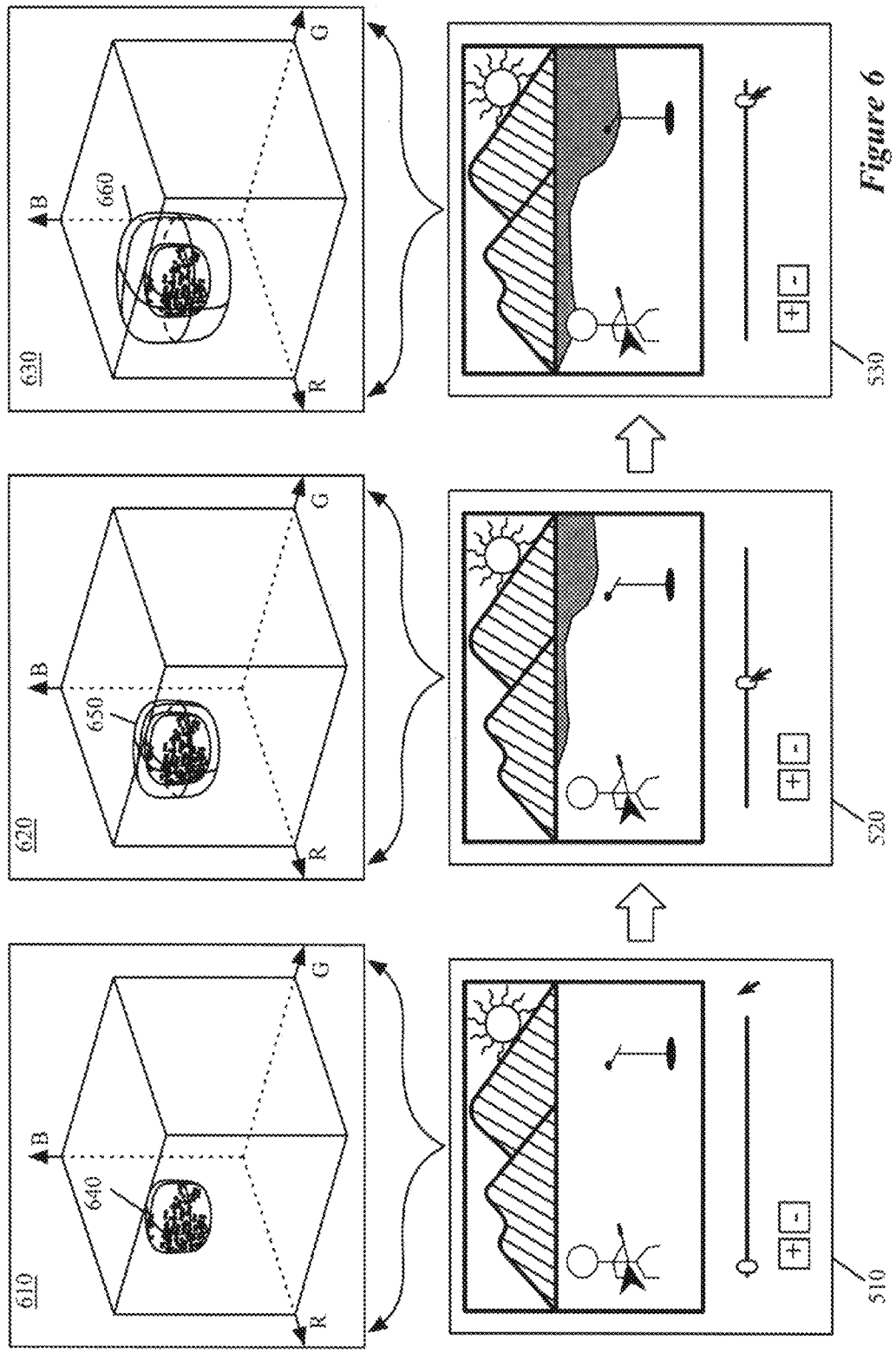
FIG. 6 conceptually illustrates several states of a three-dimensional color space that correspond to several of the stages illustrated in FIG. 5 according to some embodiments of the invention.

FIG. 6 conceptually illustrates several states of a three-dimensional color space that correspond to the stages illustrated in FIG. 5. In particular, FIG. 6 conceptually illustrates three different states 610-630 of a color masking tool of some embodiments defining superellipse-based offset shapes in a three-dimensional color space. The three-dimensional color space illustrated in FIG. 6 is the same three-dimensional color space described above by reference to FIG. 2. As described above, the three-dimensional color space is a three-dimensional RGB color space and the RGB component values of pixels in the image 190 are used to plot the pixels' corresponding points in the three-dimensional RGB color space.

The first state 610 of the three-dimensional color space corresponds to the first stage 510 illustrated in FIG. 5. The first stage 510 is similar to the third stage 330 illustrated in FIG. 3, as mentioned above. The first stage 510 illustrates the GUI 500 after colors have been removed from an existing color mask based on the portion of the image 190 selected in the third stage 330. As such, the first state 610 of the three-dimensional RGB color space is similar to the third state 430 of the three-dimensional RGB color space illustrated in FIG. 4. That is, the color masking tool has defined a portion of the three-dimensional RGB color space that excludes the RGB component values in the three-dimensional color space of the pixels in the portion of the image 190 that was selected in the second stage 320 (and that includes RGB component values of the pixels in the portion of the image 190 that was selected in the second stage 120 and the fourth stage 140 of FIG. 1). As illustrated, the portion of the three-dimensional RGB color space is a superellipsoid 640, which is similar to the superellipsoid 440 illustrated in FIG. 4.

Based on the superellipsoid 640, the color masking tool of some embodiments defines a color mask. For this example, the color masking tool defines a color mask that specifies pixels in the image 190 that have RGB component values included in the superellipsoid 640. As illustrated in the first stage 510, diagonal lines are displayed on the portion of the image 190 (i.e., pixels) that is included in the color mask. The color masking tool of some embodiments uses the superellipsoid 640 to identify the portion of the image 190 (i.e., pixels) that is included in the color mask. As mentioned above, FIG. 11, which is described in more detail below, illustrates a process of some embodiments for identifying a portion of an image that is included in a color mask.

Since the first stage 510 illustrates that a transition region has not been defined, the color masking tool of some embodiments did not define an offset portion for the color mask in the first state 610 of the three-dimensional color space.

The second state 620 of the three-dimensional color space corresponds to the second stage 520 illustrated in FIG. 5. As described above, the second stage 520 illustrates that the user has moved the slider indicator to the middle of the slider control 540 in order to invoke a transition region operation that defines a transition region for the color mask based on the position of the slider indicator on the slider control 540. As mentioned above, the color masking tool of some embodiments defines an offset portion of the three-dimensional color space that encompasses, but does not include, a portion of the three-dimensional color space defined for a color mask. As shown in the second state 620 of the three-dimensional RGB color space, the color masking tool has defined such an offset portion of the three-dimensional RGB color space based on the position of the slider indicator on the slider control 540.

In this example, the offset portion is a superellipsoid 650, which encompasses, but does not include, the superellipsoid 640. In some embodiments, the color masking tool defines the superellipsoid 650 when the media-editing application receives the slider movement of the slider control 540 in the second stage 520.

The color masking tool of some embodiments defines a transition region for the color mask based on the superellipsoid 650. In this example, the color masking tool defines a transition region that specifies pixels in the image 190 that have RGB component values included in the superellipsoid 650. As shown in the second stage 520, a gray color is displayed on the portion of the image 190 (i.e., pixels) that is included in the transition region. Some embodiments of the color masking tool use the superellipsoid 650 to identify the portion of the image 190 (i.e., pixels) that is included in the transition region in order for the media-editing application to display visual indicators (e.g., a gray color in this example) on the portion of the image 190.

The third state 630 of the three-dimensional color space corresponds to the third stage 530 illustrated in FIG. 5. As described above, the third stage 530 illustrates that the user has moved the slider indicator near the right side of the slider control 540 in order to invoke a transition region operation that defines a transition region for the color mask based on the position of the slider indicator on the slider control 540. As mentioned above, some embodiments of the color masking tool define an offset portion of the three-dimensional color space that encompasses, but does not include, a portion of the three-dimensional color space defined for a color mask. As illustrated in the third state 630 of the three-dimensional RGB color space, the color masking tool has defined such an offset portion of the three-dimensional RGB color space based on the position of the slider indicator on the slider control 540. Similar to the second state 620, the offset portion is a superellipsoid 660, which encompasses, but does not include, the superellipsoid 640 in this example. Since the slider indicator is further towards the right on the slider control 540 than illustrated in the second stage 520, which specifies a larger transition region, the superellipsoid 660 is larger than the superellipsoid 650. In some embodiments, the color masking tool defines the superellipsoid 660 when the media-editing application receives the slider movement of the slider control 540 in the third stage 530.

In some embodiments, the color masking tool defines a transition region for the color mask based on the superellipsoid 660. For this example, the color masking tool defines a transition region that specifies pixels in the image 190 that have RGB component values included in the superellipsoid 660. As illustrated in the third stage 530, a gray color is displayed on the portion of the image 190 (i.e., pixels) that is included in the transition region. The color masking tool of some embodiments uses the superellipsoid 660 to identify the portion of the image 190 (i.e., pixels) that is included in the transition region in order for the media-editing application to display visual indicators (e.g., a gray color in this example) on the portion of the image 190.

While the examples illustrated in FIGS. 1, 3, and 5 each shows a particular sequence of operations for a color masking operation, other sequences of operations are possible. For example, after the user has activated a color masking tool, the user may select any number of different portions of an image to create a color mask, add colors to a color mask, and or remove colors from a color mask. Moreover, the user can apply a color correction operation to the image using the color mask at any time.

FIGS. 1, 3, and 5 each illustrates one arrangement of a GUI of a media-editing application. However, different embodiments of the GUI of the media-editing application can be arranged any number of different ways. For example, in some embodiments, the media-editing application might provide user-selectable UI items and controls in a separate section or panel of the GUI. Some embodiments of the media-editing application may provide a GUI that includes additional and/or other UI elements than those illustrated in FIGS. 1, 3, and 5. For instance, some embodiments provide a user-selectable UI item for allowing a user to toggle between specifying the color mask as an inner color mask or an outer color mask, which are described in further detail below.

Several of the figures described above illustrate one type of selection tool (a circle with a cross hair in the middle). However, different embodiments might provide different types of selection tools for selecting a portion of an image (e.g., pixels) in order to create a color mask (or add or remove colors from an existing color mask). For instance, some embodiments of the media-editing application provide an eye dropper selection tool to select a portion of an image. Other embodiments of the media-editing application may provide other types of selection tools.

In some embodiments, the media-editing application provides a selection tool that has a user-adjustable selection area. For example, some of these user-adjustable selection tools allow the user to enlarge or shrink the selection tool's selection area (e.g., by performing a click-and-drag cursor operation on a portion of an image or a touch-and-drag operation on a portion of an image displayed on a touchscreen). This way, the user can more accurately select the colors in the image that the user wants included in a color mask.

The figures illustrated above describe a color masking tool that defines a color mask that specifies pixels in a image that have the same or similar color values as the color values of the pixels in a selected portion of the image. In some embodiments, when a user invokes a color correction operation, the media-editing application applies the color correction operation to pixels in the image that are included in the color mask (also referred to as an inner color mask). However, in some instances a user might want to apply the color correction operation to the entire image except for the portion of the image that is included in the color mask (also referred to as an outer color mask). As such, some embodiments of the color masking tool use the color mask to identify pixels in a image that do not have the same or similar color values as the color values of the pixels in a selected portion of the image. In some such embodiments, the media-editing application applies the color correction operation to the image based on the pixels in the image identified by the color masking tool.

Some of the figures described above conceptually illustrate a three-dimensional color space in which a color masking tool of some embodiments defines a portion of the three-dimensional color space for a color mask. However, one of ordinary skill in the art will recognize that the three-dimensional color space may be represented any number of different ways. For instance, some embodiments use a three-dimensional array to represent the three-dimensional color space.

Although the figures above illustrate different color masking tools (e.g., positive color masking tool, negative color masking tool), in some embodiments, the functionalities of two or more of the color masking tools are actually included in a single color masking tool. For example, some embodiments of the color masking tool include some or all of the features and functions of a positive color masking tool and a negative color masking tool. In some embodiments, the color masking tool includes positive and negative masking tools and a transition region tool. Other combinations of color masking tools are possible in other embodiments.

The examples illustrated above describe creating and adjusting a color mask for a still image. As mentioned above, the color masking tool can define a color mask for a frame (or field) of a video clip in some embodiments. In some of these embodiments, the color masking tool defines a color mask for a particular frame of a video clip and associates the color mask with the rest of the frames in the video clip. For instance, a user may create a color mask for a frame of a video clip and invoke a color correction operation on the frame of the video clip. When the user invokes the color correction operation on the frame, the color masking tool of some embodiments applies the color correction to the frame using the color mask and automatically applies the color correction to each of the other frames in the video clip using the color mask. In this manner, the user only has to create a color mask for one frame of a video clip (instead of creating a color mask for each frame of the video clip) in order to apply a color correction operation to the entire video clip based on colors in the frames.

Different types of applications may provide a color masking tool. As described above, some embodiments of a media-editing application (e.g., Final Cut Pro® and iMovie®) provide a color masking tool. In some embodiments, image-editing applications (e.g., Aperture®), image organizers, image viewers, or any other type of image applications provide a color masking tool. Furthermore, a color masking tool may be provided by an operating system of a computing device (e.g., a desktop computer, tablet computer, laptop computer, smartphone, etc.) in some embodiments.

Several more detailed embodiments of the invention are described in the sections below. Section I provides further details of defining a color mask in a three-dimensional color space. Next, Section II provides further details of manipulating a shape mask of some embodiments. Section III describes an example of a masking tool of some embodiments that includes a color masking tool and a shape masking tool while Section IV describes an example GUI of a media-editing application of some embodiments. Section V then describes a software architecture of a media-editing application of some embodiments. Finally, Section VI describes an electronic system that implements some embodiments of the invention.

I. Color-Based Masks

A. Defining Color Mask

Several of the figures illustrated in the above section described a color masking tool that defines a color mask for an image by defining a superellipsoid in a three-dimensional color space (e.g., a three-dimensional RGB color space) based on a selection of a portion of the image. Different embodiments define a superellipsoid in a three-dimensional color space differently. For instance, some embodiments of the color masking tool define the superellipsoid in the three-dimensional color space by using Principal Component Analysis (PCA) in order to define a bounding box that encompasses the pixel values in the three-dimensional color space of pixels in the selected portion of the image. Then, the color masking tool defines the superellipsoid based on the bounding box.

Figure 7:
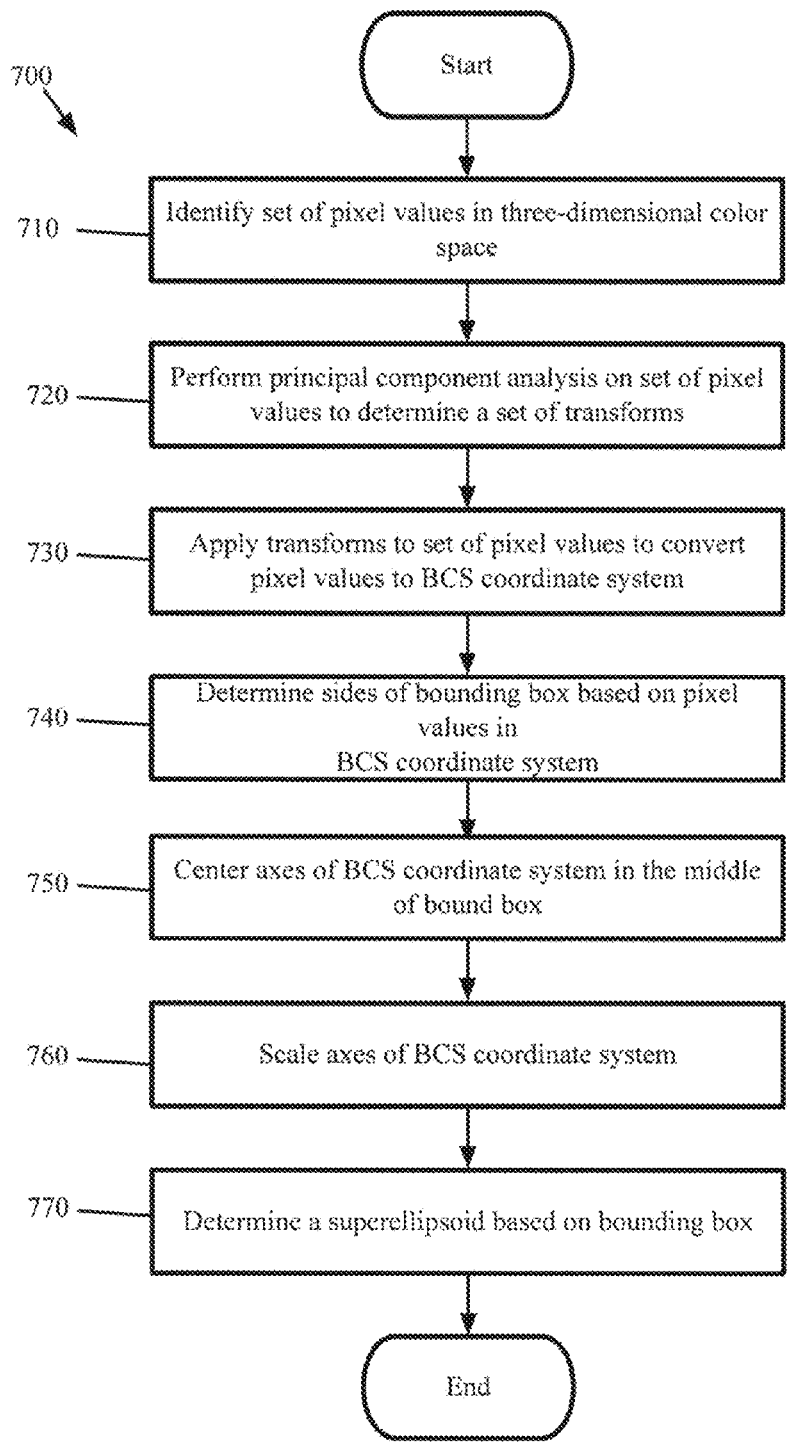
FIG. 7 conceptually illustrates a process of some embodiments for defining a superellipsoid in a three-dimensional color space.

FIG. 7 conceptually illustrates a process 700 of some embodiments for defining a superellipsoid in a three-dimensional color space. In some embodiments, the process 700 is performed by the color masking tool of some embodiments when the color masking tool (or the application that provides the color masking tool) receives a selection of a portion of an image (i.e., pixels) to create a color mask, to add colors to a color mask, or to remove colors from a color mask (e.g., as illustrated in stages 120, 140, 320).

Figure 9:
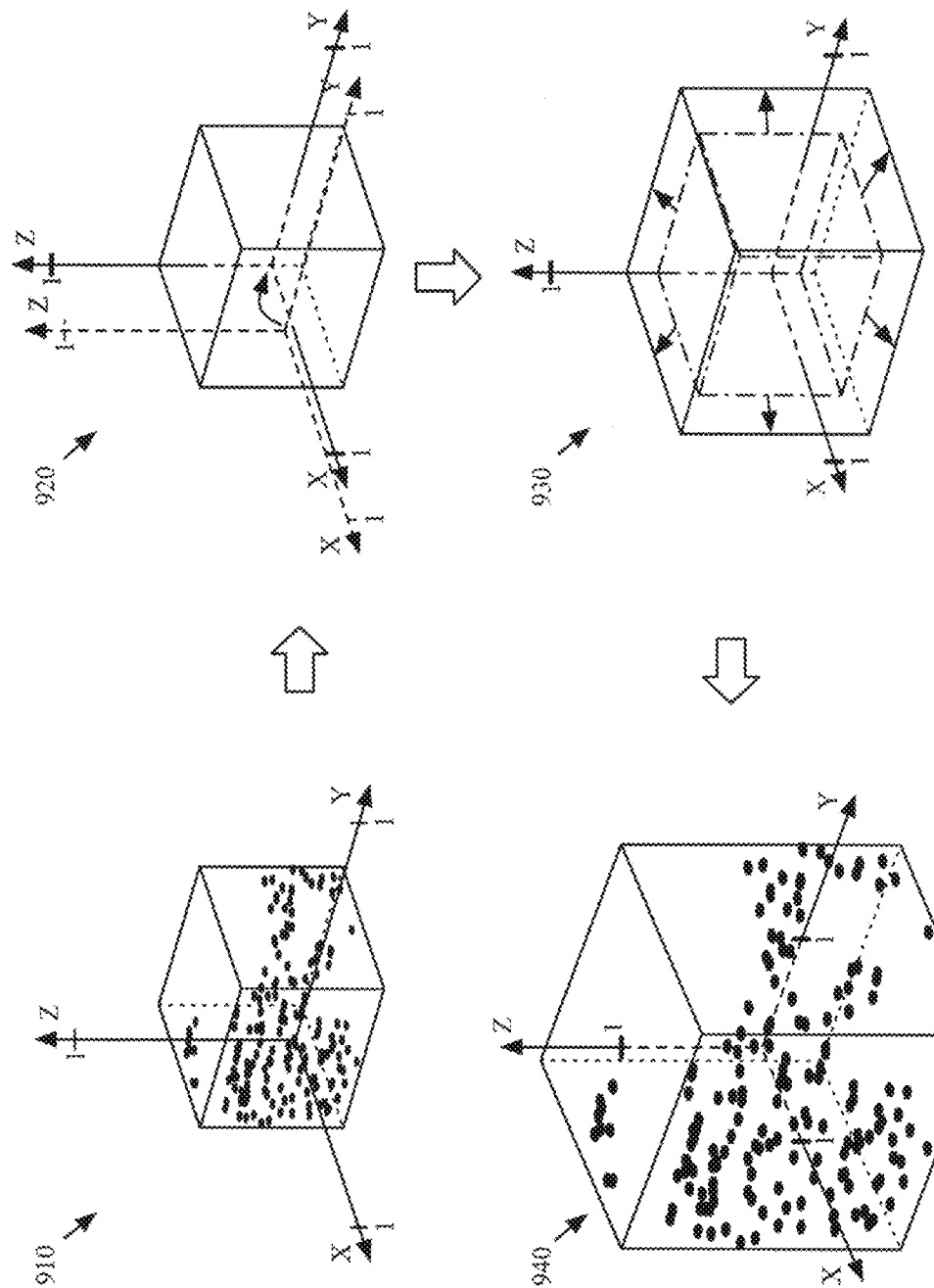
FIG. 9 conceptually illustrates adjustments to a coordinate system in which the bounding box illustrated in FIG. 8 is defined according to some embodiments of the invention.
Figure 10:
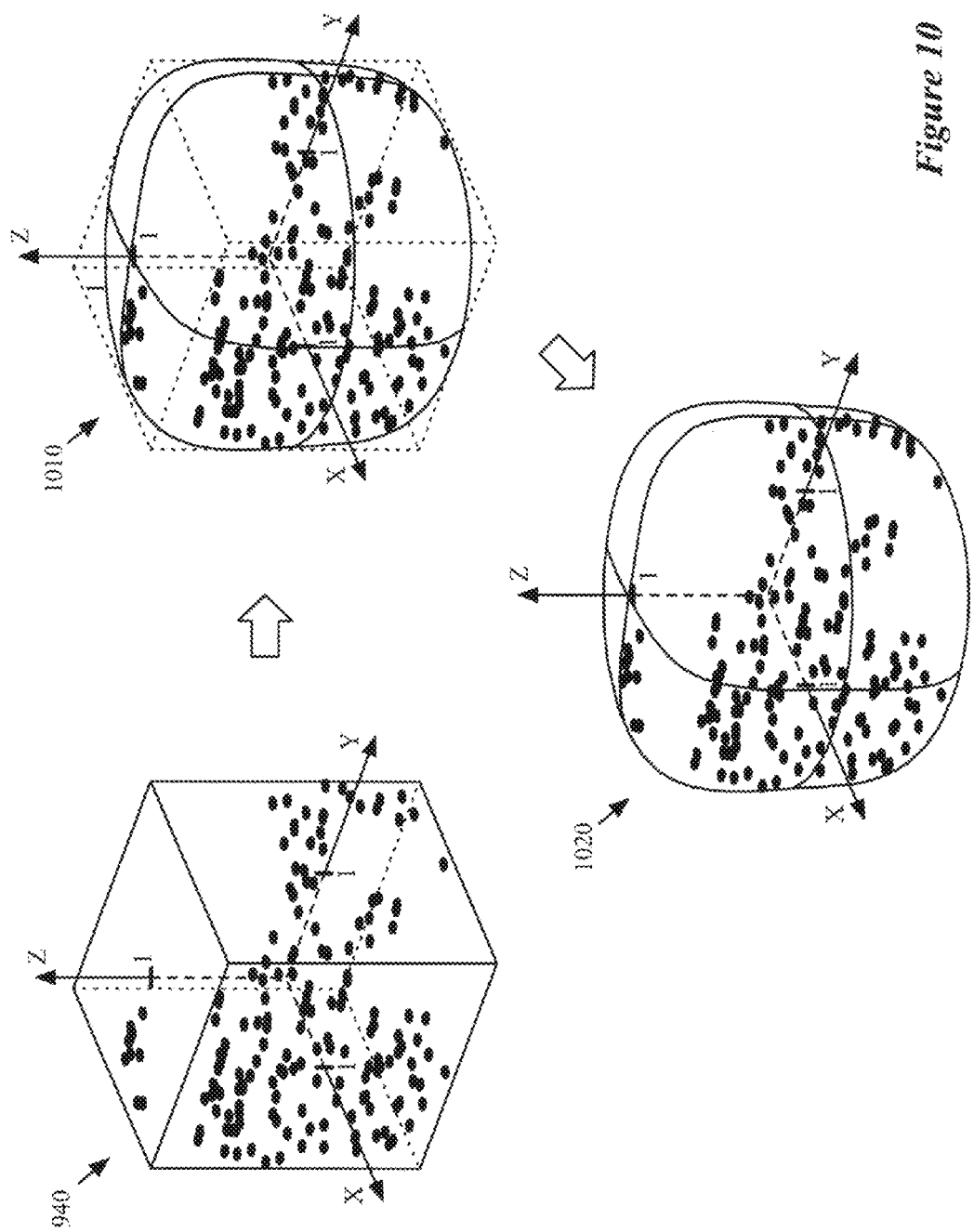
FIG. 10 conceptually illustrates the determination of a superellipse-based shape based on the bounding box illustrated in FIG. 9 according to some embodiments of the invention.

The process 700 will be described by reference to FIGS. 8-10, which conceptually illustrate various states of a Bounding Color Sample (BCS) coordinate system that is used to define a superellipsoid. In particular, FIG. 8 conceptually illustrates three different states 810-830 of determining a bounding box in the BCS coordinate system based on the pixel values illustrated in the third state 230 of the three-dimensional RGB color space of FIG. 2. FIG. 9 conceptually illustrates four different states 910-940 of performing adjustments to the BCS coordinate system based on the bounding box. FIG. 10 conceptually illustrates three different states 1010-1030 of defining a superellipsoid in the BCS coordinate system based on the bounding box.

As shown, the process 700 begins by identifying (at 710) a set of pixel values in a three-dimensional color space. For instance, when the color masking tool of some embodiments (or the application which provides the color masking tool) receives a selection of a portion of an image to create a color mask, the color masking tool identifies the set of pixel values in the three-dimensional color space that correspond to pixels included in the selected portion of an image. In some embodiments, when the color masking tool (or the application which provides the color masking tool) receives a selection of a portion of an image to add colors to a color mask, the color masking tool identifies the set of pixel values in the three-dimensional color space that correspond to pixels included in the selected portion of an image as well as the pixels included in the existing color mask. When the color masking tool of some embodiments (or the application which provides the color masking tool) receives a selection of a portion of an image to remove colors from a color mask, the color masking tool identifies the set of pixel values in the three-dimensional color space that correspond to pixels included in the existing color mask, but are not included in the selected portion of an image.

Figure 8:
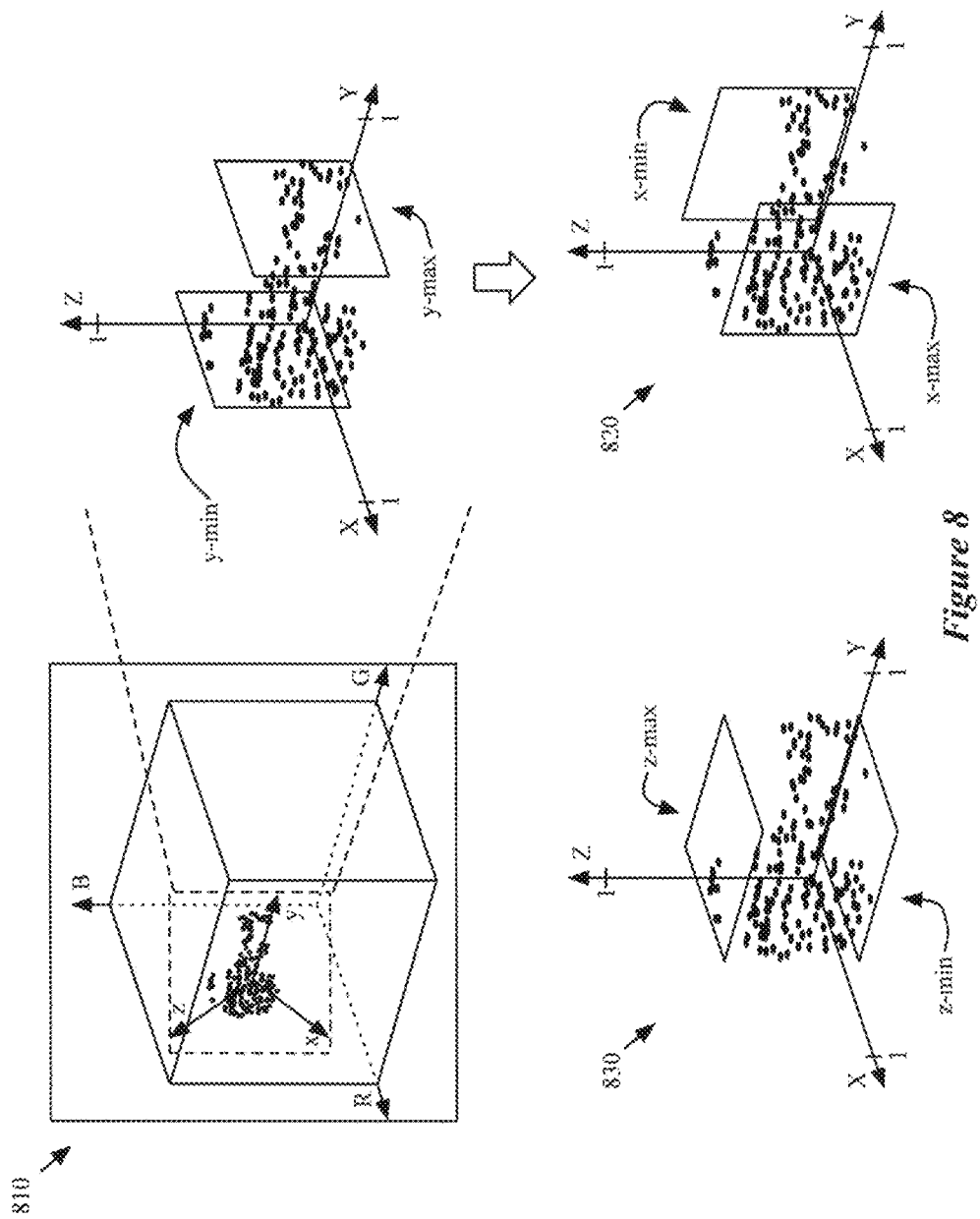
FIG. 8 conceptually illustrates the determination of a bounding box for defining a color mask according to some embodiments of the invention.

Referring to FIG. 8 as an example, the first state 810 illustrates a set of points plotted in a three-dimensional RGB color space and a corresponding set of points in a BCS coordinate system. Specifically, this set of points is the same set of points shown in the third state 230 of a three-dimensional RGB color space of FIG. 2. As described above, the third state 230 of the three-dimensional RGB color space corresponds to the fourth stage 140 illustrated in FIG. 1. As mentioned above, the fourth stage 140 illustrates that the user has selected a portion of the right mountain in the image 190 in order to add colors in the portion of the right mountain to the color mask created in the second stage 120. Thus, the set of points illustrated in the first state 810 represents the RGB component values of the pixels in the image 190 that were selected in the second stage 120 and the fourth stage 140, as illustrated in FIG. 1.

Next, the process 700 performs (at 720) Principal Component Analysis (PCA) on the identified set of pixel values. Generally, PCA is a mathematical procedure that uses an orthogonal transformation to convert a set of observations (e.g., RGB component values) of possibly correlated variables into a set of values of uncorrelated variables called principal components. An orthogonal transformation matrix is a square matrix that includes real entries whose columns and rows are orthogonal unit vectors (i.e., orthonormal vectors). The orthogonal transformation is defined, in some embodiments, in such a way that the first principal component has as high a variance as possible (i.e., accounts for as much of the variability in the data as possible), and each succeeding component in turn has the highest variance possible under the constraint that it be orthogonal to (uncorrelated with) the preceding components.

In some embodiments, the process 700 performs PCA on the identified set of pixel values in order to determine three orthogonal axes (e.g., x-, y-, and z-axis) for identifying the orientation of a bounding box (e.g., a rectangular cuboid) that encompasses the set of pixel values in the three-dimensional color space. Continuing with the example illustrated in FIG. 8, the left side of the first state 810 also illustrates three orthogonal x-, y-, and z-axis that were determined by the process 700 as a result of performing PCA on the set of pixel values in the three-dimensional RGB color space.

As mentioned above, performing PCA on the set of pixel values also identifies a set of transforms (e.g., an orthogonal transformation matrix) for converting pixel values from the three-dimensional color space to a coordinate system (also referred to as a BCS coordinate system) in which the color masking tool of some embodiments defines a bounding box.

The process 700 then applies (at 730) the set of transforms identified by the process 700 performing PCA on the set of pixels to convert the set of pixel values from the three-dimensional color space to a corresponding set of pixel values in the BCS coordinate system. As noted above, the set of transforms is an orthogonal transformation matrix in some embodiments.

Continuing with the example illustrated in FIG. 8, the right side of the first state 810 shows a corresponding set of pixel values in a BCS coordinate system after the process 700 applies an orthonormal transformation matrix to the set of pixel values in the three-dimensional RGB color space. For this example, the corresponding set of pixel values in the BCS coordinate system are expressed in terms of x-, y-, and z-coordinate values, as indicated by labels near each axis. In this example, the set of transforms that the process 700 identifies by applying PCA on the set of identified pixels is an orthonormal transformation matrix. As noted above, an orthogonal transformation matrix is a square matrix that includes real entries whose columns and rows are orthogonal unit vectors. As such, the orthogonal transformation matrix, which is applied to each pixel, maps the pixel values in the three-dimensional RGB color space to corresponding pixel values that range between −1 and 1, as indicated in the BCS coordinate system.

Next, the process 700 determines (at 740) sides for a bounding box based on the set of pixel values in the BCS coordinate system in order to define the bounding box. In some embodiments, the process 700 determines the sides for the bounding box based on the maximum (i.e., largest) and minimum (i.e., smallest) coordinate values among the pixel values along each of the axes in the BCS coordinate system.

Referring to the first state 810 of FIG. 8, the right side of the first state 810 additionally illustrates the maximum and minimum coordinate values along the y-axis based on the pixel values in the BCS coordinate system. The maximum and minimum y-coordinate values are each indicated by a panel that is positioned perpendicular to the y-axis at the coordinate value. Thus, the y-coordinate values of each of the pixel values in the BCS coordinate system are within the y-coordinate values indicated by the panels.

The second state 820 shows the maximum and minimum coordinate values along the x-axis based on the pixel values in the BCS coordinate system. The maximum and minimum x-coordinate values are each indicated by a panel that is positioned perpendicular to the x-axis at the x-coordinate value. Therefore, the x-coordinate values of each of the pixel values in the BCS coordinate system are within the x-coordinate values indicated by the panels.

The third state 830 is similar to the second state 820, but, instead of the x-axis, the third state 830 illustrates the maximum and minimum coordinate values along the z-axis based on the pixel values in the BCS coordinate system. Likewise, the maximum and minimum z-coordinate values are each indicated by a panel that is positioned perpendicular to the z-axis at the z-coordinate value. As such, the z-coordinate values of each of the pixel values in the BCS coordinate system are within the z-coordinate values indicated by the panels.

After the process 700 determines the sides for the bounding box, the process 700 defines the bounding box based on the determined sides. Referring to FIG. 9, the first state 910 illustrates the bounding box that is defined based on the sides determined in FIG. 8. As shown, the bounding box encompasses the set of pixel values in the BCS coordinate system, which corresponds to the set of pixel values in the three-dimensional color space illustrated on the left side of the first state 810. In some embodiments, the process 700 adjusts (e.g., enlarges) the bounding box by a tolerance factor (e.g., 0.1 percent, 0.4 percent, 1 percent) along each axis in order to account for pixel values located in the corners of the bounding box that might be excluded when defining a superellipsoid based on the bounding box.

Returning to FIG. 7, the process 700 centers (at 750) the axes of the BCS coordinate system (i.e., the origin) in the center of the bounding box. In some embodiments, the process 700 determines the center of the bounding box using the maximum and minimum coordinate values along each axis (which the process 700 determines in order to define the sides of the bounding box in some embodiments). In such embodiments, the process 700 determines the center of the bounding box by averaging the maximum and minimum coordinate values along each axis. The resulting x-coordinate, y-coordinate, and z-coordinate values are the coordinates of the center of the bounding box. To center the origin of the BCS coordinate system in the center of the bounding box, some embodiments of the process 700 determine a translation matrix that translates the pixel values to corresponding pixel values such that the origin of the BCS coordinate system is positioned in the center of the bounding box. These embodiments then apply the translation matrix to each of the pixel values in the BCS coordinate system in order to translate the pixel values to their corresponding pixel values.

Referring to FIG. 9, the second state 920 illustrates the origin of the BCS coordinate system illustrated in the first state 910 being centered in the center of the bounding box, as indicated by an arrow. When the origin of the BCS coordinate system is centered in the center of the bounding box, the center of the bounding box accordingly has x-, y-, and z-coordinates of (0,0,0).

Next, the process 700 scales (at 760) the axes of the BCS coordinate system. The process 700 scales each axis of the BCS coordinate system so that the sides of the bounding box perpendicular to each axis correspond to the ends of a range of values. For instance, some embodiments of the process 700 scale each axis of the BCS coordinate system so that the sides of the bounding box perpendicular to each axis correspond to the values −1 and 1. The third state 930 of FIG. 9 illustrates an example of scaling the axes of the BCS coordinate system so that the sides perpendicular to each axis correspond to such values. As shown in the third state 930, one of the sides of the bounding box along each axis is adjusted to intersect the axis' coordinate value of −1 (not shown) and the other side of the bounding box along the axis is adjusted to intersect the axis' coordinate value of 1. In some embodiments, the process 700 determines a scaling matrix that scales the pixel values to corresponding pixel values so that coordinate values along the axes of the BCS coordinate system are scaled to the values −1 and 1. Such embodiments then apply the scaling matrix to each of the pixel values in the BCS coordinate system to scale the pixel values to their corresponding pixel values.

The fourth state 940 illustrates the bounding box after the axes of the BCS coordinate system have been scaled as described in the third state 930. As shown in the fourth state 940, the pixel values illustrated in first state 910 have been translated such that the origin of the BCS coordinate system is positioned in the center of the bounding box and scaled such that the sides perpendicular to each axis correspond to the values −1 and 1.

Finally, the process 700 determines (at 770) a superellipsoid based on the bounding box. Generally, a superellipsoid is a solid whose horizontal sections are superellipses with the same exponent r, and whose vertical sections through the center are superellipses with the same exponent t. The surface of a superellipsoid can be defined using the following equation:

$$1 = (|x|^r + |y|^r)^{\frac{t}{r}} + |z|^t \tag{1}$$

where x, y, and z are coordinates along each axis of a three-dimensional coordinate system in which the superellipsoid is defined. In addition, r and t are positive real numbers that control the amount of flattening at the tips and equator. Different embodiments of the process define the superellipsoid in different ways based on the above equation (1). For instance, the process of some embodiments defines the superellipsoid using the following equation:

$$1 = |x|^4 + |y|^4 + |z|^4 \tag{2}$$

Some embodiments of the process, instead of using 4 as the exponents of equation (2), define the surface of the superellipsoid using another value as the exponents of equation (2), such as a value within the range between 2 and 10. A value of 2 as the exponent of equation (2) defines a sphere. As the value of the exponent of equation (2) increases from the value of 2, the roundness of the corners (i.e., vertices) of the superellipsoid decreases. In other words, as the value of the exponent of equation (2) increases from the value of 2 towards infinity, the shape of the superellipsoid changes from an ellipsoid (e.g., a rectangular cuboid with very rounded corners) to a rectangular cuboid with sharp corners (i.e., no roundness). In some embodiments, a superellipsoid defined by equation (2) may be referred to as a rectangular cuboid with vertices that are truncated and rounded. A rectangular cuboid includes other types of cuboids, such as a square cuboid, a right square prism, and a cube, for example.

Defining the curvature of a superellipsoid involves two competing factors: inclusiveness of RGB component values in the three-dimensional RGB color space of selected pixels in the image and smoothness of the superellipsoid for the color mask. Defining a superellipsoid with a small amount of curvature may include the RGB component values in the three-dimensional RGB color space of all the selected pixels in the image. However, the defined color mask of such a superellipsoid may include sharp (i.e., not smooth) ranges of colors (i.e., RGB component values in the three-dimensional RGB color space). Defining a superellipsoid that has more curvature (rounded corners), on the other hand, allows for the definition of a color mask that includes a smooth range of colors (i.e., RGB component values in the three-dimensional RGB color space). as the corners of the superellipsoid are defined rounder, the superellipsoid may omit RGB component values in the three-dimensional RGB color space (e.g., near corners of the bounding box) of some selected pixels in the image. Thus, a superellipsoid defined with more rounded corners allows for the definition of a color mask that has smoother ranges of colors, but the defined superellipsoid may not accurately include the selected colors in the image.

Some embodiments of the process may define other types of three-dimensional shapes based on the bounding box as well. For instance, the process of some embodiments defines rectangular cuboids that have rounded corners with different corner radii. For example, such a rectangular cuboid can be defined to have a very small corner radius such that, to the perception of the human eye, the rectangular cuboid appears to have sharp corners. That is, the rectangular cuboid is 99.99% similar to a rectangular cuboid that has sharp ninety degree corners. Mathematically, however, the rectangular cuboid has rounded corners. However, some embodiments of the process allow the rectangular cuboid to be defined with a corner radius of zero. Additionally, the rectangular cuboid can be defined as a rectangular cuboid with rounded corners that have a very large corner radius.

The rounded corner of the rectangular cuboid may be defined based on the arc length of a sphere in some embodiments. In some such embodiments, the width, height, and length of each of the rounded corners are equal. Alternatively, some other embodiments may define each of the rounded corners of the rectangular cuboid with unequal width, height, and length. For instance, the width, height, and length of the rounded corners may be defined as proportional to the width, height, and length of the rectangular cuboid. In this manner, the rectangular cuboid may be defined as a rectangular cuboid with a very minimal amount of roundness so as to appear as a rectangular cuboid with ninety degree corners and a rectangular cuboid with rounded corners proportional to the width, height, and length of the rectangular cuboid so as to appear as an ellipsoid.

As mentioned above, FIG. 10 conceptually illustrates three different states 1010-1030 of defining a superellipsoid in a BCS coordinate system based on a bounding box. Specifically, FIG. 10 illustrates defining a superellipsoid in the BCS coordinate system illustrated in FIG. 9 based on the bounding box that was determined in manner described above by reference to FIG. 9.

The first state 1010 is the same as the fourth state 910 of FIG. 9. At the first state 1010, a bounding box has been determined in a BCS coordinate system by the process 700 of some embodiments based on the set of pixel values in the three-dimensional RGB color space illustrated in the first state 810 of FIG. 8, as described above. As shown, the first state 1010 shows a set of pixel values in the BCS coordinate system, which are the corresponding pixel values of the pixel values in the three-dimensional RGB color space shown in the first state 810.

The second state 1020 conceptually illustrates a superellipsoid defined using the above equation (2) in relation to the bounding box. As described above, the sides perpendicular to each axis correspond to the values −1 and 1. As such, the points at which the superellipsoid meet the bounding box are at those such values (i.e., −1 and 1) along each of the axes. The third state 1030 illustrates the defined superellipsoid.

In many of the examples described above, the color masking tool is required to identify a portion of an image (i.e., pixels) that is included in a color mask in different instances. For example, the color masking tool of some embodiments identifies a portion of an image that is included in a color mask when visual indicators of color masks are to be displayed in the GUIs illustrated in FIGS. 1, 3, and 5. Also, some embodiments of the color masking tool identify a portion of an image that is included in a color mask when color corrections are applied to the image.

FIG. 11 illustrates a process 1100 of some embodiments for identifying a portion of an image that is included in a color mask. Specifically, the process 1100 identifies a portion of an image that is included in a color mask based on a superellipsoid that is defined in a BCS coordinate system (e.g., by the process 700 described above by reference to FIG. 7). In some embodiments, the process 1100 is performed by color masking tool to identify a portion of an image on which to display visual indicators of the color mask. The color masking tool performs process 1100 to apply a color correction operation to an image using the color mask in some embodiments.

The process 1100 starts by identifying (at 1110) a pixel in an image. In some embodiments, a color mask has been created for the image (e.g., by receiving a selection of a portion of the image from which the color mask is defined). In some cases, the color mask has also been modified (e.g., by adding colors to the color mask, removing colors from the color mask).

Next, the process 1100 determines (at 1120) pixel values in a three-dimensional color space of pixel. As noted above, different embodiments may define a color mask in different color spaces. For instance, some embodiments define a color mask based on a three-dimensional RGB color space. In these embodiments, the process 1100 determines corresponding RGB component values in the three-dimensional RGB color space for the identified pixel.

The process 1100 then applies (at 1130) a set of transforms to convert the values of the pixel from the three-dimensional color space to a BCS coordinate system. As described above by reference to the process 700 illustrated in FIG. 7, some embodiments define a superellipsoid in a three-dimensional RGB color space by defining the superellipsoid in a BCS coordinate system. In some such embodiments, performing the process 700 identifies a set of transforms (e.g., an orthonormal matrix, a translation matrix, and scaling matrix) for converting pixel values from a three-dimensional RGB color space to a BCS coordinate system. In these embodiments, the process 1100 applies the set of transforms to convert the pixel values of the pixel from the three-dimensional color space to corresponding pixel values (e.g., x-, y-, and z-coordinate values) in a BCS coordinate system.

Next, the process 1100 determines (at 1140) whether the corresponding pixel values in the BCS coordinate system is within the superellipsoid defined in the BCS coordinate system. As described above, some embodiments define the surface superellipsoid in the BCS coordinate system using the above equation (2). In these embodiments, the process 1100 determines whether the corresponding pixel values in the BCS coordinate system are within the superellipsoid defined in the BCS coordinate system by applying the pixel values of the pixel (e.g., x-, y-, and z-coordinate values) to the following inequality:

$$1 \geq |x|^4 + |y|^4 + |z|^4 \quad (3)$$

If the inequality (3) is true, then the process 1100 determines that the corresponding pixel values in the BCS coordinate system are within the superellipsoid. Otherwise, the process 1100 determines that the corresponding pixel values in the BCS coordinate system are not within the superellipsoid.

When the process 1100 determines that the corresponding pixel values in the BCS coordinate system are within the superellipsoid, the process 1100 identifies (at 1150) the pixel as included in the color mask. Then the process 1100 continues to operation 1160. When the process 1100 determines that the corresponding pixel values in the BCS coordinate system are not within the superellipsoid, the process 1100 proceeds to the operation 1160.

At 1160, the process 1100 determines whether any pixel in the image is left to process. When the process 1100 determines that there is a pixel in the image left to process, the process 1100 returns to the operation 1110 to continue processing any remaining pixels left in the image. Otherwise, the process 1100 ends. After the process 1100 processes all the pixels in the image, the pixels in the image that the process 1100 has identified as being included in the color mask amount to the pixels in the portion of the image that are included in the color mask.

While FIG. 11 describes a process for identifying a portion of an image that is included in a color mask based on pixel values of the pixels in a BCS coordinate system, the process 1100 can be adapted to similarly identify a portion of an image that is included in a transition region of a color mask. In such embodiments, the process 1110 identifies pixels in the image as being included in the transition region of the color mask by determining whether the pixel values of the pixels are within a superellipsoid defined for the transition region, but outside a superellipsoid defined for the color mask.

B. Removing Colors from a Color Mask

As explained in the sections above, some embodiments of the color masking tool are for creating a color mask and/or adding colors to an existing color mask. Additionally, as mentioned above, some embodiments of the color masking tool are for removing colors from an existing color mask. The following section will describe examples and embodiments of defining (e.g., redefining) a color mask after colors are removed from an existing color mask.

Figure 12:
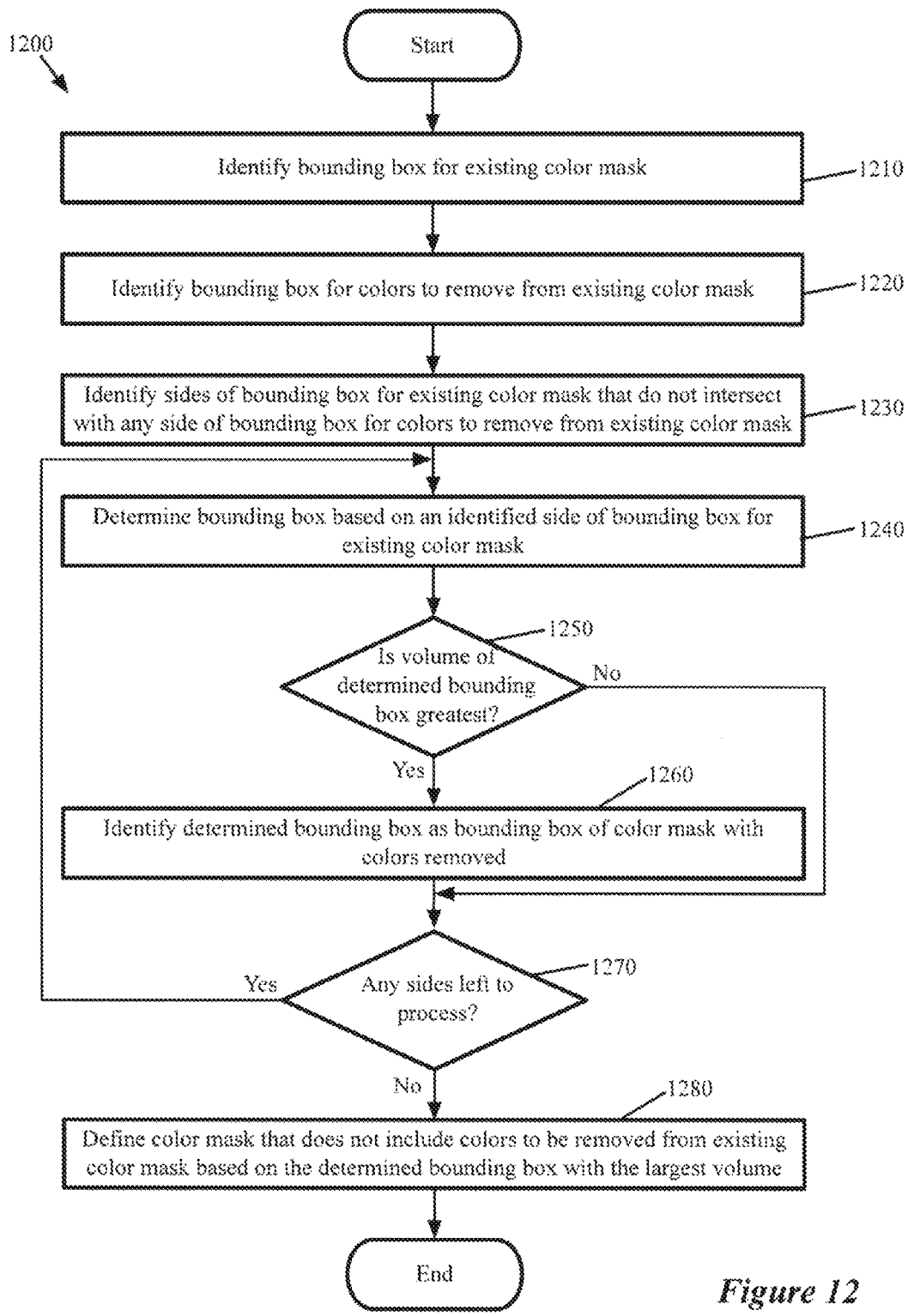
FIG. 12 conceptually illustrates a process of some embodiments for defining a color mask after colors are removed from an existing color mask.

FIG. 12 conceptually illustrates a process 1200 of some embodiments for defining a color mask after colors are removed from an existing color mask. In some embodiments, the process 1200 is performed by the color masking tool of some embodiments when the color masking tool (or the application that provides the color masking tool) receives a selection of a portion of an image to remove colors from a color mask.

Figure 14:
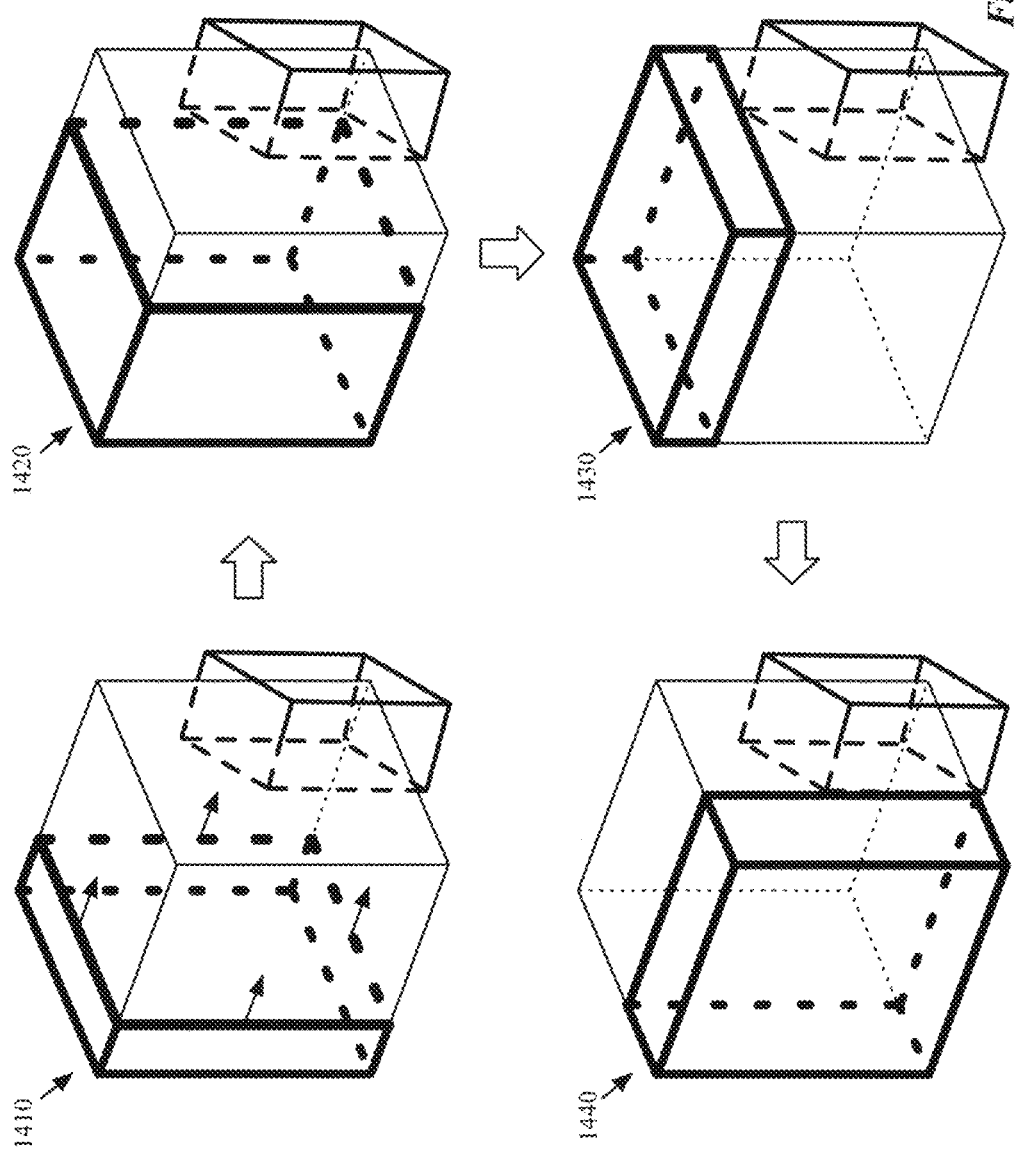
FIG. 14 conceptually illustrates the determination of a new bounding box according to some embodiments of the invention.
Figure 15:
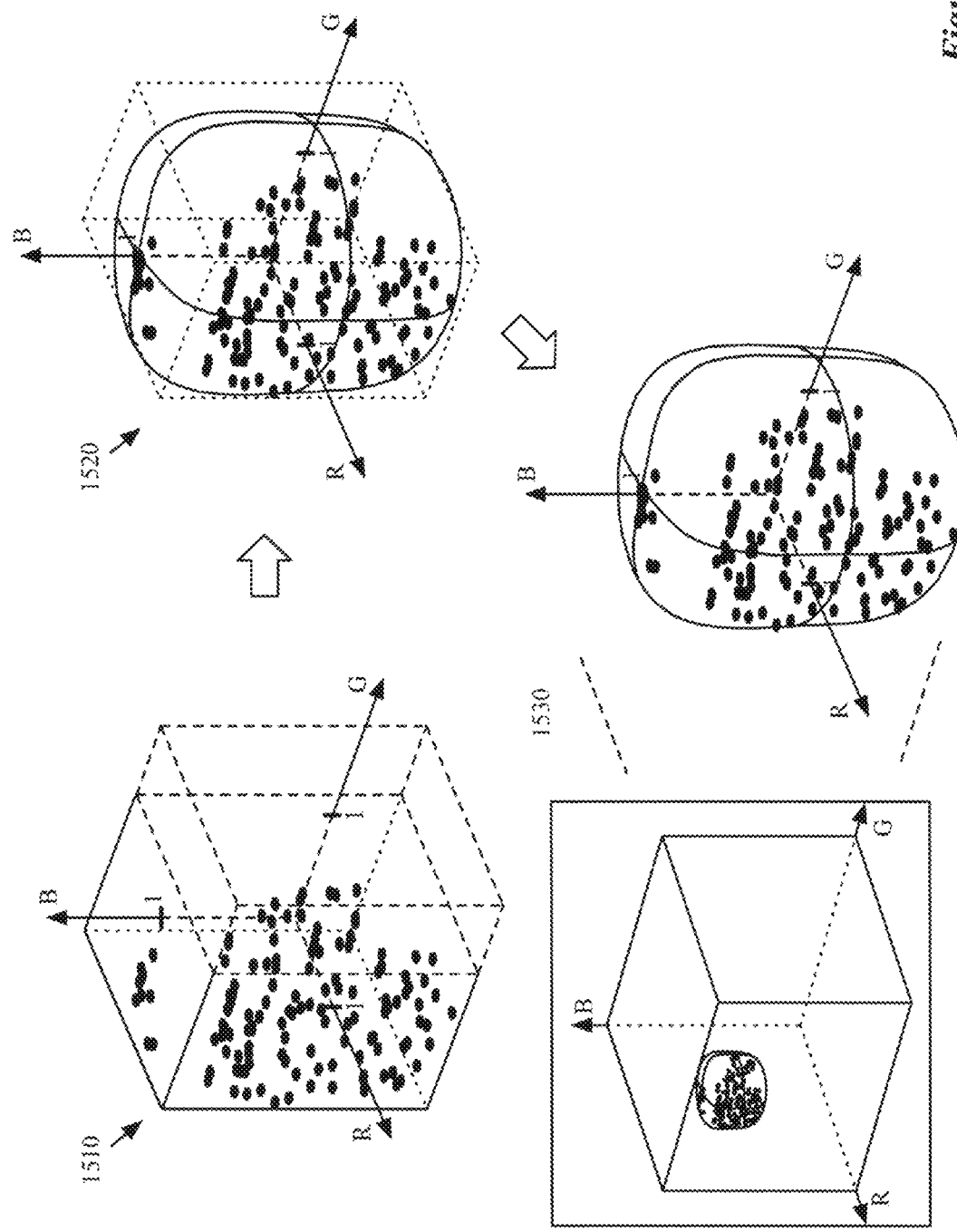
FIG. 15 conceptually illustrates the determination of a superellipse-based shaped based on the bounding box illustrated in FIG. 14 according to some embodiments of the invention.

The process 1200 will be described by reference to FIGS. 13-15, which conceptually illustrate various states of a three-dimensional RGB color space that is used to define a superellipsoid for a color mask. In particular, FIG. 13 conceptually illustrates five different stages 1310-1350 of determining a bounding box in the three-dimensional RGB color space. FIG. 14 conceptually illustrates four different stages 1410-1440 of determining the bounding box in the three-dimensional RGB color space. FIG. 15 conceptually illustrates three different stages 1510-1530 of defining a superellipsoid in a BCS coordinate system based on the bounding box determined in FIGS. 13 and 14.

The process 1200 begins by identifying (at 1210) the bounding box of the existing color mask in the three-dimensional color space. In some embodiments, the process 1200 identifies the bounding box of the existing color mask based on the bounding box identified for the color mask in a BCS coordinate system (e.g., by the process 700). In such embodiments, a set of transforms for mapping the bounding box in the BCS coordinate system is applied to the bounding box in the BCS coordinate system in order to identify the corresponding bounding box in the three-dimensional RGB color space.

Figure 13:
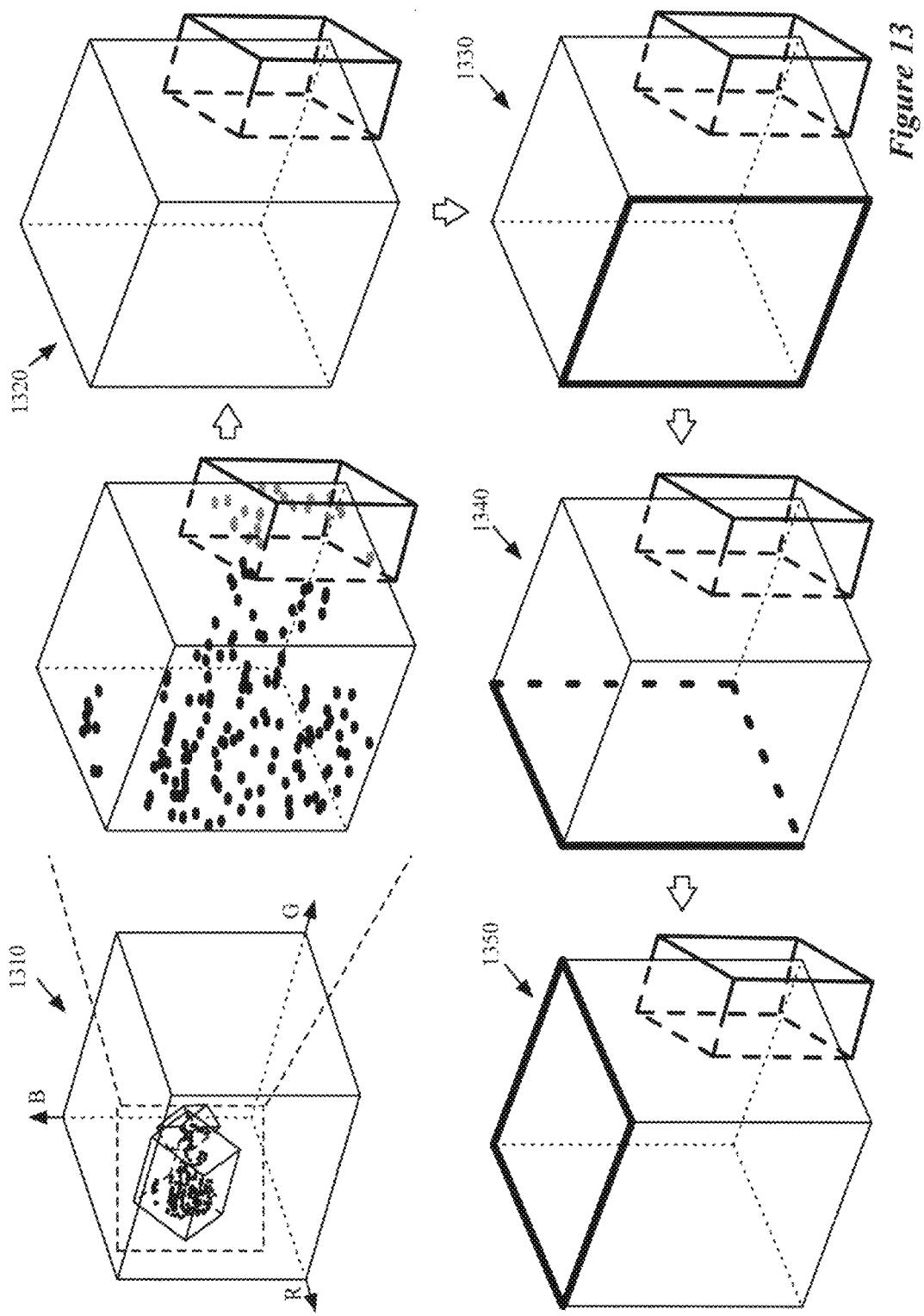
FIG. 13 conceptually illustrates the determination of intersections between bounding boxes in a three-dimensional color space according to some embodiments of the invention.

Referring to FIG. 13, the first stage 1310 illustrates a set of points plotted in a three-dimensional RGB color space. In particular, this set of points is the same set of points shown in the second state 420 of a three-dimensional RGB color space of FIG. 4. As described above, the second state 420 of the three-dimensional color space corresponds to the second stage 320 illustrated in FIG. 3. As mentioned above, the second stage 320 illustrates that the user has selected the portion of the image 190 below the right side of the right mountain in order to remove colors from the existing color mask. As such, the set of points illustrated in the first stage 1310 represents the RGB component values of the pixels in the image 190 that were selected in the second stage 120, the fourth stage 140, and the second stage 320. As shown, several points on the right side of the plotted points are grayed out, which correspond to the RGB component values of the pixels in the portion of the image 190 that was selected in the second stage 320.

Next, the process 1200 identifies (at 1220) a bounding box that includes the pixel values of pixels of colors that are to be removed from the existing color mask. Referring to FIG. 13 as an example, the first stage 1310 illustrates a bounding box, which includes the RGB component values of pixels in the image that are to be removed from the existing color mask, identified by the process 1200. In some embodiments, the process 1200 identifies the bounding box by performing the process 700, which is described above by reference to FIG. 7. The second stage 1320 of FIG. 13 illustrates the two bounding boxes without the pixel values for the sake of clarity.

The process 1200 then identifies (at 1230) sides of the bounding box for the existing color mask that do not intersect with any side of the bounding box for the pixel values to be removed from existing the color mask. In some embodiments, the process 1200 determines these sides by performing a process for detecting intersections such as the process 1600, which is described in more detail below by reference to FIG. 16.

In FIG. 13, the third through fifth stages 1330-1350 illustrate the sides of the bounding box for the existing color mask, which are indicated by a bolding of the border of each of the sides, that the process 1200 has identified as not intersecting with any side of the bounding box for the colors to be removed from the existing color mask.

Next, the process 1200 determines (at 1240) a bounding box based on an identified side of the bounding box for the existing color mask. In some embodiments, the process 1200 determines a bounding box that includes the identified side by iteratively increasing the size of the bounding box in the direction away from the identified face until the bounding box cannot be increased any further without intersecting a side of the bounding box for the colors to be removed from the existing color space.

Referring to FIG. 14 as an example, the first stage 1410 illustrates the process 1200 in the middle of iteratively increasing the size of a bounding box that includes an identified face of the bounding box for the existing color mask. As shown, the size of the bounding box is being iteratively increased in the direction away from the identified side. The second stage 1420 of FIG. 14 illustrates the bounding box, which is indicated by a bolding of the bounding box's borders, identified by the process 1200 for the identified side of bounding box for the existing color mask illustrated in the first stage 1410. As shown, the bounding box cannot be increased any further without intersecting a side of the bounding box for the colors to be removed from the existing color space.

The process 1200 then determines (at 1250) whether the volume of the determined bounding box is the largest volume. When the process 1200 determines that the volume of the determined bounding box is the largest volume, the process 1200 identifies (at 1260) the determined bounding box as the bounding box of the color mask that does not include the colors that are to be removed. When the process 1200 determines that the volume of the determined bounding box is not the largest volume, the process 1200 proceeds to operation 1270.

Next, the process 1200 determines (at 1270) whether any identified side of the bounding box for the existing color mask is left to process. When the process 1200 determines that there is an identified side of the bounding box for the existing color mask left to process, the process 1200 returns to the operation 1240 to continue processing any remaining identified sides of the bounding box for the existing color mask. Otherwise, the process 1100 ends.

Referring to FIG. 14, the third and fourth stages 1430 and 1440 illustrate the determined bounding boxes that include the other sides of the bounding box for the existing color mask that do not intersect the bounding box for the colors to be removed from the color mask. In this example, the process 1200 has identified the determined bounding box illustrated in the second stage 1420 since that determined bounding box has the largest volume among the three determined bounding boxes.

Finally, the process 1200 defines (at 1280) a color mask that does not include colors that are to be removed from the existing color mask based on the determined bounding box that the process 1200 determined has the largest volume. In some embodiments, the color mask is defined using the process 700, which is described above by reference to FIG. 7.

Continuing with the example, the first stage 1510 of FIG. 15 illustrates the determined bounding box that the process 1200 has identified as having the largest volume among the other determined bounding boxes with respect to the bounding box of the exiting color space. The process 1200 uses this bounding box to define the color mask that does not include the colors that are to be removed from the existing color mask. As mentioned, some embodiments define such a color mask using the process 700. The second and third stages 1520 and 1530 illustrate a superellipsoid defined in a BCS coordinate system according to the process 700. The third stage 1530 also shows the corresponding superellipsoid defined in the three-dimensional RGB color space for the color mask.

Figure 16:
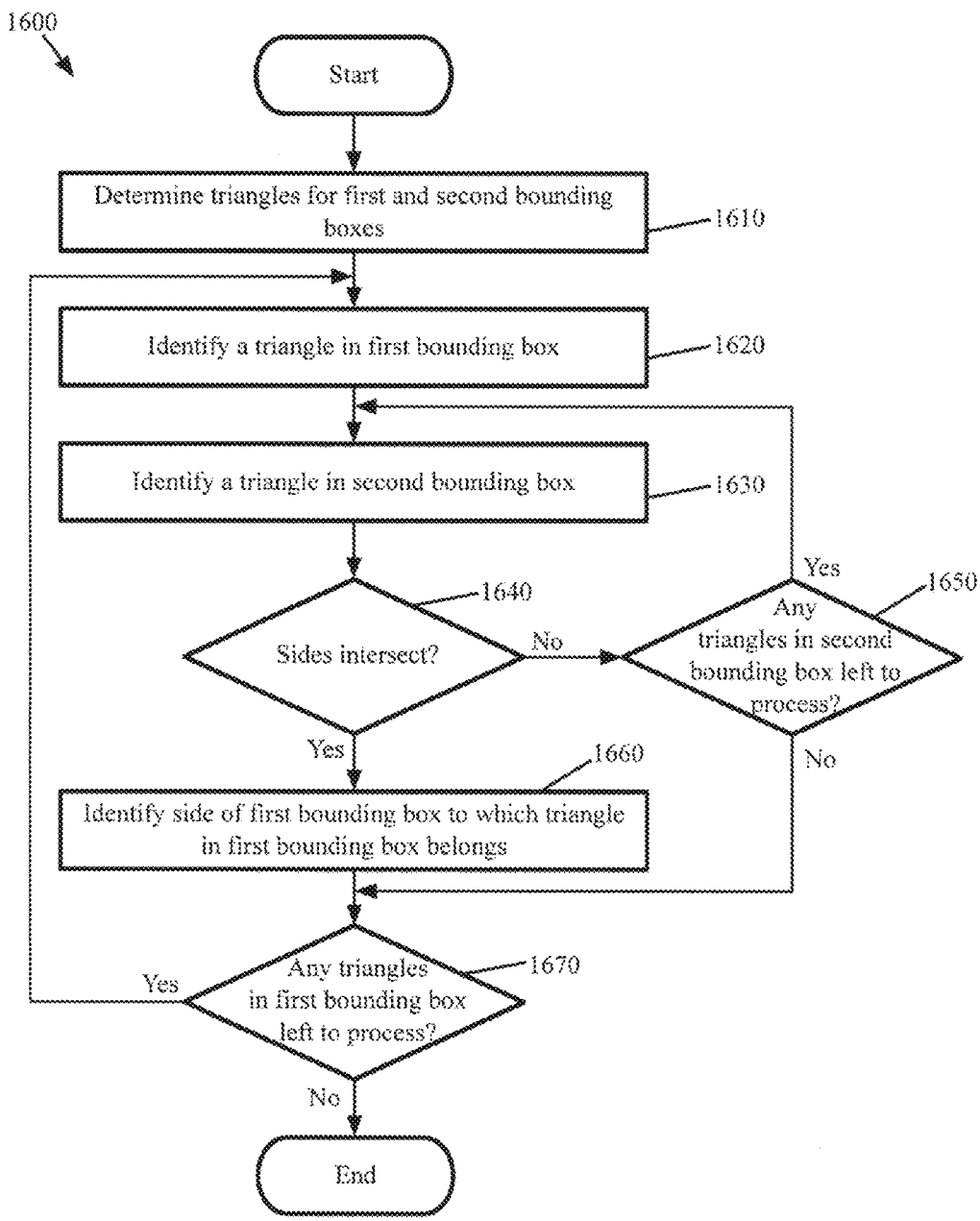
FIG. 16 conceptually illustrates a process of some embodiments for detecting intersections among between two triangles in a three-dimensional space.

FIG. 16 conceptually illustrates a process 1600 of some embodiments for detecting intersections between two triangles in a three-dimensional space. In some embodiments, the process 1600 is performed by the color masking tool to determine which sides of a bounding box intersect with a side of another bounding box when defining a color mask after colors are removed from an existing color mask. In this manner, the color masking tool can determine which sides of the bounding box do not intersect with any side of the other bounding box.

The process 1600 will be described by reference to FIGS. 17 and 18, which conceptually illustrate various states of detecting intersections between sides of the bounding boxes illustrated in FIG. 13. In particular, FIG. 17 conceptually illustrates four different stages 1710-1740 of determining sides of the bounding boxes that do not intersect. For the purpose of clarity, the second and third stages 1720 and 1730 show the bounding boxes separated. However, the bounding boxes are actually positioned as illustrated in the first stage 1710. FIG. 18 conceptually illustrates six different stages 1810-1860 of determining sides of the bounding boxes that do intersect. Similarly, for the purpose of clarity, the first through sixth stages 1810-1860 show the bounding boxes separated. However, the bounding boxes are actually positioned as illustrated in top section of the first stage 1810.

As shown, the process 1600 starts by determining (at 1610) a set of triangles for each of a first bounding box and a second bounding box. In some embodiments, the process 1600 identifies the set of triangles for a bounding box by identifying the sides of the bounding box and splitting each side into two triangles.

Figure 17:
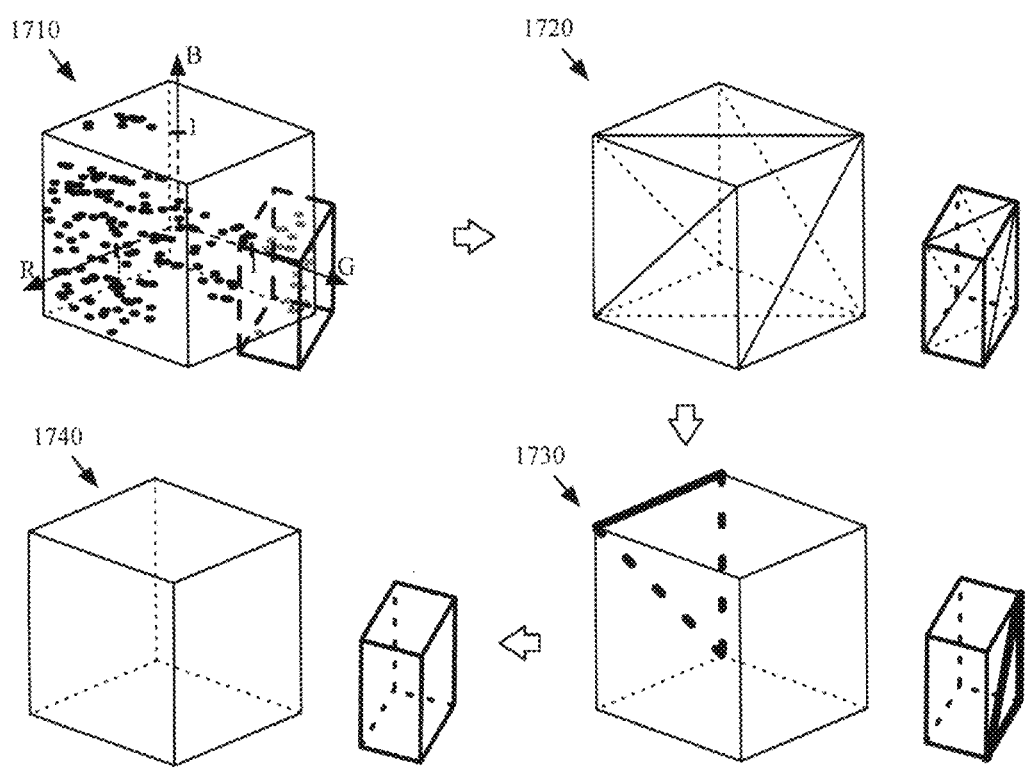
FIG. 17 conceptually illustrates the determination of intersections between the bounding boxes illustrated in FIG. 13 according to some embodiments of the invention.
Figure 18:
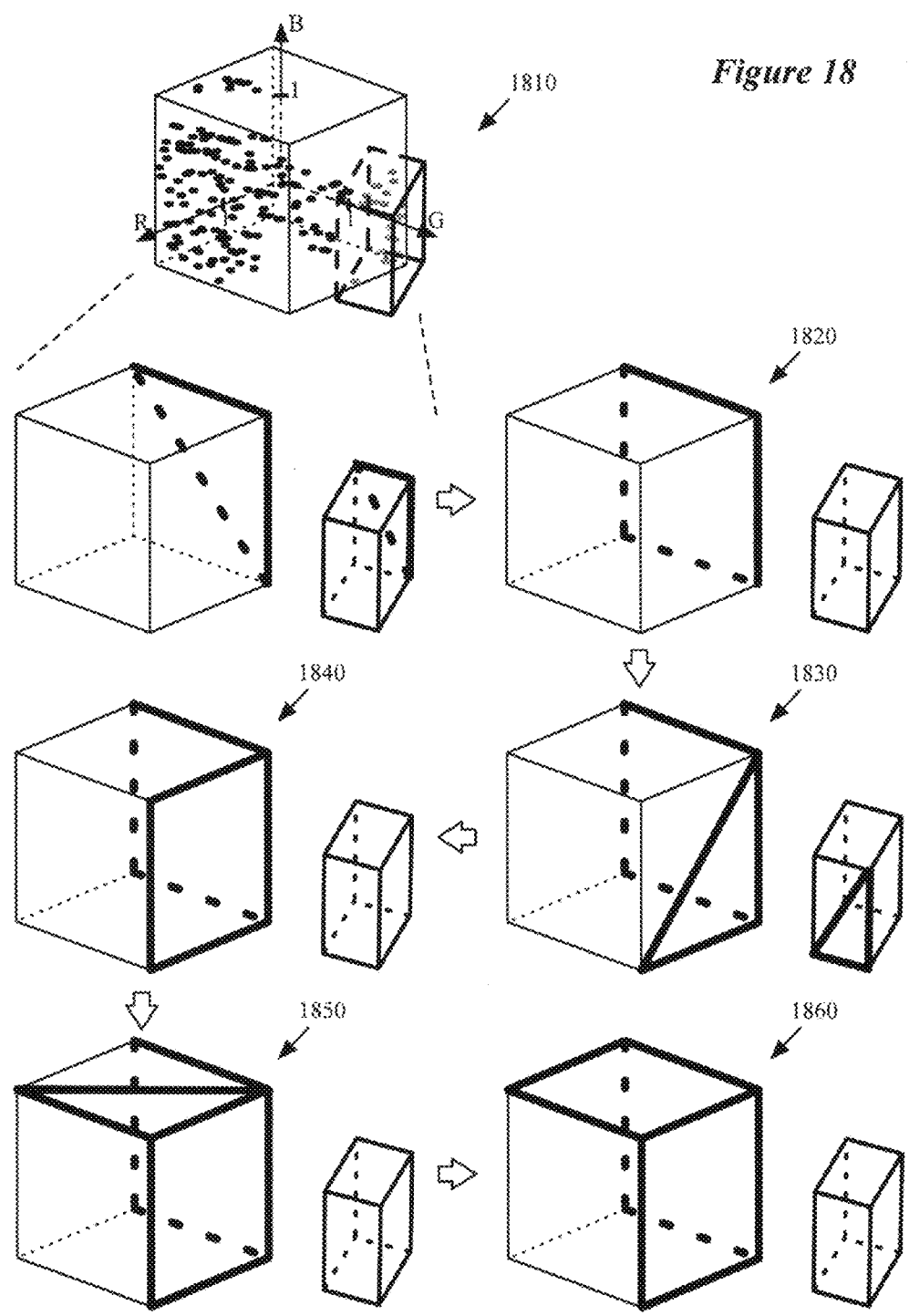
FIG. 18 conceptually illustrates the determination of intersections between the bounding boxes illustrated in FIG. 13 according to some embodiments of the invention.

Referring to FIG. 17, the first stage 1710 illustrates the first stage 1310 illustrated in FIG. 13. As described above, the first stage 1310 illustrates a set of points plotted in a three-dimensional RGB color space. In particular, this set of points is the same set of points shown in the second state 420 of a three-dimensional RGB color space of FIG. 4. As described above, the second state 420 of the three-dimensional color space corresponds to the second stage 320 illustrated in FIG. 3. As mentioned above, the second stage 320 illustrates that the user has selected the portion of the image 190 below the right side of the right mountain in order to remove colors from the existing color mask. As such, the set of points illustrated in the first stage 1310 represents the RGB component values of the pixels in the image 190 that were selected in the second stage 120, the fourth stage 140, and the second stage 320. As shown, several points on the right side of the plotted points are grayed out, which correspond to the RGB component values of the pixels in the portion of the image 190 that were selected in the second stage 320.

The second stage 1720 illustrates the bounding boxes illustrated in the first stage 1710 after the process 1600 has determined the set of triangles for each of the bounding boxes. In this example, the bounding box for the existing color mask is referred to as the first bounding box and the bounding box for the colors to be removed from the existing color mask is referred to as the second bounding box.

The process 1600 then identifies (at 1620) a triangle in the first bounding box and identifies (at 1630) a triangle in the second bounding box. Next, the process 1600 determines (at 1640) whether the identified sides intersect. Different embodiments use different techniques to determine whether the identified sides intersect. For instance, some embodiments use a fast triangle-triangle intersection test by Tomas Möller. Other embodiments may use other techniques as well.

When the process 1600 determines that the identified triangles do not intersect, the process 1600 determines (at 1650) whether any triangle in the second bounding box is left to process. Referring to FIG. 17, the third stage 1730 illustrates an example of when two triangles do not intersect. As shown in the third stage 1730, an identified triangle, which is indicated by a bolding of the border of the triangle, in the bounding box for the existing color mask and an identified triangle, which is also indicated by a bolding of the border of the triangle, in the bounding box for the colors to be removed from the existing color mask do not intersect. As noted above, the bounding boxes are shown separately for the sake of clarity. When the process 1600 determines that there is a triangle in the second bounding box left to process, the process 1600 returns to the operation 1630 to process any remaining triangles in the second bounding box. Otherwise, the process 1600 proceeds to operation 1670.

When the process 1600 determines that the identified triangles do intersect, the process 1600 identifies (at 1660) the side of the first bounding box to which the identified triangle for the first bounding box belongs. Then, the process 1600 proceeds to the operation 1670. Referring to FIG. 18, the first through sixth stages 1810-1860 illustrate several examples where an identified triangle in the bounding box for the existing color mask and an identified triangle in the bounding box for the colors to be removed from the existing color mask intersect. As mentioned above, the bounding boxes are shown separately for the sake of clarity. In particular, each pair of triangles that process 1600 identifies as intersecting is followed by a stage illustrating the side of the bounding box for the existing color mask to which the triangle for the bounding box belong (e.g., stages 1820, 1840, and 1860).

At 1670, the process 1600 determines whether any triangle in the first bounding box is left to process. When the process 1600 determines that there is triangle in the first bounding box left to process, the process 1600 returns to the operation 1620 to process any remaining triangles in the first bounding box against the triangles in the second bounding box. When the process 1600 determines that there is no triangle in the first bounding box left to process, the process 1600 ends.

C. Defining a Transition Region for a Color Mask

As mentioned above, some embodiments of the color masking tool define an offset portion of the three-dimensional color space (e.g., a transition region) that encompasses, but does not include, the first portion (or modified first portion) of the three-dimensional color space. The offset portion of some embodiments is a scaled version of the first portion (or modified first portion) of the three-dimensional color space. In some embodiments, the offset portion is scaled such that, for each point on the surface of the offset portion, a distance from the point on the surface of the offset portion to a corresponding point on the surface of the first portion (or modified first portion) is the same distance.

Figure 19:
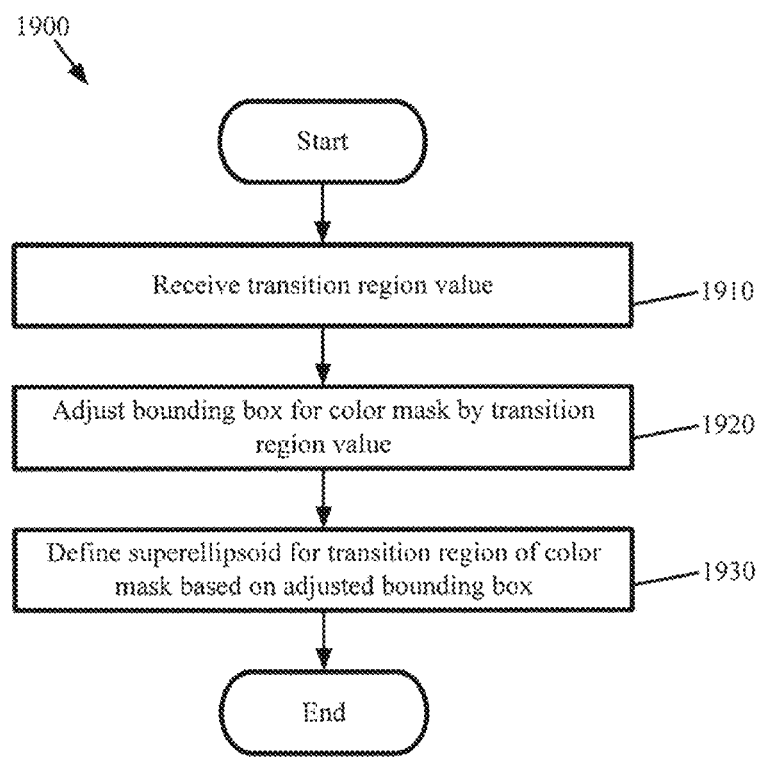
FIG. 19 conceptually illustrated a process of some embodiments for defining a transition region for a color mask.

FIG. 19 conceptually illustrates a process 1900 of some embodiments for defining a transition region for a color mask. In some embodiments, the process 1900 is performed by the color masking tool of some embodiments when the color masking tool (or the application that provides the color masking tool) receives a selection of transition region value (e.g., through a slider control of a GUI).

Figure 20A:
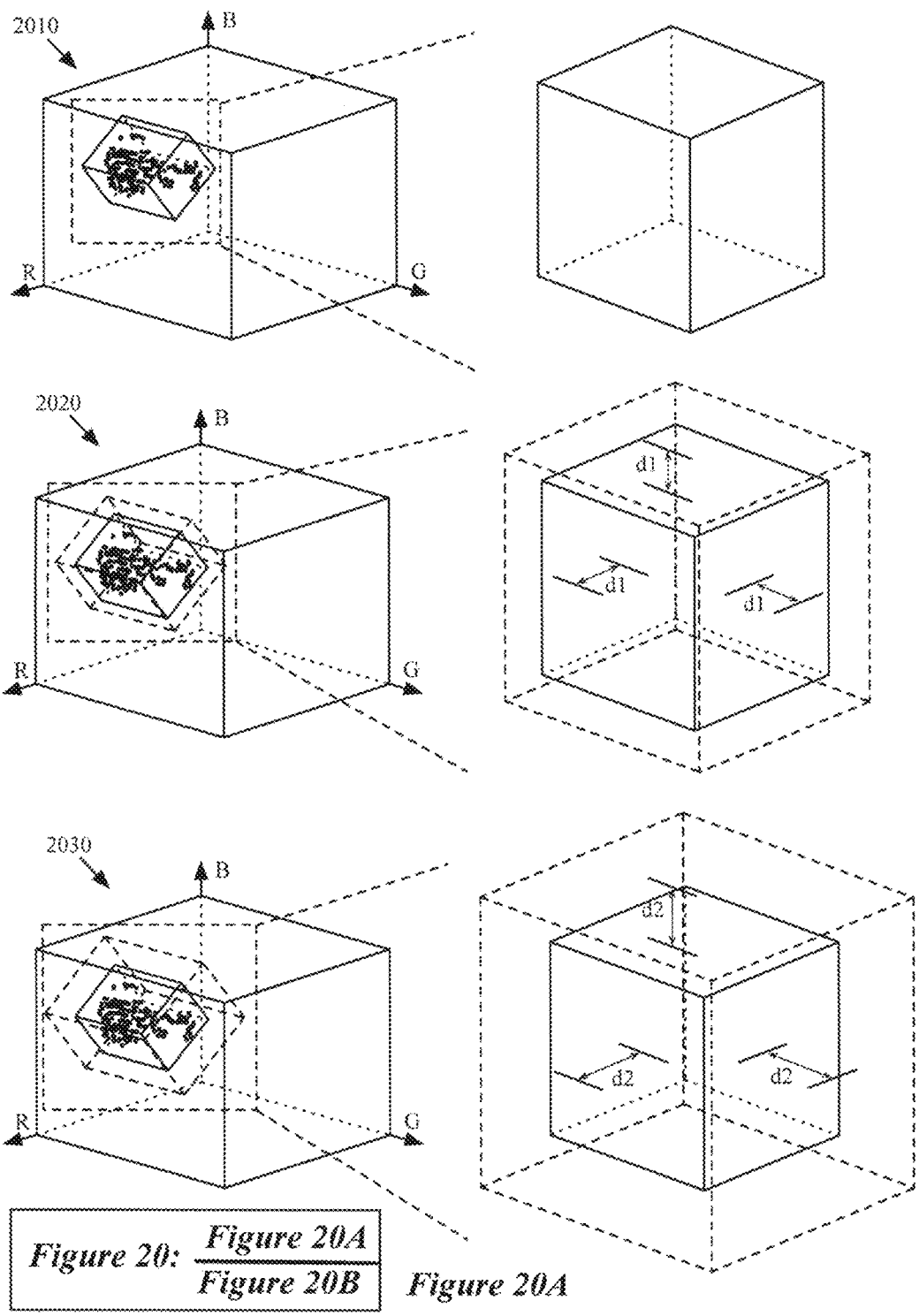
FIG. 20A conceptually illustrates several examples of transition regions defined in a three-dimensional RGB color space according to some embodiments of the invention.

The process 1900 will be described by reference to FIGS. 20A and 20B, which conceptually illustrates various states of defining a transition region in a three-dimensional color space. In particular, FIG. 20A conceptually illustrates several examples of transition regions defined in a three-dimensional RGB color space. FIG. 20B conceptually illustrates two-dimensional views of the defined transition regions illustrated in FIG. 20A.

The process 1900 begins by receiving (at 1910) a transition region value. In some embodiments, the process 1900 receives the transition region value through a GUI of a media-editing application that provides the color masking tool. For instance, some of these embodiments receive the transition region value through a slider control, such as the one illustrated in FIG. 5. Different embodiment define transition region values differently. For example, some embodiments define transition region values as a percentage of the bounding box used to define the superellipsoid for the color mask while other embodiments define transition region values as an offset value.

Next, the process 1900 adjusts (at 1920) the bounding box used to define the superellipsoid for the color mask by the transition region value. In some embodiments, the process 1900 adjusts a copy of the bounding box used to define the superellipsoid for the color mask in order to preserve the bounding box for the color mask. The process 1900 of some embodiments adjusts the bounding box for the transition region by scaling the bounding box such that each side of the bounding box for the transition region is offset a same amount from the corresponding side of the bounding box for the color mask. The amount of the offset corresponds to the transition region value in some embodiments. For example, some embodiments scale by a larger offset amount as the transition region value increases and scale by a smaller offset amount as the transition region value decreases.

Finally, the process 1900 defines (at 1930) a superellipsoid for a transition region of the color mask based on the adjusted bounding box. Some embodiments of the process 1900 define the superellipsoid for the transition region of the color mask based on an equation that is similar to the above equation (2). As mentioned above, the superellipsoid for the transition region is a scaled version of the superellipsoid in the three-dimensional color space defined for the color mask and the offset portion is scaled so that, for each point on the surface of the offset portion, a distance from the point on the surface of the offset portion to a corresponding point on the surface of the portion defined for the color mask is the same distance.

As noted above, FIG. 20A illustrates several examples of bounding boxes defined in a three-dimensional RGB color space from which transition regions are defined in the three-dimensional RGB color space. Specifically, FIG. 20A illustrates three states 2010-2030 of the three-dimensional RGB color space in which different bounding boxes are defined from which transition regions are defined. In addition, these different transition regions are defined for the color mask defined in the fifth stage 150 of FIG. 1. Each of the three states 2010-2030 also illustrates an enlarged version of the bounding box defined for the color mask and the bounding box defined for the transition region of the color mask.

The first state 2010 illustrates the three-dimensional RGB color space without a transition region defined for the color mask. In particular, the first state 2010 illustrates the three-dimensional RGB color space in the same state as the four state 240 illustrated in FIG. 2.

The second state 2020 illustrates a transition region defined in the three-dimensional RGB color space. As shown in the enlarged version of the bounding boxes, each side of the bounding box for the transition region is scaled by an offset amount, d1, from the corresponding side of the bounding box for the color mask.

The third state 2030 illustrates another transition region defined in the three-dimensional RGB color space. The third state 2030 similarly shows an enlarged version of the bounding boxes, except each side of the bounding box for the transition region is scaled by a larger offset amount, d2, from the corresponding side of the bounding box for the color mask.

FIG. 20A illustrates transition regions, in a three-dimensional RGB color space, with sides that are offset an equal amount from the corresponding sides of a bounding box. To illustrate the equal offset of the transition regions from the bounding box in more detail, FIG. 20B conceptually illustrates two-dimensional views of the defined transition regions illustrated in FIG. 20A. Specifically, FIG. 20B shows two-dimensional views of one of the sides of the transition regions and bounding box illustrated in states 2020 and 2030 of FIG. 20A.

As shown, the two-dimensional view of one of the sides of the transition region and the bounding box in the state 2020 is shown in the upper portion of FIG. 20B. The solid rectangle corresponds to a side of the bounding box and the dashed rectangle corresponds to the corresponding side of the transition region. As illustrated in FIG. 20B, each side of the transition region is offset an amount d1 from the corresponding side of the bounding box in the state 2020.

FIG. 20B also illustrates the two-dimensional view of one of the sides of the transition region and the bounding box in the state 2030 in the lower portion of FIG. 20B. Similarly, the solid rectangle corresponds to a side of the bounding box and the dashed rectangle corresponds to the corresponding side of the transition region. As shown, each side of the transition region is offset an amount d2 from the corresponding side of the bounding box in the state 2030.

As explained above, some embodiments of the color masking tool define a color mask for a particular frame of a video clip and associates the color mask with the rest of the frames in the video clip. Similarly, a transition region defined for the color mask is also associated with the rest of the frames in the video clip in some of these embodiments. For instance, a user may create a color mask for a frame of a video clip, define a transition region for the color mask, and invoke a color correction operation on the frame of the video clip. When the user invokes the color correction operation on the frame, the color masking tool of some embodiments applies the color correction to the frame using the color mask and the transition region, and automatically applies the color correction to each of the other frames in the video clip using the color mask and the transition region.

D. Image Processing

When using the color mask to apply a color correction operation to a portion of an image, sharp cutoffs may exist between pixels that have colors included in the color mask (to which the color correction operation is applied) and pixels that have colors that are similar to the pixels included in the color mask, but are not included in the color mask (to which the color correction operation is not applied). As such, some embodiments of the color masking tool define a transition region for the color mask to smooth out such sharp cutoffs.

As described above, the transition region of some embodiments specifies a set of pixels in the image that has color values that are similar to the color values of the pixels included in the color mask, but is not included in the color mask. Pixels in the image that are included in the transition region are partially selected pixels and pixels in the image that are included in the color mask are fully selected pixels, in some embodiments. Accordingly, a color correction operation that is applied to the image is fully applied to fully selected pixels and partially applied to partially selected pixels. In this fashion, the transition between pixels in the image to which the color correction operation is applied and pixels in the image to which the color correction operation is not applied is smoothed. The following FIG. 21 will describe an example GUI of a media-editing application that provides a color masking tool of some embodiments.

Figure 21A:
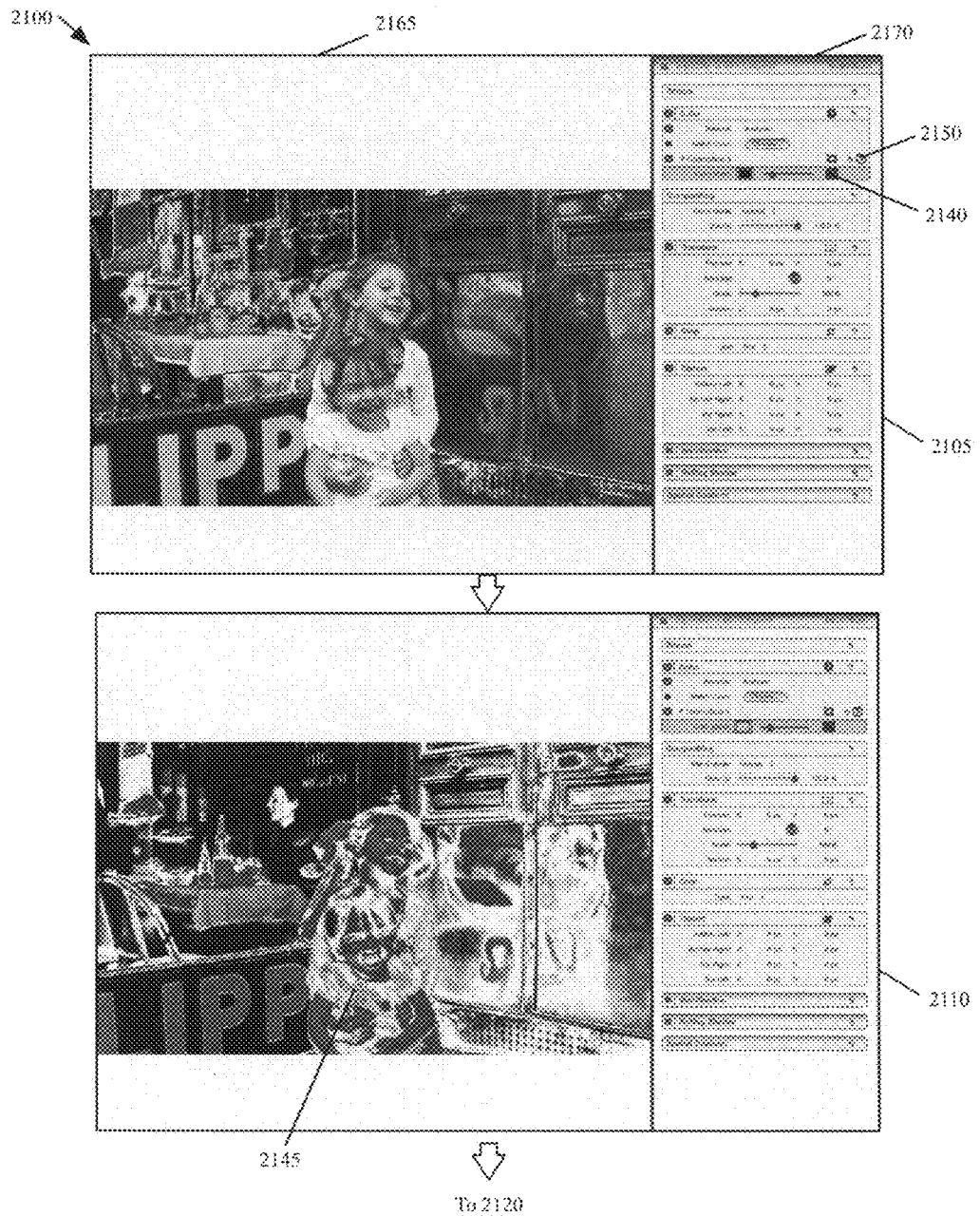
FIG. 21 conceptually illustrates a graphical user interface (GUI) of a media-editing application of some embodiments of the invention that provides a color masking tool.
Figure 21B:
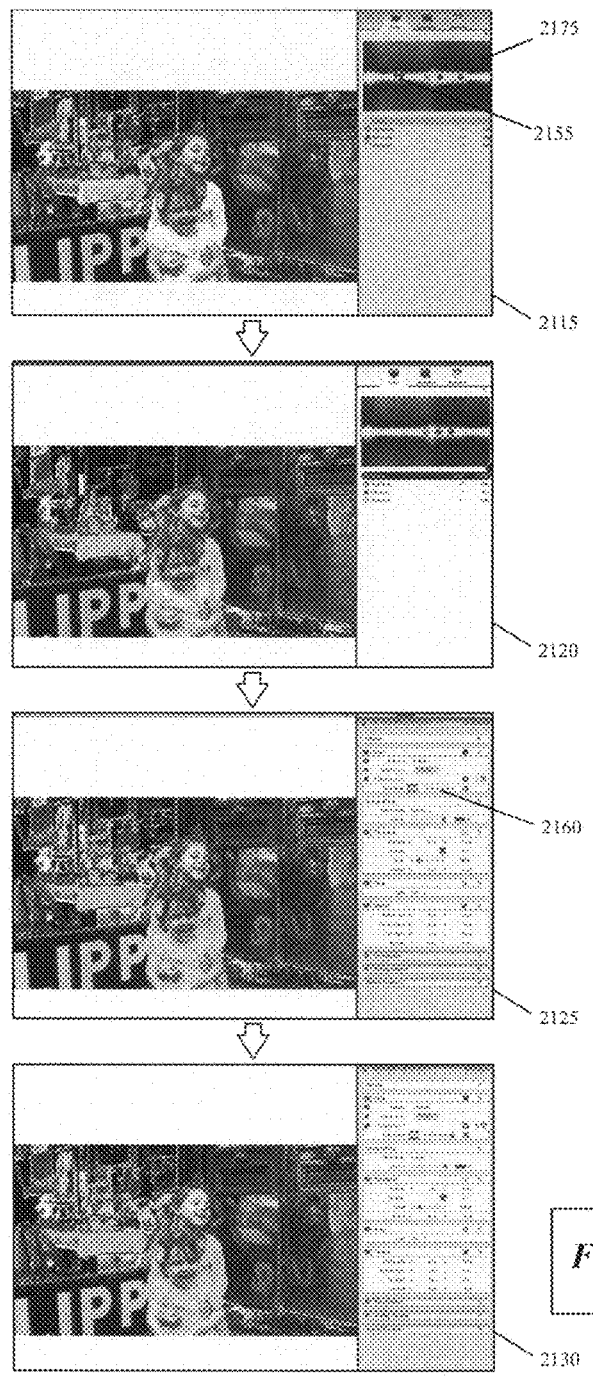

FIG. 21 conceptually illustrates a GUI 2100 of a media-editing application that provides a color masking tool of some embodiments. In particular, FIG. 21 illustrates the GUI 2100 at six stages 2105-2130 of a color masking operation of the color masking tool that defines a transition region for a color mask. As described above, the GUI 2100 includes an image display area 2165 and an adjustments panel 2170.

The image display area 2165 is for displaying a still image or a frame in a video clip. The adjustments panel 2170 allows a user of the media-editing application to activate color correction tools for performing color correction operations on the image or frame of the media clip. As shown, the adjustments panel 2170 includes a user-selectable UI item 2140 for activating a color masking tool of some embodiments, a user-selectable UI item 2150 for activating a color board tool for adjusting colors of pixels in the image, and a user-adjustable slider control 2160 for adjusting a transition region for a color mask.

The slider control 2160 is a conceptual illustration of one or more UI items that allows a transition region operation to be invoked (e.g., by a cursor operation such as clicking a mouse button and dragging the mouse, tapping a touchpad and dragging across the touchpad, or touching the slider control displayed on a touchscreen and dragging across the touchscreen). When the transition region operation is invoked, the color masking tool defines a transition region for a color mask based on the position of the slider indicator on the slider control 2160. In some embodiments, different positions of the slider indicator along the slider control 2160 corresponds to different transition region values (e.g. offset values).

Different embodiments of the user-adjustable slider control 2160 define the position of the slider indicator along the slider control 2160 differently. In the following example, the leftmost position on the slider control 2160 does not define a transition region. However, in some embodiments of the slider control 2160, the leftmost position on the slider control 2160 specifies a default transition region. As the position on the slider control 2160 moves from left to right, the transition region increases.

Different embodiments implement the slider control 2160 differently. Some such embodiments implement the slider control 2160 as a textbox (in which a user can input values that correspond to the size of the transition region) while other embodiments implement the slider control 2160 as a menu selection command that can be selected through a pull-down, a drop-down, or a pop-up menu. Still other embodiments implement the slider control 2160 as a keyboard command that can be invoked through one or more keystrokes or a series of keystrokes. Yet other embodiments allow the user to invoke the transition region operation through two or more of such UI implementations or other UI implementations.

The operation of the GUI 2100 will now be described by reference to the state of this GUI 2100 during the six different stages 2105-2130 that are illustrated in FIG. 21. The first stage 2105 illustrates that a user has activated the color masking tool by selecting the user-selectable UI item 2140 (e.g., by performing a cursor operation such as clicking a mouse button, tapping a touchpad, or touching a touchscreen). As shown in the first stage 2105, the image display area 2165 displays an image of two children.

The second stage 2110 illustrates the GUI 2100 after a color mask has been created based on the portion of the image selected using a selection tool 2145. In this example, the user has selected a portion of one of the children's shirts with the selection tool 2145 to create a color mask. As such, the portion of the image (i.e., pixels) displayed in the image display area 2165 that is specified as being included in the color mask is indicated by a highlighting of the portion in order to provide the user with a visual indication of the portion of the image that is included in the color mask. In particular, the shirts of the two children and various other regions of the image that have the same or similar color as the shirts are highlighted. In some embodiments, the media-editing application displays the highlighting after the media-editing application defines the color mask.

The third stage 2115 illustrates that the user has activated the color board tool of some embodiments by selecting the user-selectable UI item 2150 (e.g., by performing a cursor operation such as clicking a mouse button, tapping a touchpad, or touching a touchscreen). As shown, the third stage 2115 displays color board 2175 for adjusting colors of the pixels in the image. In some embodiments, when the media-editing application receives the selection of the UI item 2150, the media-editing application displays the color board 2175 in the adjustments panel 2170.

As illustrated in the third stage 2115, the color board 2175 includes several sliders that can be movably positioned within the color board 2175 to adjust colors of pixels in the image. Different locations on the color board 2175 correspond to different colors. In this example, the color board includes a slider 2155 for adjusting the colors of all pixels in the image.

The fourth stage 2120 illustrates that the user has positioned the slider 2155 in the lower right hand corner of the color board 2175. In this example, that portion of the color board 2175 corresponds to a red color. Accordingly, the pixels in the image that are included in the color mask (i.e., the shirts of the two children and various other regions of the image that have the same or similar color as the shirts) are adjusted to the color of the pixels with the corresponding red color.

The fifth stage 2125 illustrates that the user has moved the slider indicator of the slider control 2160 to the middle of the slider control 2160 (e.g., by performing a cursor operation such as clicking a mouse button and dragging the mouse, tapping a touchpad and dragging across the touchpad, or touching the slider control displayed on a touchscreen and dragging across the touchscreen) in order to invoke a transition region operation. In some embodiments, the color masking tool defines the transition region when the media-editing application receives the movement of the slider indicator on the slider control 2160.

Additionally, the fifth stage 2125 illustrates that a transition region for the color mask has been defined based on the position of the slider indicator on the slider control 2160. In this example, the transition region includes pixels in the image that are similar to the color of the pixels included in the color mask, but are not included in the color mask. When the transition region has been defined, the media-editing application of some embodiments applies the color adjustment illustrated in the fourth stage 2120 to pixels in the image that were not included in the color mask, but are now included in the transition region.

The sixth stage 2130 illustrates that the user has moved the slider indicator near the right side of the slider control 2160 (e.g., by performing a cursor operation such as clicking a mouse button and dragging the mouse, tapping a touchpad and dragging across the touchpad, or touching the slider control displayed on a touchscreen and dragging across the touchscreen) and that the transition region for the color mask has been redefined based on the position of the slider indicator on the slider control 2160.

In the sixth stage 2130, the transition region defined in the fifth stage 2125 has increased. That is, the transition region now includes pixels in the image that are similar to the color of the pixels included in the color mask and the transition region defined in the fifth stage 2125, but are not included in the color mask and the transition region defined in the fifth stage 2125. When the transition region has been redefined, the media-editing application of some embodiments applies the color adjustment illustrated in the fourth stage 2120 to pixels in the image that were not included in the color mask and the transition region defined in the fifth stage 2125, but are now included in the transition region.

II. Shape Mask

Some embodiments of the invention provide a novel shape masking tool for a media-editing application. The shape masking tool of some embodiments provides a shape mask for identifying a region in an image. In some embodiments, a shape mask is a manipulatable two-dimensional shape that is displayed over the image in order to identify the region in the image that is within the two-dimensional shape. In other words, the shape mask is for identifying pixels in the image that are located within the two-dimensional shape. Some embodiments of the shape masking tool apply color correction operations (e.g., invoked by a user through selection of a GUI item provided by the media-editing application) to the region in the image by using the shape mask to isolate pixels in the image that are located within the shape mask and applying color correction operations (e.g., hue adjustments, saturation adjustments, brightness adjustments, etc.) to the isolated pixels.

The shape masking tool of some embodiments allows a user of the shape masking tool to manipulate the shape mask into a plethora of different shapes and sizes. This way, the user may use a single masking tool to identify a variety of different regions (e.g., faces, buildings, people, etc.) of different shapes and sizes in an image. Different embodiments of the shape masking tool allow the user to manipulate the shape mask in different ways. For instance, some embodiments allow the user to adjust the shape of a shape mask, adjust the curvature of a shape mask, adjust the size of a shape mask, and move the shape mask with respect to the image. Other embodiments may allow the user to adjust the shape mask in additional and/or different ways as well.

In some embodiments, the shape masking tool provides a set of user-selectable GUI controls, which is displayed along with the shape mask over an image, for performing manipulations to the shape mask. The set of GUI controls includes, in some of these embodiments, GUI controls for adjusting the shape of the shape mask, GUI controls for adjusting the curvature of the shape mask, GUI controls for adjusting the size of the shape mask, and GUI controls for moving the shape mask with respect to the image.

Some embodiments of the shape masking tool provide a shape mask that is for identifying a first region and a second region in an image. The shape mask of some of these embodiments is a pair of differently-sized, manipulatable, concentric, and two-dimensional shapes that is displayed over the image in order to identify the first and second regions in the image. In some embodiments, the smaller shape of the shape mask (also referred to as an inner shape) is for identifying the first region in the image, and the larger shape of the shape mask (also referred to as an outer shape) is for identifying the second region in the image (e.g., a transition region of the shape mask). Specifically, the shape masking tool identifies pixels in the image that are within the inner shape as pixels included in the first region of the image, and identifies pixels in the image that are within the outer shape but outside the inner shape as pixels included in the second region of the image.

Some embodiments of the shape mask that is for identifying the first and second regions in an image allow the user to manipulate the shape mask in a similar manner described above (e.g., adjusting the shape of the shape mask, adjusting the curvature of the shape mask, adjusting the size of the shape mask, and moving the shape mask with respect to the image). In some of these embodiments, manipulating the inner shape (e.g., adjusting the size of the inner shape, adjusting the shape of the inner shape, adjusting the curvature of the inner shape) causes a corresponding manipulation of the outer shape of the shape mask, and manipulating the outer shape (e.g., adjusting the size of the inner shape, adjusting the shape of the inner shape, adjusting the curvature of the inner shape) causes a corresponding manipulation of the inner shape of the shape mask. However, some manipulations to the outer shape of the shape (e.g., scaling the outer shape), in some embodiments, may have no affect on the inner shape of the shape mask.

In some embodiments, the inner shape of the shape mask is for indicating pixels that are within the inner shape as fully selected pixels, and the outer shape of the shape mask is for indicating pixels that are within the outer shape but outside the inner shape as partially selected pixels. The shape mask of these embodiments is also referred to as an inner mask. Some embodiments indicate pixels that are outside the outer shape of the shape mask as fully selected pixels, and indicate pixels that are inside the outer shape of the shape mask but outside the inner shape of the shape mask as partially selected pixels. The shape mask of these embodiments is referred to as an outer mask. In some embodiments, when color correction operations are applied to the image, the color correction operation is fully applied to pixels that are fully selected, and the color correction operation is partially applied to pixels that are partially selected so that a smooth transition exists between pixels in the image to which the color correction operation is applied and pixels in the image to which the color correction operation is not applied.

A. Shape Mask Controls i. Invoking a Shape Masking Tool

Figure 22:
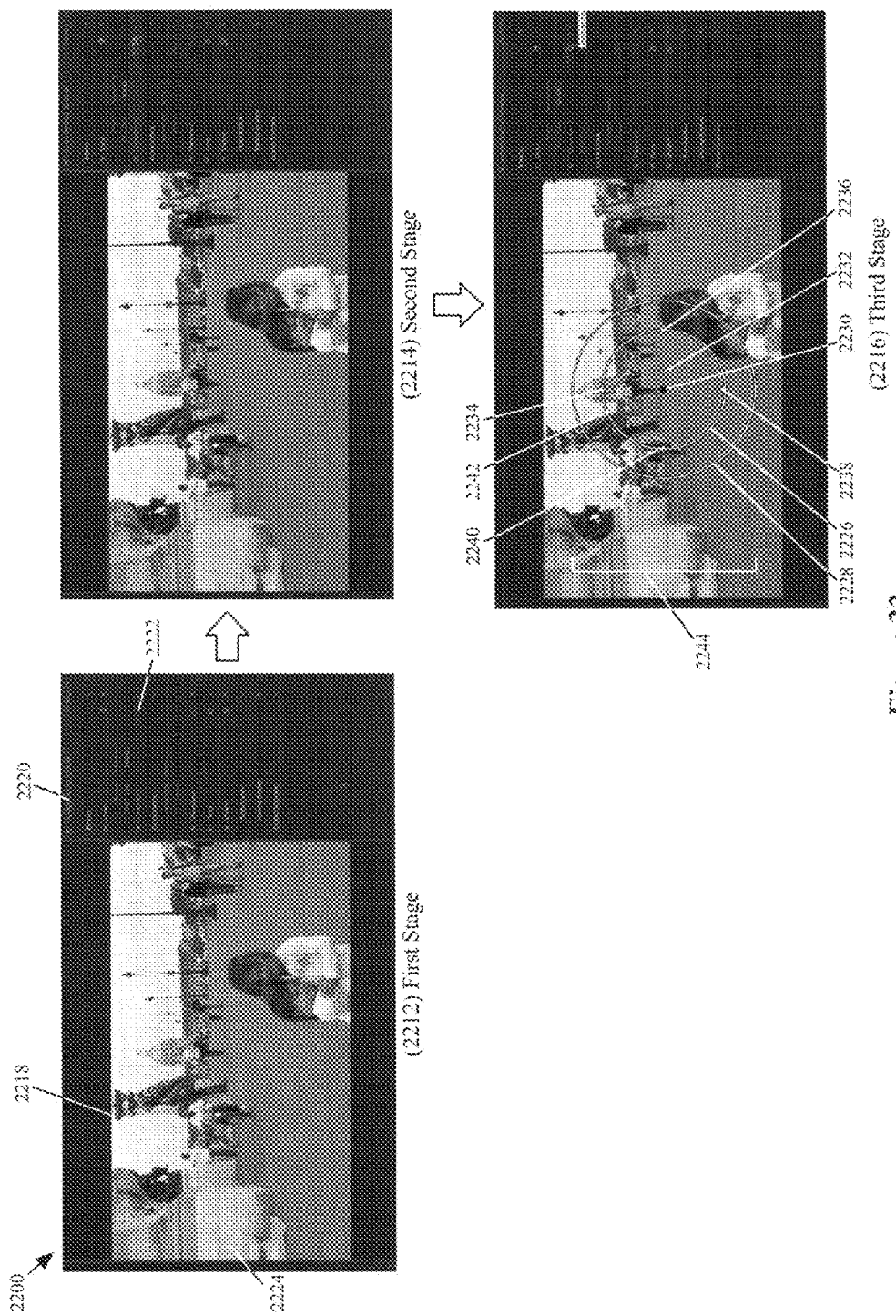
FIG. 22 conceptually illustrates a graphical user interface (GUI) of a media-editing application of some embodiments of the invention that provides a shape masking tool.

FIG. 22 conceptually illustrates a graphic user interface (GUI) 2200 of a media-editing application of some embodiments that provides a shape masking tool. Specifically, FIG. 22 illustrates an invocation of the shape masking tool through three stages 2212-2216 of the GUI 2200.

As shown in FIG. 22, the GUI 2200 includes an image display area 2218 for displaying an image for a user to edit with a set of editing tools (not shown) and an adjustments panel 2220 that includes a set of user-selectable user interface (UI) items. The image display area 2218 is displaying an image 2224 and the adjustments panel 2220 includes a user-selectable UI item 2222 for invoking the shape masking tool of some embodiments, as illustrated in FIG. 22.

The user-selectable UI item 2222 is a conceptual illustration of one or more UI items that allows a shape masking tool to be invoked (e.g., by a cursor operation such as clicking a mouse button, tapping a touchpad, or touching a touchscreen). When the shape masking tool is invoked, some embodiments provide a shape mask (also referred to as a matte shape) with which a user can identify a region of an image displayed in the image display area 2218. As mentioned above, a shape mask of some embodiments is a manipulatable two-dimensional shape that is displayed over an image in order to identify a region in the image.

Different embodiments implement the UI item 2222 differently. Some embodiments implement the UI item 2222 as a UI button while other embodiments implement the UI item 2222 as a menu selection command that can be selected through a pull-down, a drop-down, or a pop-up menu. Still, other embodiments implement the UI item 2222 as a keyboard command that can be invoked through one or more keystrokes or a series of keystrokes. Yet other embodiments allow the user to invoke the shape masking tool through two or more of such UI implementations or other UI implementations.

An example operation to invoke the shape masking tool will now be described by reference to the three different stages 2212-2216 of the GUI 2200. The first stage 2212 illustrates the image 2224 displayed in the display area 2218. In some embodiments, the media-editing application displays the image 2224 in the image display area 2218 when the media-editing application receives a selection (e.g., through a keyboard command(s) or a cursor operation) of a representation of the image 2224 in another region (not shown) of the media-editing application (e.g., a file browser, an event library, a compositing display area, etc.). In some embodiments, the image 2224 may be a still image, an image (frame or field) of a video, or any other type of image. In this example, the image 2224 is a still image. As shown, the image 2224 is of two children in the foreground and several lampposts and a building in the background.

The second stage 2214 of the GUI 2200 illustrates a user invoking the shape masking tool by selecting the UI item 2222 using a cursor (e.g., by clicking a mouse button, tapping a touchpad, or touching a touchscreen). In this example, the selection of the UI item 2222 is indicated by a highlighting of the UI item 2222.

In the third stage 2216 of the GUI 2200, the user has completed the invocation of the shape masking tool. The third stage 2216 shows a shape mask 2244 displayed near the middle of the image 2224. In some embodiments, the media-editing application displays the shape mask 2244 when the media-editing application receives the selection of the UI item 2222. As shown in this example, the shape masking tool provides the shape mask 2244 in the form of a circle when the shape masking tool is invoked. However, different embodiments of the shape masking tool may provide different super-ellipse shapes as the default shape for the shape mask 2244 when the shape masking tool is invoked.

As shown, the shape mask 2244 includes an inner shape 2226, a user-selectable outer shape 2228, and seven user-selectable shape mask controls 2230-2242. As mentioned above, some embodiments of the shape masking tool provide a shape mask that is for identifying first and second regions in an image. The shape mask 2244 is an example of such a shape masking tool. The inner shape 2226 is for identifying a first region and the outer shape 2228 is for identifying a second region (e.g., a transition region of the shape mask) in the image 2224. Specifically, the inner shape 2226 is for identifying pixels in the image 2224 that are within the inner shape 2226 and the outer shape 2228 is for identifying pixels in the image 2224 that are within the outer shape 2228 but outside the inner shape 2226.

In some embodiments, the user-selectable shape mask controls 2228-2242 of the shape mask 2244 are each for manipulating the shape mask 2244. In this example, the user-selectable shape mask control 2230 is for moving the shape mask 2244 within the image display area 2218, the user-selectable shape mask controls 2234-2240 are each for adjusting the size and shape of the shape mask 2244, the user-selectable shape mask control 2242 is for adjusting the curvature of the shape mask 2244, the user-selectable shape mask control 2232 is for rotating the shape mask 2244, and the user-selectable outer shape 2228 is for adjusting a transition region of the shape mask 2244. The following sections will describe example operations of each of the shape mask controls 2228-2242 to illustrate some of the different ways that a shape mask of some embodiments can be manipulated.

ii. Moving a Shape Mask

Figure 23:
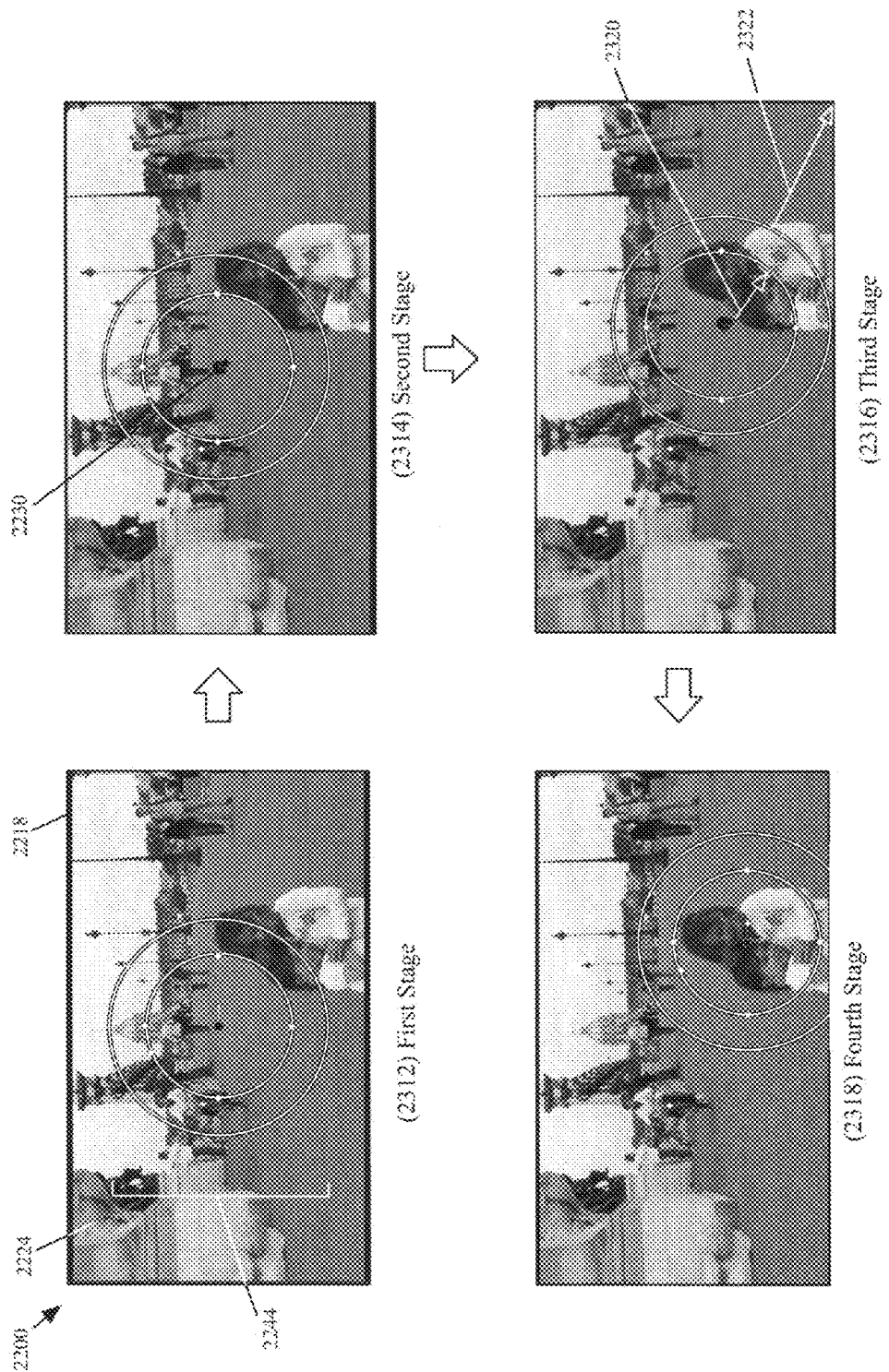
FIG. 23 illustrates an example operation of moving a shape mask according to some embodiments of the invention.

As mentioned above, some embodiments of the shape masking tool provide a shape mask that allows a user to move the shape from one location in an image display area to another location in the image display area. Different embodiments provide different techniques for moving the shape mask within the image display area. FIG. 23 illustrates one approach for moving the shape mask within the image display area. Specifically, FIG. 23 illustrates an example operation of moving the shape mask 2244 through the image display area 2218 of the GUI 2200 at four different stages 2312, 2314, 2316, and 2318.

The first stage 2312 is identical to the third stage 2216 of FIG. 22. As shown, the shape mask 2244 is displayed near the middle of the image 2224 away from the children's faces. As mentioned above, some embodiments of the media-editing application display the shape mask 2244 when the shape masking tool is invoked (e.g., by selecting the UI item 2222 as illustrated in FIG. 22).

The second stage 2314 of the GUI 2200 illustrates that the user has initiated a movement of the shape mask 2244 by selecting the user-selectable shape mask control 2230 using a cursor (e.g., by clicking a mouse button, tapping a touchpad, or touching a touchscreen). The selection of the shape mask control 2230 is indicated by displaying an enlarged version of the shape mask control 2230. In some embodiments, the media-editing application displays the enlarged version of the shape mask control 2230 when the media-editing application receives the selection of the shape mask control 2230.

In the third stage 2316, the user has started to move the shape mask 2244 by moving the cursor (e.g., by moving a mouse across a surface, dragging a finger across a touchpad, or dragging a finger across a touchscreen) toward the right bottom corner of the image display area 2218, as indicated by arrow 2320. Arrow 2322 shows that the movement of the cursor has caused the shape mask 2244 to move toward the children's faces in the image 2224. In some embodiments, the media-editing application moves the shape mask 2244 when the media-editing application receives the movement input of the cursor.

The fourth stage 2318 illustrates the GUI 2200 after the user has completed the move operation of the shape mask 2244. In this example, the user completes the move operation (e.g., by releasing a mouse button, lifting a finger off a touch-pad, or lifting a finger off a touchscreen) when the shape mask 2244 is in a desired location. As a result of this operation, the shape mask 2244 is located at a position in the image 2224 such that the shape mask 2244 encompasses the children's faces. Also, the original version of the shape mask control 2230 (which is illustrated in the first stage 2312) is displayed in the GUI 2200 at the fourth stage 2318. In some embodiments, the media-editing application displays the original version of the shape mask control 2230 when the media-editing application receives a command indicating that the move operation is completed (e.g., by releasing a mouse button, lifting a finger off a touchpad, or lifting a finger off a touchscreen).

iii. Adjusting Dimensions of a Shape Mask

Figure 24:
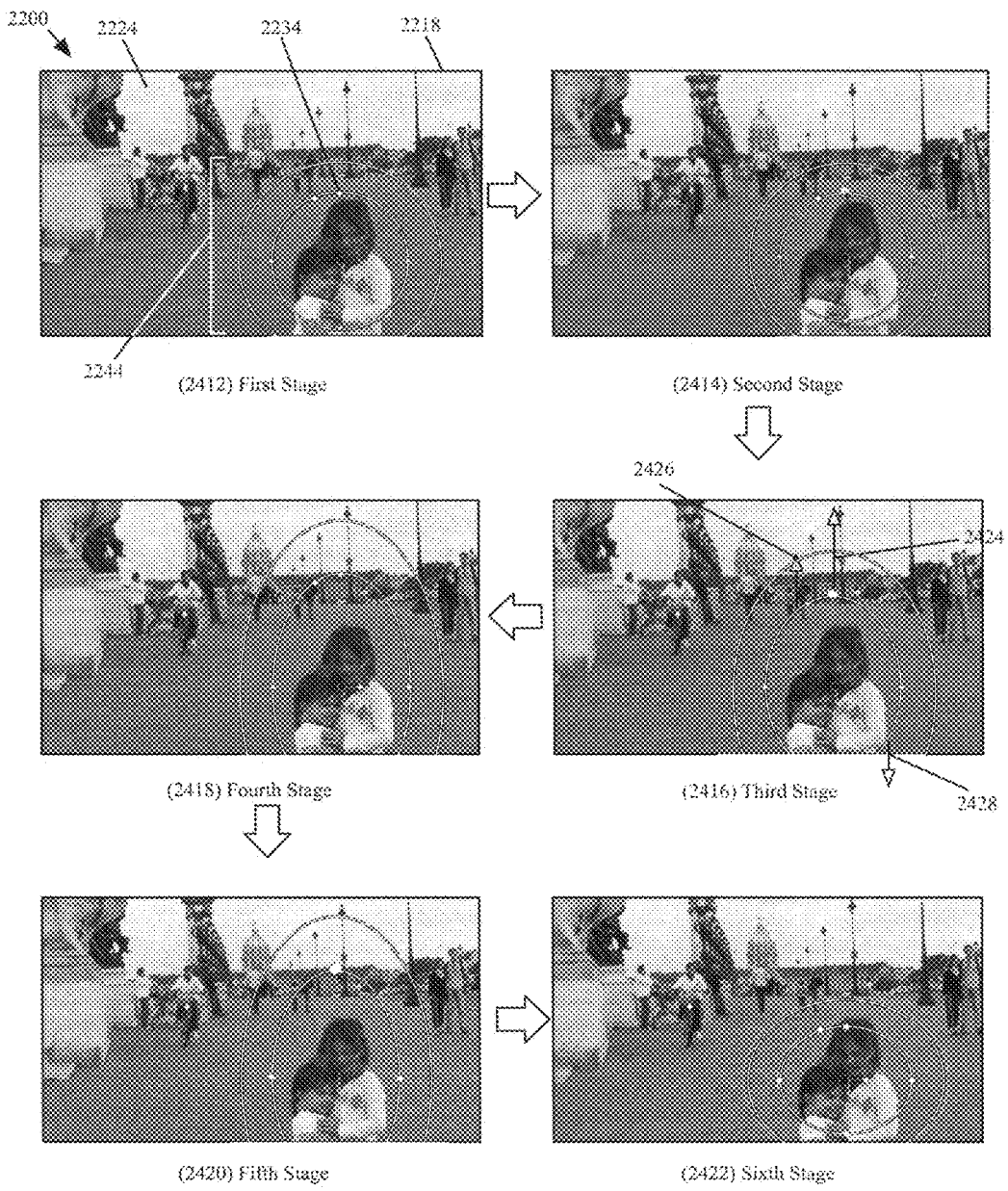
FIG. 24 illustrates example operations of adjusting the shape of a shape mask along a dimension of the shape mask according to some embodiments of the invention.

In addition to moving a shape mask, the shape masking tool of some embodiments provides a shape mask that allows a user of the media-editing application to adjust the shape of the shape mask along one dimension of the shape mask. FIG. 24 illustrates example operations of adjusting the shape of the shape mask 2244 along a dimension of the shape mask 2244 through the image display area 2218 of the GUI 2200 at six different stages 2412, 2414, 2416, 2418, 2420, and 2422. The first four stages 2412-2418 illustrate the operation of expanding the shape of the shape mask 2244 along a dimension of the shape mask 2244 and the last two stages 2420-2422 illustrate the operation of shrinking the shape of the shape mask 2244 along the dimension of the shape mask 2244.

The first stage 2412 continues from the last stage 2318 of FIG. 23. As shown, the first stage 2412 is identical to the fourth stage 2318 of FIG. 23. In the first stage 2412, the shape mask 2244 is displayed over and is encompassing the two children's faces.

The second stage 2414 of the GUI 2200 illustrates that the user has initiated an adjustment of the shape of the shape mask 2244 along a dimension of the shape mask 2244 by selecting the user-selectable shape mask control 2234 using a cursor (e.g., by holding down a mouse button, tapping a touchpad, or touching a touchscreen). As shown, an enlarged version of the shape mask control 2234 is displayed to indicate the selection of the user-selectable shape mask control 2234. In some embodiments, the media-editing application displays the enlarged version of the shape mask control 2234 when the media-editing application receives the selection of the shape mask control 2234.

In the third stage 2416, the user has started to expand the shape of the shape mask 2244 along the dimension of the shape mask 2244 by moving the cursor away and upward from the center of the shape mask 2244, as indicated by the arrow 2424. As indicated by the arrows 2426 and 2428, the movement of the cursor has caused the shape of the shape mask 2244 to expand in a vertical direction. In some embodiments, the media-editing application expands the shape of the shape mask 2244 along the dimension of the shape mask 2244 when the media-editing application receives the movement of the cursor in a direction away from the center of the shape mask 2244.

The fourth stage 2418 shows the GUI 2200 after the user has completed expanding the shape of the shape mask 2244 along the dimension of the shape mask 2244. As shown in the fourth stage 2418, the shape mask 2244 has been vertically elongated. In addition, the original version of the shape mask control 2234 (which is illustrated at the first stage 2412) is displayed in the GUI 2200 at the fourth stage 2418. In some embodiments, the media-editing application displays the original version of the shape mask control 2234 when the media-editing application receives a command indicating that the dimension adjustment operation is completed (e.g., by releasing a mouse button, lifting a finger off a touchpad, or lifting a finger off a touchscreen).

In the fifth stage 2420, the user has initiated another adjustment of the shape of the shape mask 2244 along the dimension of the shape mask 2244 by selecting the user-selectable shape mask control 2234 using the cursor (e.g., by holding down a mouse button, tapping a touchpad, or touching a touchscreen). Similar to the third stage 2416, an enlarged version of the shape mask control 2234 is displayed to indicate the selection of the user-selectable shape mask control 2234. The media-editing application of some embodiments displays the enlarged version of the shape mask control 2234 when the media-editing application receives the selection of the shape mask control 2234.

The sixth stage 2422 illustrates the GUI 2200 after the user has adjusted the shape of the shape mask 2244 along the dimension of the shape mask 2244. As illustrated in the sixth stage 2422, the user has adjusted the shape of the shape mask 2244 along the same dimension of the shape mask 2244 as that illustrated in the stages 2414-2418 except the user has adjusted the shape of the shape mask 2244 in the opposite direction in order to vertically shorten the shape of the shape mask 2244. The sixth stage 2422 also shows the original version of the shape mask control 2234 (which is illustrated at the first stage 2412) displayed in the GUI 2200. Some embodiments of the media-editing application display the original version of the shape mask control 2234 when the media-editing application receives a command indicating that the dimension adjustment operation is completed (e.g., by releasing a mouse button, lifting a finger off a touchpad, or lifting a finger off a touchscreen).

Figure 25:
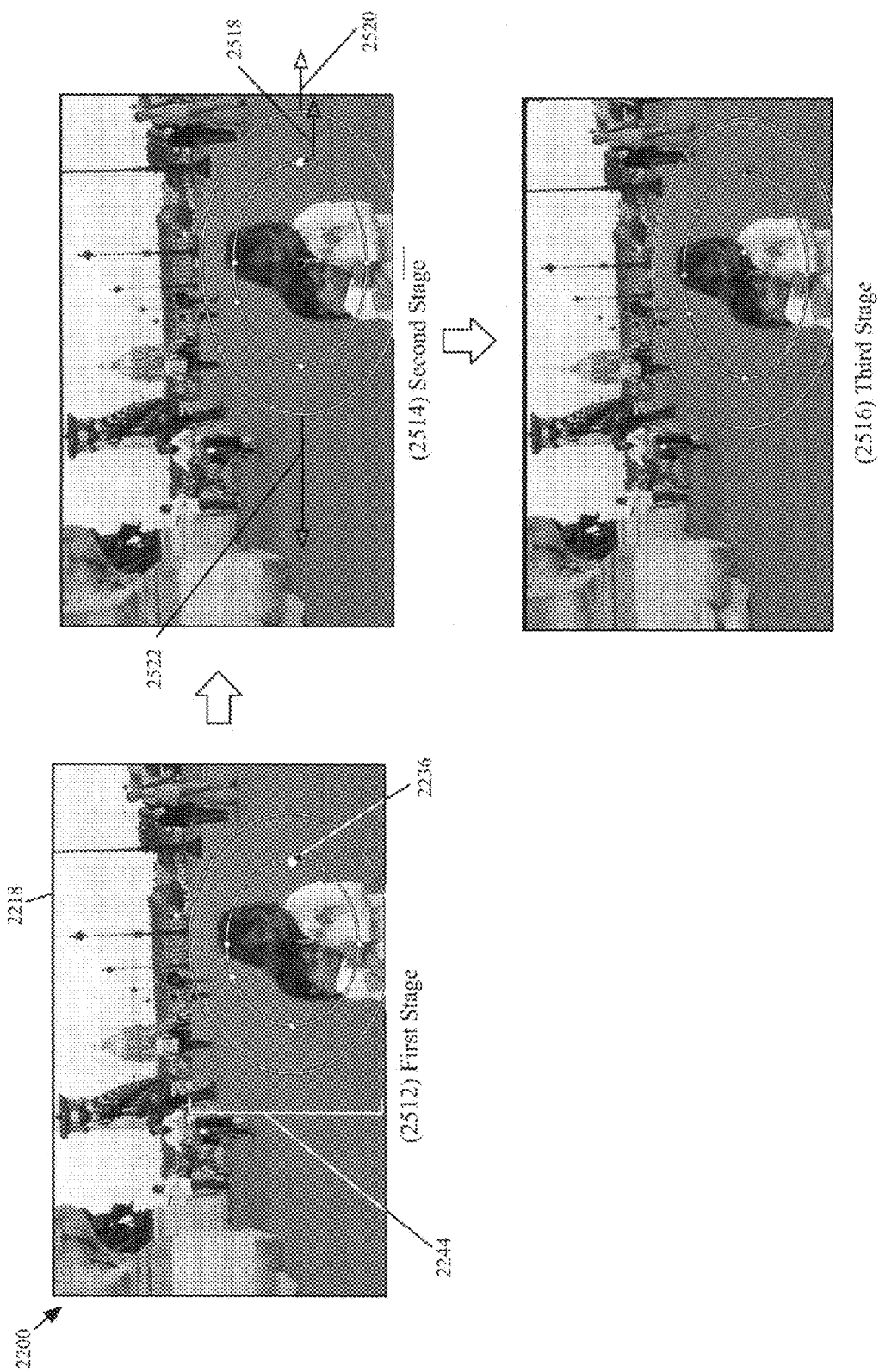
FIG. 25 illustrates example operations of adjusting the shape of a shape mask along a dimension of the shape mask according to some embodiments of the invention.

FIG. 24 illustrates example operations of adjusting the shape of the shape mask 2244 along one dimension of the shape mask 2244. Some embodiments also allow the user to adjust the shape of the shape mask 2244 along another dimension of the shape mask 2244. FIG. 25 illustrates an example operation of adjusting the shape of the shape mask 2244 along another dimension of the shape mask 2244 through the image display area 2218 of the GUI 2200 at three different stages 2512, 2514, and 2516.

The first stage 2512 continues from the last stage 2422 of FIG. 24. As shown, the first stage 2512 is similar to the sixth stage 2422 of FIG. 24, except the first stage 2512 illustrates that the user has initiated an adjustment of the shape of the shape mask 2244 along another dimension of the shape mask 2244 by selecting the shape mask control 2236 using a cursor (e.g., by holding down a mouse button, tapping a touchpad, or touching a touchscreen). The selection of the shape mask control 2236 is indicated by displaying an enlarged version of the shape mask control 2236. In some embodiments, the media-editing application displays the enlarged version of the shape mask control 2236 when the media-editing application receives the selection of the shape mask control 2236.

In the second stage 2514, the user has started to adjust the shape of the shape mask 2244 along the other dimension of the shape mask 2244 by moving the cursor away and to the right from the center of the shape mask 2244, as indicated by the arrow 2518. As indicated by the arrows 2520 and 2522, the movement of the cursor has caused the shape of the shape mask 2244 to expand along the other dimension of the shape mask 2244. In some embodiments, the media-editing application expands the shape of the shape mask 2244 along the other dimension of the shape mask 2244 when the media-editing application receives the movement of the cursor in a direction away from the center of the shape mask 2244.

The third stage 2516 illustrates the GUI 2200 after the user has expanded the shape of the shape mask 2244 along the other dimension of the shape mask 2244. As illustrated in the third stage 2516, the shape of the shape mask 2244 has been horizontally elongated. Additionally, the third stage 2516 shows the original version of the shape mask control 2236 (which is illustrated at the first stage 2412) displayed in the GUI 2200. In some embodiments, the media-editing application displays the original version of the shape mask control 2236 when the media-editing application receives a command indicating that the dimension adjustment operation is completed (e.g., by releasing a mouse button, lifting a finger off a touchpad, or lifting a finger off a touchscreen).

FIGS. 24 and 25 illustrate a shape mask of some embodiments that allows a user to individually adjust the shape of the shape mask along two orthogonal dimensions. However, some embodiments of the shape masking tool may provide a shape mask that allows the user to concurrently adjust the shape of the shape mask along the two orthogonal dimensions of the shape mask. For example, some of these embodiments might provide a user-selectable shape mask control similar to the shape mask controls 2234-2240 between each adjacent pair of the shape mask controls 2234-2240. In some such embodiments, the user can use these additional controls to simultaneously adjust the shape of the shape mask along the two orthogonal dimensions of the shape mask illustrated in FIGS. 24 and 25. In addition, the shape masking tool of some embodiments may provide a shape mask that allows the user to adjust the shape of the shape mask along additional and/or different dimensions of the shape mask.

iv. Scaling the Shape Mask

Figure 26:
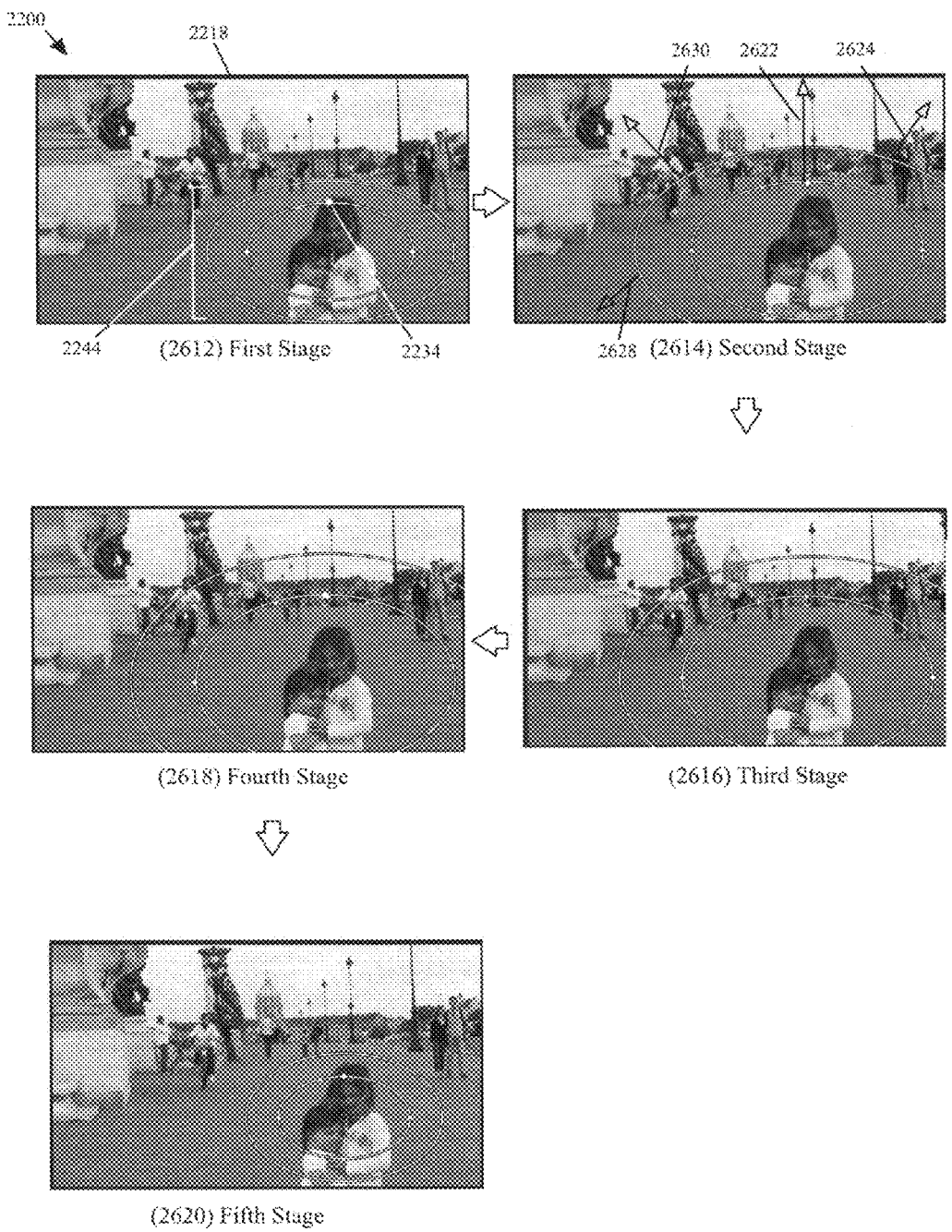
FIG. 26 illustrates example operations of scaling a shape mask according to some embodiments of the invention.

As explained above, the shape mask of some embodiments allows a user to adjust the shape of the shape mask along one or more dimensions of the shape mask. However, in some cases, the user may wish to uniformly adjust the size of (i.e., scale) the shape mask. FIG. 26 illustrates example operations of uniformly scaling a shape mask through the image display area 2218 of the GUI 2200 at five different stages 2612, 2614, 2616, 2418, and 2620. The first three stages 2612-2616 illustrate the operation of uniformly increasing the size of the shape mask 2244 and the last two stages 2618-2620 illustrate the operation of uniformly decreasing the size of the shape mask 2244.

The first stage 2612 continues from the last stage 2516 of FIG. 25. As shown, the first stage 2612 is similar to the third stage 2516 of FIG. 25, except the first stage 2612 illustrates that the user has initiated a scaling operation by holding down a hot key (e.g., a shift key) while selecting the user-selectable shape mask control 2234 using a cursor (e.g., by holding down a mouse button, tapping a touchpad, or touching a touchscreen). The selection of the shape mask control 2234 is indicated by displaying an enlarged version of the shape mask control 2234. The media-editing application of some embodiments displays the enlarged version of the shape mask control 2234 when the media-editing application receives the selection of the shape mask control 2234 while the hot key is held down.

In the second stage 2614, the user has started to scale the size of the shape mask 2244 by moving the cursor away from the center of the shape mask 2244, as indicated by the arrow 2622. As indicated by the arrows 2624-2630, the movement of the cursor has caused the size of the shape mask 2244 to uniformly increase.

The third stage 2616 illustrates the GUI 2200 after the user has completed scaling the size of the shape mask 2244. As shown, the size of the shape mask 2244 has been uniformly increased. In addition, the original version of the shape mask control 2234 (which is illustrated at the third stage 2516 of FIG. 25) is displayed at the sixth stage 2616. In some embodiments, the media-editing application displays the original version of the shape mask control 2234 when the media-editing application receives a command indicating that the scaling operation is completed (e.g., by releasing a mouse button, lifting a finger off a touchpad, or lifting a finger off a touchscreen).

In the fourth stage 2618, the user has initiated another scaling operation of the shape mask 2244 by holding down a hot key (e.g., a shift key) while selecting the user-selectable shape mask control 2234 using the cursor (e.g., by holding down a mouse button, tapping a touchpad, or touching a touchscreen). As shown, the selection of the shape mask control 2234 is indicated by displaying of an enlarged version of the shape mask control 2234. In some embodiments, the media-editing application displays the enlarged version of the shape mask control 2234 when the media-editing application receives the selection of the shape mask control 2234 while the hot key is held down.

The fifth stage 2620 shows the GUI 2200 after the user has completed scaling the size of the shape mask 2244. As shown, the size of the shape mask 2244 has been uniformly decreased. The original version of the shape mask control 2234 (which is illustrated at the third stage 2516 of FIG. 25) is displayed at the sixth stage 2620. In some embodiments, the media-editing application displays the original version of the shape mask control 2234 when the media-editing application receives a command indicating that the scaling operation is completed (e.g., by releasing a mouse button, lifting a finger off a touchpad, or lifting a finger off a touchscreen).

While FIG. 26 illustrates a shape masking tool that provides a shape mask that allows the user to scale the size of the shape mask 2244 using the user-selectable shape mask control 2234, some embodiments of the shape masking tool allow the user to scale the size of the shape mask 2244 by using any of the user-selectable shape mask controls 2234-2240 in a similar fashion as that described in FIG. 26.

v. Rotating the Shape Mask

Figure 27:
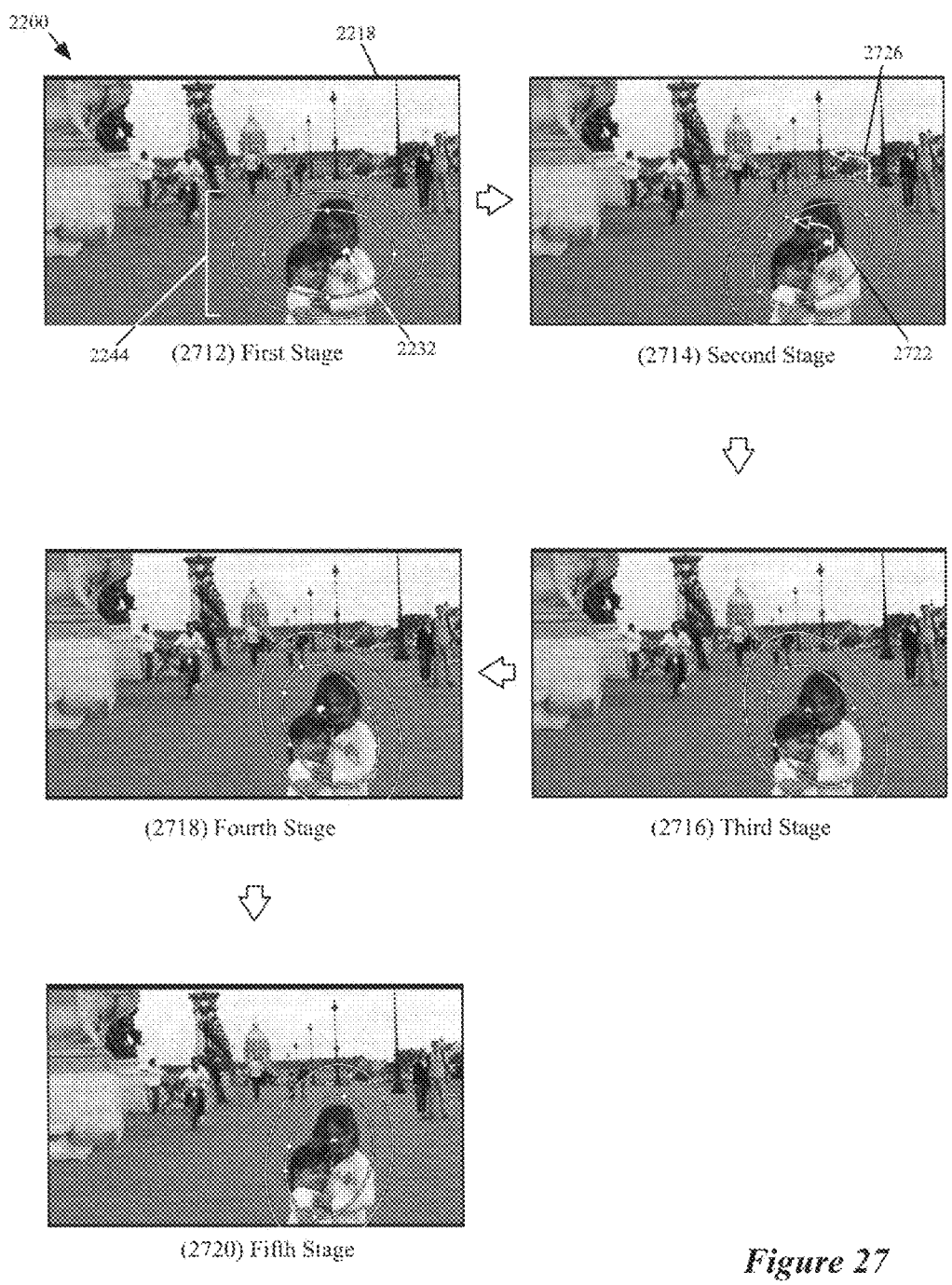
FIG. 27 illustrates example operations of rotating a shape mask according to some embodiments of the invention.

Although the above examples illustrate a number of ways for a' user to adjust the shape and size of a shape mask provided by some embodiments of the shape masking tool, the user may also want to rotate the shape mask to better fit around a particular object of interest in an image. In some embodiments, the shape masking tool provides a user-rotatable shape mask. FIG. 27 illustrates example operations of rotating the shape mask 2244 through the image display area 2218 of the GUI 2200 at five different stages 2712, 2714, 2716, 2718, and 2720.

The first stage 2712 continues from the last stage 2620 of FIG. 26. As shown, the first stage 2712 is similar to the fifth stage 2620 of FIG. 26, except the first stage 2712 illustrates that the user has initiated a rotation of the shape mask 2244 by selecting the shape mask control 2232 using a cursor (e.g., by holding down a mouse button, tapping a touchpad, or touching a touchscreen). As shown, the selection of the shape mask control 2232 is indicated by displaying an enlarged version of the shape mask control 2232. Some embodiments of the media-editing application display the enlarged version of the shape mask control 2232 when the media-editing application receives the selection of the shape mask control 2232.

In the second stage 2714, the user has started to rotate the shape mask 2244 by moving the cursor in a counter-clockwise direction with respect to the center of the shape mask 2244, as indicated by the arrow 2722. As indicated by the arrow 2726, the movement of the cursor has caused the shape mask 2244 to in turn rotate in a counter-clockwise direction. In some embodiments, the media-editing application rotates the shape mask 2244 in a counter-clockwise direction when the media-editing application receives the movement of the cursor in a counter-clockwise direction with respect to the center of the shape mask 2244.

The third stage 2716 illustrates the GUI 2200 after the user has completed rotating the shape mask 2244 in a counter-clockwise direction. As shown, the original version of the shape mask control 2232 (which is illustrated at the fifth stage 2620 of FIG. 26) is displayed in the GUI 2200. Some embodiments of the media-editing application display the original version of the shape mask control 2232 when the media-editing application receives a command indicating that the rotation operation is completed (e.g., by releasing a mouse button, lifting a finger off a touchpad, or lifting a finger off a touchscreen).

In the fourth stage 2718, the user has initiated another rotation of the shape mask 2244 by selecting the user-selectable shape mask control 2232 using the cursor (e.g., by holding down a mouse button, tapping a touchpad, or touching a touchscreen). The selection of the user-selectable shape mask control 2232 is indicated by displaying an enlarged version of the shape mask control 2232. In some embodiments, the media-editing application displays the enlarged version of the shape mask control 2232 when the media-editing application receives the selection of the shape mask control 2232.

The fifth stage 2720 shows the GUI 2200 after the user has completed rotating the shape mask 2244 in a clockwise direction. As illustrated, the original version of the shape mask control 2232 (which is illustrated at the fifth stage 2620 of FIG. 26) is displayed in the GUI 2200. In some embodiments, the media-editing application displays the original version of the shape mask control 2232 when the media-editing application receives a command indicating that the rotation operation is completed (e.g., by releasing a mouse button, lifting a finger off a touchpad, or lifting a finger off a touchscreen).

vi. Adjusting the Curvature of the Shape Mask

After a user has adjusted the shape and size of a shape mask and has rotated the shape mask to fit around an object of interest in an image, the user may wish to adjust the curvature of the shape mask to better fit around the object of interest. Accordingly, some embodiments of the shape masking tool provide a shape mask that allows a user to adjust the curvature of a shape mask.

Figure 28:
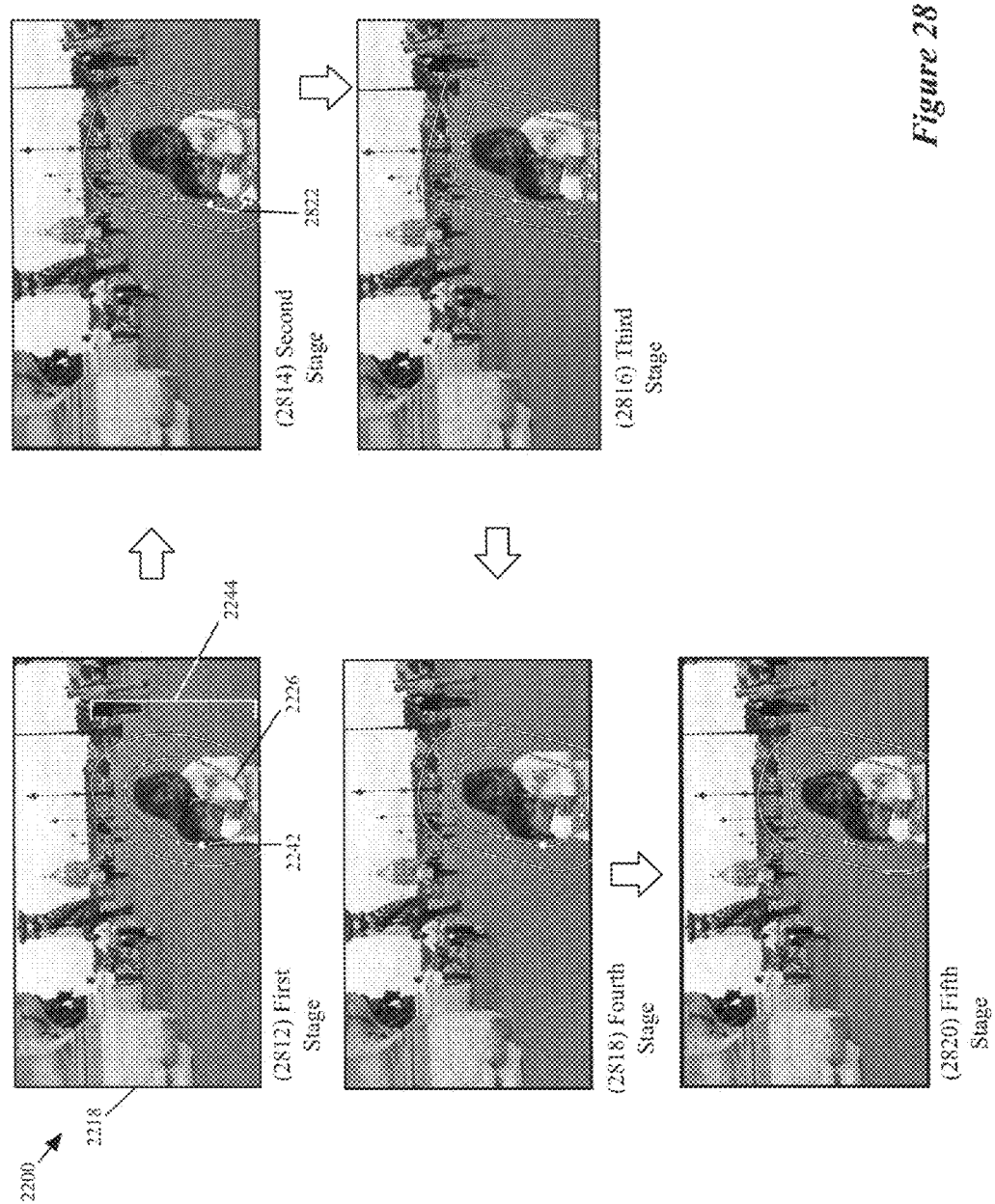
FIG. 28 illustrates example operations of adjusting a curvature of a shape mask according to some embodiments of the invention.

FIG. 28 illustrates example operations of adjusting the curvature of the shape mask 2244 through the image display area 2218 of the GUI 2200 in terms of five different stages 2812, 2814, 2816, 2818, and 2820. The first three stages 2812, 2814, and 2816 illustrate the operation of decreasing the curvature of the shape mask 2244 (e.g., adjusting the curvature of the shape mask 2244 to be more rectangular) while the last two stages 2818 and 2820 illustrate the operation of increasing the curvature of the shape mask 2244 (e.g., adjusting the curvature of the shape mask 2244 to be more rounded).

The first stage 2812 continues from the last stage 2720 of FIG. 27. As shown, the first stage 2812 is similar to the fifth stage 2720 of FIG. 27, except the first stage 2812 illustrates that the user has initiated an adjustment of the curvature of the shape mask 2244 by selecting the shape mask control 2242 using a cursor (e.g., by holding down a mouse button, tapping a touchpad, or touching a touchscreen). As shown, the selection of the shape mask control 2242 is indicated by displaying an enlarged version of the shape mask control 2242. The media-editing application of some embodiments displays the enlarged version of the shape mask control 2242 when the media-editing application receives the selection of the shape mask control 2242.

In the second stage 2814, the user has started to adjust the curvature of the shape mask 2244 by moving the cursor along the inner shape 2226 in a counter-clockwise direction with respect to the center of the shape mask 2244, as indicated by the arrow 2822. As shown in the second stage 2814, the movement of the cursor has caused the curvature of the shape mask 2244 to decrease (i.e., to be more rectangular). In some embodiments, the media-editing application decreases the curvature of the shape mask 2244 when the media-editing application receives the movement of the cursor in a counter-clockwise direction with respect to the center of the shape mask 2244.

The third stage 2816 illustrates the GUI 2200 after the user has completed adjusting the curvature of the shape mask 2244. As illustrated, the curvature of the shape mask 2244 has been decreased as indicated by the more rectangular appearance of the shape mask 2244. The third stage 2816 additionally illustrates the original version of the shape mask control 2242 (which is illustrated at the fifth stage 2720 of FIG. 27) displayed in the GUI 2200. In some embodiments, the media-editing application displays the original version of the shape mask control 2242 when the media-editing application receives a command indicating that the curvature adjustment operation is completed (e.g., by releasing a mouse button, lifting a finger off a touchpad, or lifting a finger off a touchscreen).

In the fourth stage 2818, the user has initiated another adjustment of the curvature of the shape mask 2244 by selecting the user-selectable shape mask control 2242 using the cursor (e.g., by holding down a mouse button, tapping a touchpad, or touching a touchscreen). As shown, an enlarged version of the shape mask control 2242 is displayed to indicate the selection of the user-selectable shape mask control 2242. Some embodiments of the media-editing application display the enlarged version of the shape mask control 2242 when the media-editing application receives the selection of the shape mask control 2242.

The fifth stage 2820 shows the GUI 2200 after the user has adjusted the curvature of the shape mask 2244. The fifth stage 2820 also shows that the curvature of the shape mask 2244 has been increased as the appearance of the shape mask 2244 is more rounded than the shape of the shape mask 2244 in the third stage 2816. In addition, the fifth stage 2820 shows the original version of the shape mask control 2242 (which is illustrated at the fifth stage 2720 of FIG. 27) displayed in the GUI 2200. Some embodiments of the media-editing application display the original version of the shape mask control 2242 when the media-editing application receives a command indicating that the curvature adjustment operation is completed (e.g., by releasing a mouse button, lifting a finger off a touchpad, or lifting a finger off a touchscreen).

vii. Adjusting the Transition Region of the Shape Mask

As mentioned above, when a color correction operation is applied to an image, a transition region (e.g., partially selected pixels in the image) provides a smooth transition between pixels in the image to which the color correction operation is applied and pixels in the image to which the color correction operation is not applied. In some instances, a user might want to adjust the transition region of a shape mask to provide a smaller or larger transition region for the shape mask.

Figure 29:
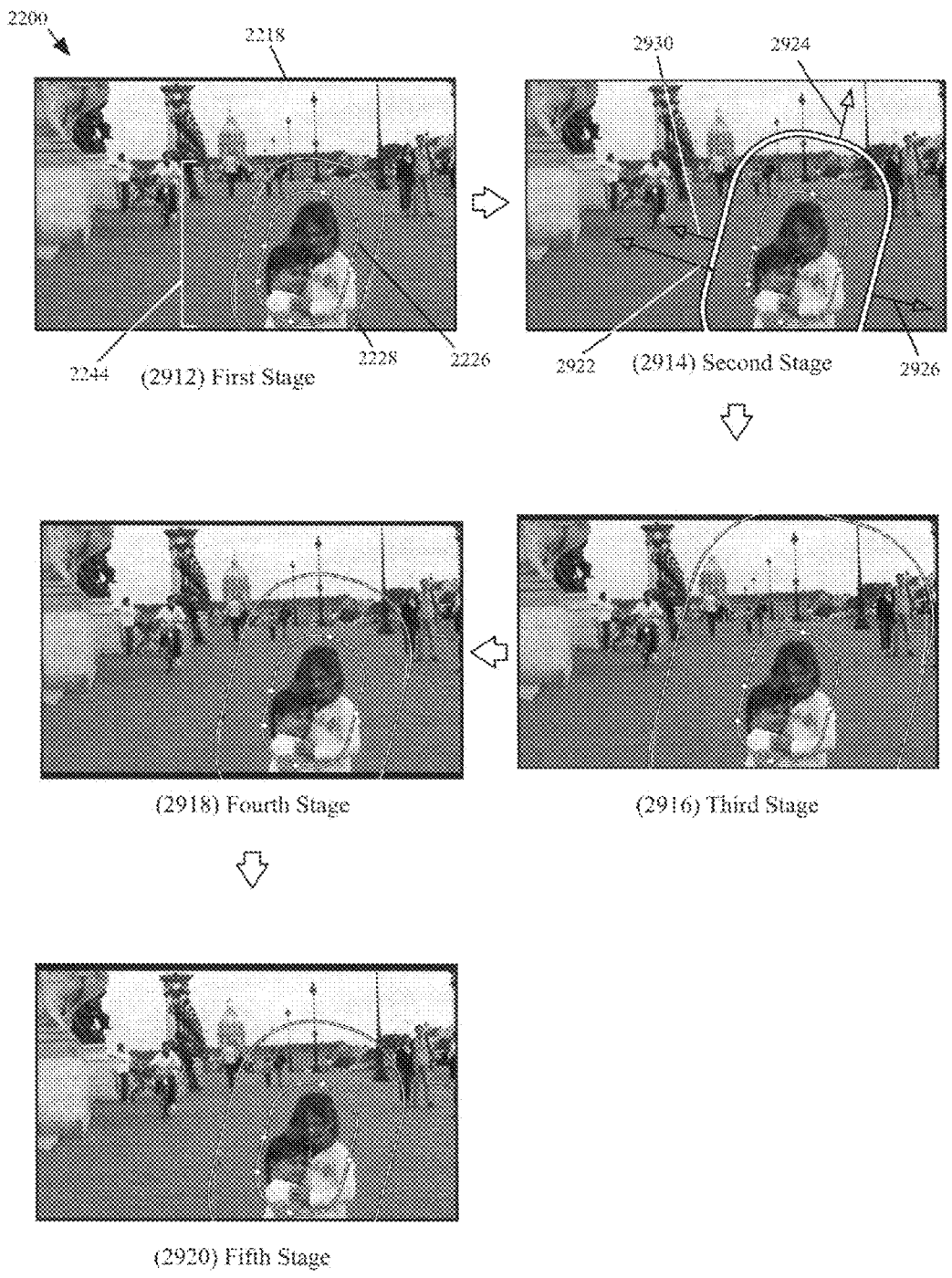
FIG. 29 illustrates example operations of adjusting a transition region of a shape mask according to some embodiments of the invention.

FIG. 29 illustrates example operations of adjusting the transition region of the shape mask 2244 through the image display area 2218 of the GUI 2200 at five different stages 2912, 2914, 2916, 2918, and 2920. The first three stages 2912, 2914, and 2916 illustrate the operation of uniformly enlarging the transition region of the shape mask 2244 while the last two stages 2918 and 2920 illustrate the operation of uniformly shrinking the transition region of the shape mask 2244. As noted above, the transition region of the shape mask 2244, in this example, is a region between the outer shape 2228 and the inner shape 2226.

The first stage 2912 continues from the fifth stage 2820 of FIG. 28. As shown, the first stage 2912 is similar to the fifth stage 2820 of FIG. 28, except the first stage 2912 illustrates that the user has initiated an adjustment of the transition region of the shape mask 2244 by selecting the outer shape 2228 using a cursor (e.g., by holding down a mouse button, tapping a touchpad, or touching a touchscreen). As shown, the selection of the outer shape 2228 is indicated by displaying a thicker version of the outer shape 2228. In some embodiments, the media-editing application displays the thicker version of the outer shape 2228 when the media-editing application receives the selection of the outer shape 2228.

In the second stage 2914, the user has started to adjust the transition region of the shape mask 2244 by moving the cursor away from the center of the shape mask 2244, as indicated by the arrow 2922. As indicated by the arrows 2924-2930, the movement of the cursor has caused the transition region of the shape mask 2244 to uniformly enlarged. In some embodiments, the media-editing application enlarges the transition region of the shape mask 2244 when the media-editing application receives the movement of the cursor away from the center of the shape mask 2244.

The third stage 2916 shows the GUI 2200 after the user has completed adjusting the transition region of the shape mask 2244. As shown in the third stage 2916, the transition region of the shape mask 2244 has been uniformly enlarged. The third stage 2916 also illustrates the original version of the outer shape 2228 (which is illustrated at the fifth stage 2820 of FIG. 28) displayed in the GUI 2200. In some embodiments, the media-editing application displays the original version of the outer shape 2228 when the media-editing application receives a command indicating that the transition region adjustment operation is completed (e.g., by releasing a mouse button, lifting a finger off a touchpad, or lifting a finger off a touchscreen).

In the fourth stage 2918, the user has initiated another adjustment of the transition region of the shape mask 2244 by selecting the outer shape 2228 (e.g., by holding down a mouse button, tapping a touchpad, or touching a touchscreen). As illustrated, a thicker version of the outer shape 2228 is displayed to indicate the selection of the outer shape 2228. The media-editing application of some embodiments displays the thicker version of the outer shape 2228 when the media-editing application receives the selection of the outer shape 2228.

The fifth stage 2920 illustrates the GUI 2200 after the user has completed adjusting the transition region of the shape mask 2244. As shown in the fifth stage 2922, the transition region of the shape mask 2244 has been uniformly shrunk compared to the transition region of the shape mask 2244 shown in the third stage 2916. The fifth stage 2920 also shows the original version of the outer shape 2228 (which is illustrated at the fifth stage 2820 of FIG. 28) displayed in the GUI 2200. The media-editing application of some embodiments displays the original version of the outer shape 2228 when the media-editing application receives a command indicating that the transition region adjustment operation is completed (e.g., by releasing a mouse button, lifting a finger off a touchpad, or lifting a finger off a touchscreen).

Figure 30:
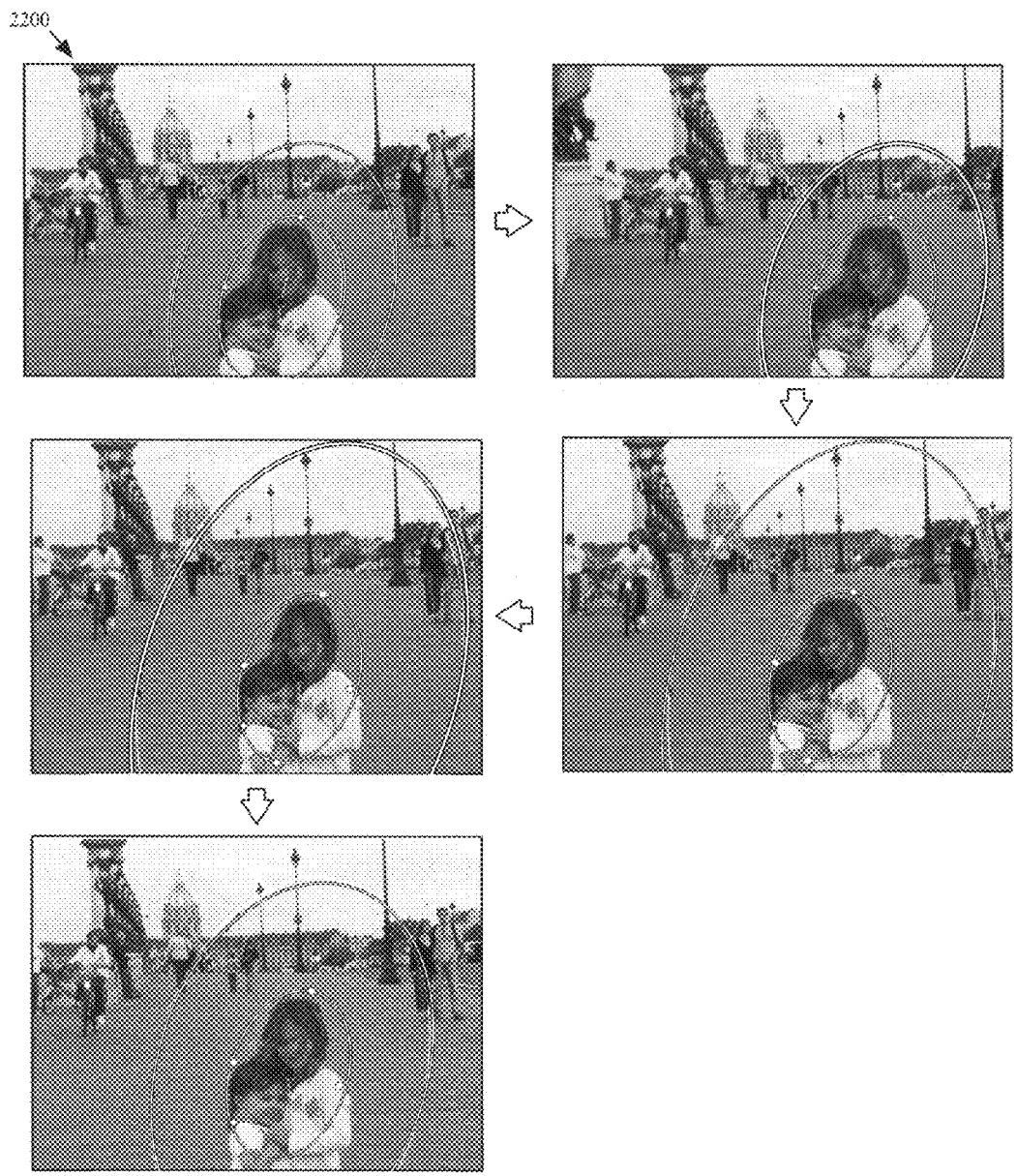
FIG. 30 illustrates example adjustments to a transition region of a shape mask according to some embodiments of the invention.
Figure 31:
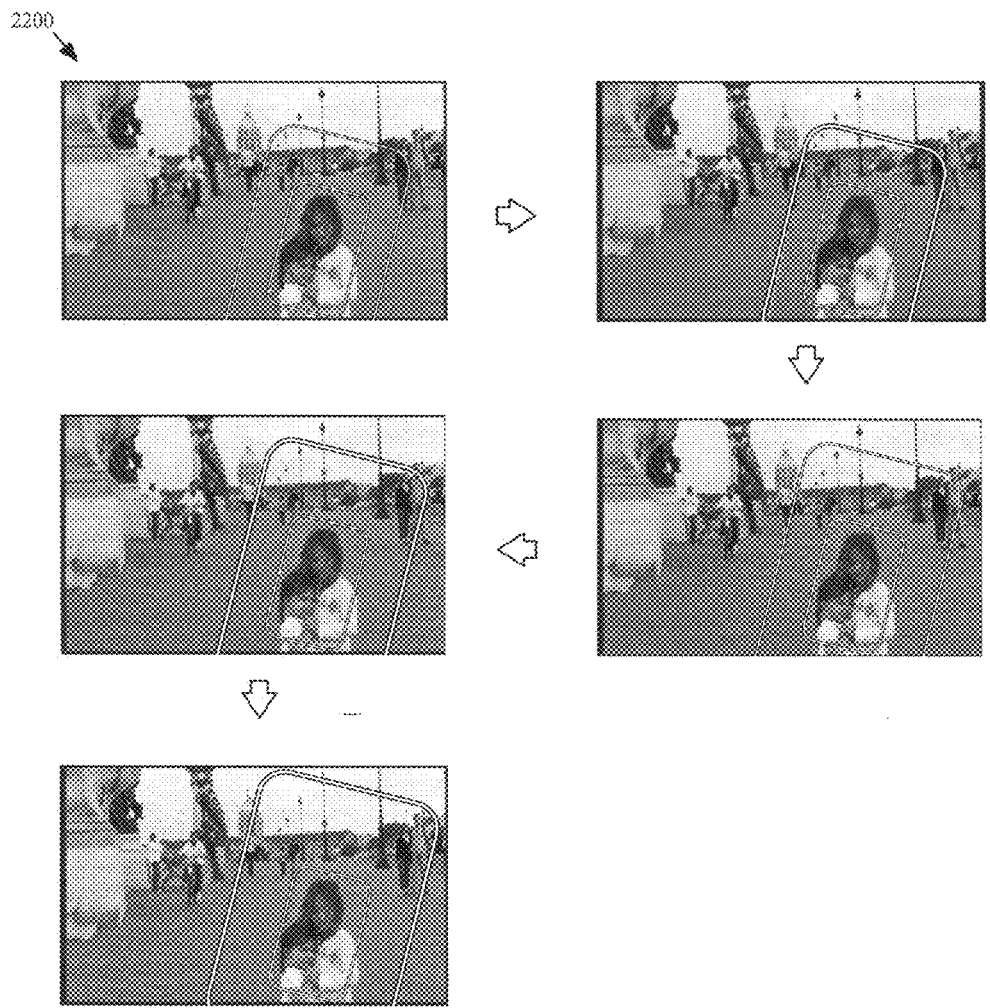
FIG. 31 illustrates example adjustments to a transition region of a shape mask according to some embodiments of the invention.

Although FIG. 29 illustrates several adjustments to a transition region of a shape mask that has a particular amount of curvature, similar adjustments may be performed to a transition region of a shape mask that has a different amount of curvature. For example, FIG. 30 illustrates example adjustments, which are performed in a similar manner as those described above by reference to FIG. 29, to a transition region of a shape mask that has more curvature (e.g., more rounded) than the shape mask illustrated in FIG. 29. As another example, FIG. 31 illustrates example adjustments, which are also performed in a similar manner as those described above by reference to FIG. 29, to a transition region of a shape mask that has less curvature (e.g., more rectangular) than the shape mask illustrated in FIG. 29.

viii. Different Shapes of a Shape Mask

In some embodiments, the shape masking tool provides a shape mask that a user may manipulate into different superellipse-based shapes by performing one or more of the operations that have been illustrated above by reference to FIGS. 22-31. Generally, a superellipse is a two-dimensional geometric figure defined in the Cartesian coordinate system as the set of all points (x, y) by the following equation:

$$\left|\frac{x}{a}\right|^n + \left|\frac{y}{b}\right|^n = 1 \tag{4}$$

where a, b, and n are positive numbers. Furthermore, equation (4) defines a closed curve that is contained in a rectangle where:

−a≤x≤+a and −b≤y≤+b

In some embodiments, a and b are referred to as semi-diameters of the closed curve. The semi-diameters of a closed curve, in some embodiments, are the halves of the closed curve's length along the two axes of symmetry of the closed curve. In some embodiments, a superellipse defined by equation (4) may be referred to as a rectangle with corners that are truncated and rounded. A rectangle includes other types of quadrilaterals, such as a square.

Accordingly, the shape of the shape masks of some embodiments is defined based on the above equation (4). As explained above, the shape masking tool of some embodiments provides a shape mask that a user can manipulate a variety of different ways. For example, some embodiments allow the user to adjust the curvature of a shape mask provided by some embodiments of the shape masking tool. In some of these embodiments, adjusting the curvature of the shape mask (e.g., as described above by reference to FIG. 28) corresponds to adjusting the n variable in equation (4). For example, increasing the curvature (e.g., adjusting the shape of the shape mask to appear more rounded) of the shape mask corresponds to decreasing the n variable and decreasing the curvature (e.g., adjusting the shape of the shape mask to appear more rectangular) of the shape mask corresponds to increasing the n variable. In some embodiments, the value of n used to define the different superellipse shapes of the shape mask of some embodiments ranges from 2 to 10. However, other ranges and/or values of n are possible in other embodiments.

In addition, some embodiments allow the user to adjust the dimensions of a shape mask. For instance, some of these embodiments allow the user to adjust a shape mask along two orthogonal dimensions (e.g., as described above by reference to FIGS. 24 and 25) of the shape mask. In some such embodiments, adjusting one of the orthogonal dimensions of the shape mask (e.g., a semi-diameter of the shape mask) corresponds to adjusting one of the variables a and b in equation (4) (e.g., adjusting the dimension of the shape mask using user-selectable shape mask control 2234, as illustrated in FIG. 24, adjusts variable a) and adjusting the other orthogonal dimension of the shape mask (e.g., another semi-diameter of the shape mask) corresponds to adjusting the other of the variables a and b in equation (4) (e.g., adjusting the dimension of the shape mask using user-selectable shape mask 2236, as illustrated in FIG. 25, adjusts b).

As described above by reference to FIG. 27, some embodiments of the shape masking tool allow the user to rotate the shape mask. In some embodiments, a rotation transform is applied to the shape mask to implement the rotation of the shape mask. In this manner, adjustments to the dimensions of the shape mask (e.g., by using user-selectable shape mask controls 2234 or 2236) still adjust the corresponding variables a and b of equation (4), even when the shape mask has been rotated. For example, a shape mask may be rotated 45 degrees with respect to the image and the shape mask may be defined along x and y axes that are also rotated 45 degrees with respect to the image. In this example, a user-selectable shape mask control for adjusting the dimension of the shape mask along the x axis, which has been rotated 45 degrees, adjusts the variable a of equation (4) that is used to define the shape mask. In addition, a user-selectable shape mask control for adjusting the dimension of the shape mask along the y axis, which has been rotated 45 degrees, adjusts the variable b of equation (4) that is used to define the shape mask.

In some embodiments, the user may select and drag a user-selectable shape mask control for adjusting a dimension of the shape mask in a non-collinear direction with respect to the dimension of the shape mask. In such cases, the shape mask is adjusted to the extent of the adjustment along the dimension component of the adjustment. For instance, continuing with the example above, using the user-selectable shape mask control for adjusting the dimension of the shape mask along the x axis and adjusting the shape mask along a direction that is non-collinear with respect to the 45 degree rotated x axis, adjusts the variable a of the shape mask to the extent of the adjustment along the x axis. On the other hand, some embodiments of the shape masking tool adjust the shape mask along multiple dimensions of the shape mask when the user selects and drags a user-selectable shape mask control for adjusting a dimension of the shape mask in a non-collinear direction with respect to the dimension of the shape mask. For instance, continuing with the example, using the user-selectable shape mask control for adjusting the dimension of the shape mask along the x axis and adjusting the shape mask along a direction that is non-collinear with respect to the 45 degree rotated x axis, adjusts the variable a of the shape mask to the extent of the adjustment along the x axis and adjusts the variable b of the shape mask to the extent of the adjustment along they axis.

Figure 32:
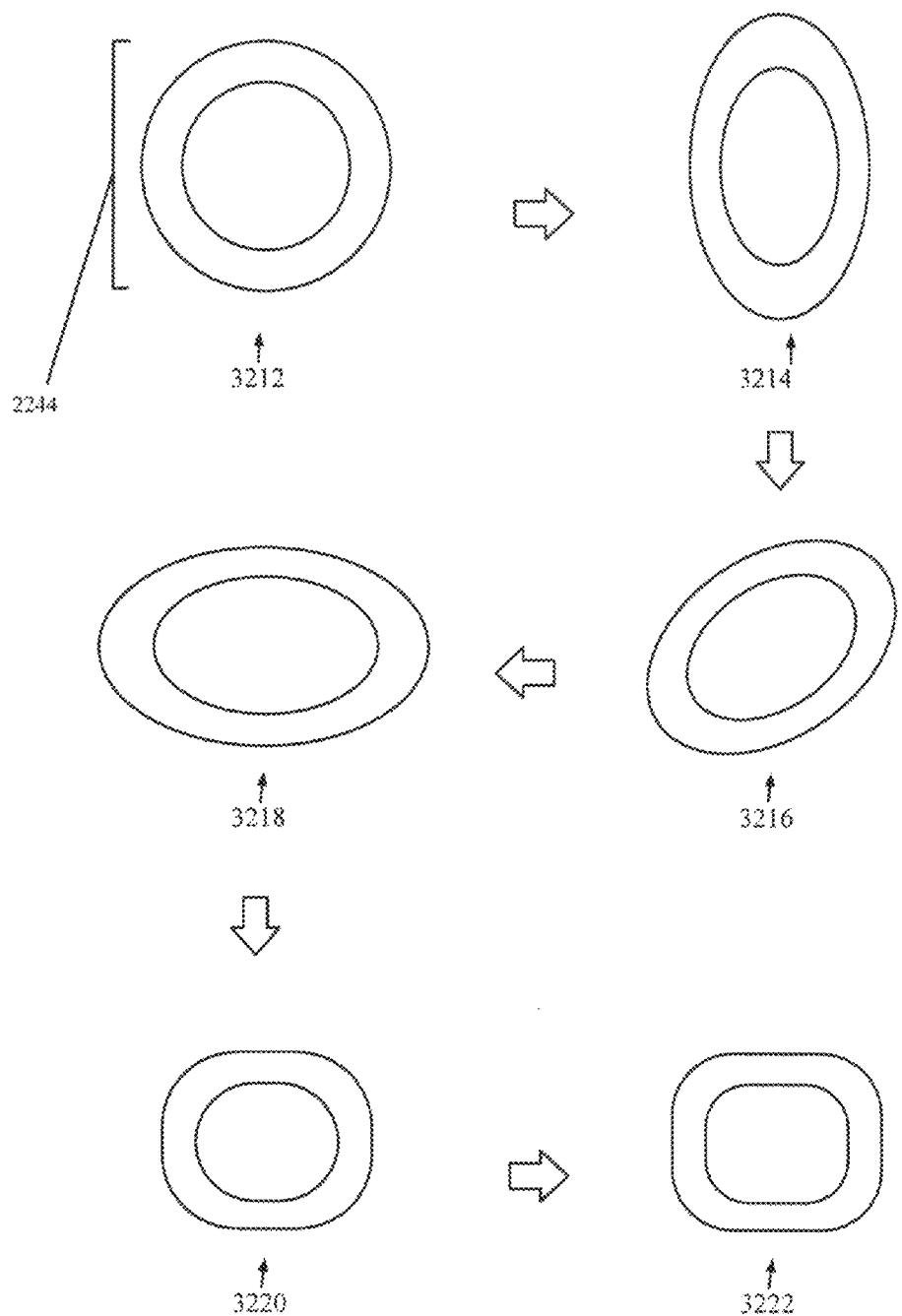
FIG. 32 illustrates an example sequence of operations that manipulate a shape mask into a number of different shapes and sizes according to some embodiments of the invention.

The following FIG. 32 illustrates an example sequence of operations that manipulate a shape mask of some embodiments into a number of different shapes and sizes to demonstrate the versatility and flexibility of the shape mask. In particular, FIG. 32 conceptually illustrates six example superellipse shapes 3212-3222 of the shape mask 2244 that can be formed using one or more of the operations described above by reference to FIGS. 22-31.

As shown, the superellipse shape 3212 of FIG. 32 illustrates the shape mask 2244 as a circle. As described above, the shape masking tool of some embodiments provides a shape mask in the form of the superellipse shape 3212 as a default shape mask when the shape masking tool is invoked.

The superellipse shape 3214 of the shape mask 2244 illustrated in FIG. 32 shows the shape mask 2244 after the superellipse shape 3212 of the shape mask 2244 has been vertically elongated to appear as an elongated ellipse. Some embodiments adjust the superellipse shape 3212 of the shape mask 2244 to appear like the superellipse shape 3214 by performing operations similar to those illustrated in FIG. 24 and correspondingly described by reference to FIG. 24.

As illustrated in FIG. 32, the superellipse shape 3216 illustrates the shape of the shape mask 2244 after the superellipse shape 3214 of the shape mask 2244 has been rotated. In some embodiments, the superellipse shape 3214 of the shape mask 2244 is rotated in a similar manner as illustrated in FIG. 27 and correspondingly described by reference to FIG. 27.

Next, FIG. 32 shows superellipse shape 3218 as the shape of the shape mask 2244 after the superellipse shape 3216 of the shape mask 2244 has been rotated. Like the superellipse shape 3214 of the shape mask 2244, some embodiments rotate the superellipse shape 3216 of the shape mask 2244 in a similar manner as illustrated in FIG. 27 and correspondingly described by reference to FIG. 27.

The superellipse shape 3220 illustrates the shape mask 2244 after the curvature of the superellipse shape 3218 of the shape mask 2244 has been adjusted. In particular, the curvature of the superellipse shape 3218 has been decreased. As such, the superellipse shape 3220 of the shape mask 2244 appears more rectangular. In some embodiments, the curvature of the superellipse shape 3218 of the shape mask 2244 is adjusted in a similar fashion as illustrated in FIG. 28 and correspondingly described by reference to FIG. 28.

Finally, FIG. 32 also shows the superellipse shape 3222 of the shape mask 2244 after the curvature of the superellipse shape 3220 has been adjusted. As shown, the curvature of the superellipse shape 3220 of the shape mask 2244 has been further decreased. Thus, the superellipse shape 3222 of the shape mask 2244 appears more rectangular than the superellipse shape 3220 of the shape mask 2244. Some embodiments adjust the curvature of the superellipse shape 3220 of the shape mask 2244 in a similar manner as illustrated in FIG. 28 and correspondingly described by reference to FIG. 28.

Although FIG. 32 illustrates a shape mask that can be manipulated between different superellipse shapes with different curvatures that range from a rectangular like superellipse shape to an ellipse, different embodiments of the shape masking tool provide different shape masks that can be manipulated between different shapes. For instance, some embodiments of the shape masking tool provide a shape mask that can be manipulated between a quadrilateral (e.g., a rectangle) and an ellipse (e.g., a circle), and different shapes in between with different amounts of curvature.

Some embodiments may provide a shape mask that can be manipulated between different quadrilaterals (e.g., a rectangle) that have rounded corners with different corner radii (e.g., arc lengths). For example, the shape masking tool of some of these embodiments may provide a shape mask that can be manipulated into a rectangle with a very small corner radius such that, to the perception of the human eye, the rectangle has sharp corners. In other words, the rectangle is 99.99% similar to a rectangle that has sharp ninety degree corners. Mathematically, however, the rectangle has rounded corners. However, some embodiments allow the rectangle to be defined with a corner radius of zero. Also, the shape mask may be manipulated into a rectangle with rounded corners that have a very large corner radius.

The rounded corner of the rectangle may be defined based on the arc length of a circle, in some embodiments. In some such embodiments, the width and height of each of the rounded corners are equal. In some embodiments, a rectangle with such rounded corners may be referred to as a roundrect. Alternatively, some embodiments may allow each of the rounded corners of the rectangle to be defined with unequal width and height. For instance, width and height of the rounded corners may be defined as proportional to the width and height of the rectangle. In this manner, the shape mask with such a rectangle may be manipulated between a rectangle with a very minimal amount of roundness so as to appear as a rectangle with ninety degree corners and a rectangle with rounded corners proportional to the width and height of the rectangle so as to appear as an ellipse.

A rectangle with rounded corners provides a smoother transition region due to the lack of sharp corners. As such, this type of shape provides better softening of color correction operations in the regions of the image to which the shape is placed.

While many of the examples described above illustrate user-selectable shape mask controls that are displayed over a shape mask (also referred to as on screen controls (OSCs)), some embodiments may provide, alternatively, or in conjunction with the OSCs illustrated above, other types of user-selectable shape mask controls. For instance, some embodiments of the shape masking tool provide slider controls that are included in the adjustments panel 2220 and that are for manipulating a shape mask provided by the shape masking tool.

B. Image Processing

As mentioned above, the shape mask of some embodiments is for identifying a region in an image (i.e., pixels) to which color correction operations (e.g., hue adjustments, saturation adjustments, brightness adjustments, etc.) are applied. In some embodiments, color correction operations are applied to the image based on values assigned to pixels in the image.

For example, some of these embodiments assign a value within a predetermined range (called an alpha value in some embodiments) to each pixel in the image based on the region in which the pixel is located. Pixels that are located in a region identified to be fully selected have a maximum alpha value within the range and pixels that are located in a region identified to be not selected at all have a minimum alpha value within the range. Pixels that are located in a region that is neither "fully selected" nor "not selected", also known as the transition region, have alpha values between the minimum alpha value and the maximum alpha value (also referred to pixels that are partially selected). The alpha value of each of the pixels within the transition region is dependent on where in the transition region the pixel is located. In some embodiments, the closer the pixel is to the region of the fully selected pixels, the higher the alpha value.

Some embodiments define an alpha value range of 0-1. In those embodiments, pixels that are fully selected have an alpha value of 1 and pixels that are not selected at all have an alpha value of 0. Pixels that are located within the transition region have an alpha value between 0 and 1, depending on where in the transition region the pixel is located. For instance, pixels located closer to "not selected" pixels are assigned lower alpha values than pixels located close to "fully selected" pixels. In this fashion, the alpha values of pixels in the transition region gradually decrease between regions that include "fully selected" pixels and regions that include "not selected" pixels.

In some embodiments, the alpha value of a particular pixel indicates the extent to which color correction operations are applied to the particular pixel. Thus, a pixel with an alpha value of 0.75 would be affected three-fourths as much by a color correction operation as a pixel with an alpha value of 1. In some embodiments, a color correction operation affects the pixel values (e.g., the RGB values, YCbCr values, etc.) of a pixel, so this color correction operation is damped for a pixel with an alpha value less than 1. If, for example, the color correction multiplies the luma (Y) value of a selected pixel by 4, then the pixel with an alpha value of 0.75 would have its luma value multiplied only by 3.

Figure 33:
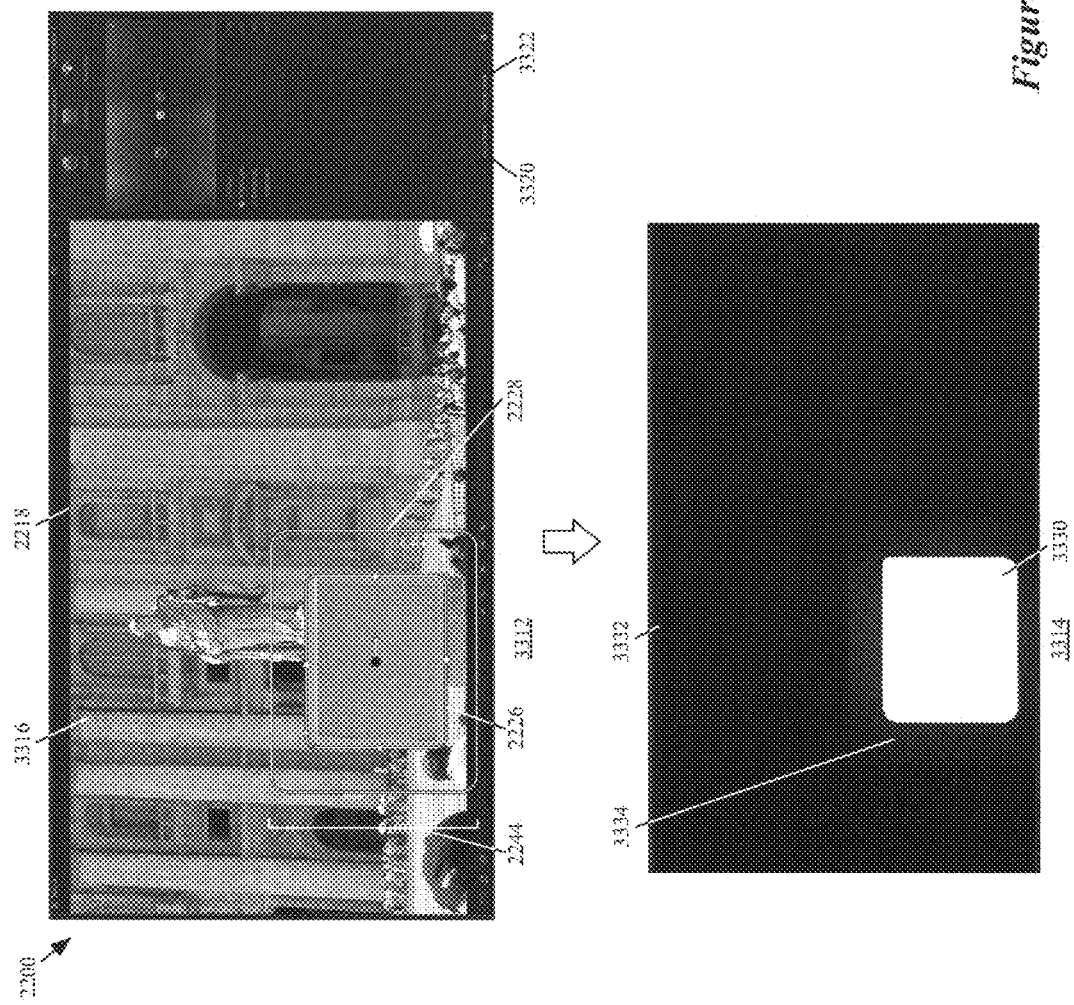
FIG. 33 illustrate an example of assigning different alpha values to pixels in an image based on a shape mask according to some embodiments of the invention.
Figure 34:
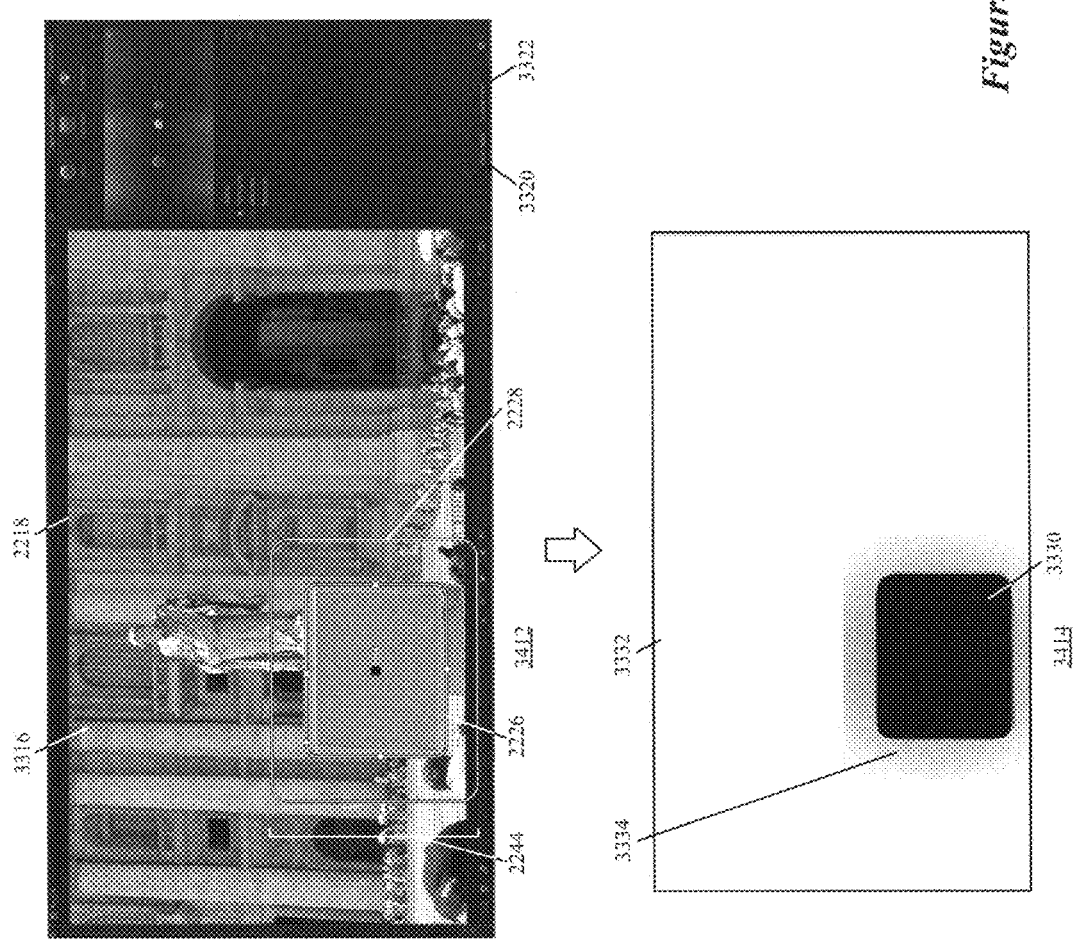
FIG. 34 illustrate examples of assigning different alpha values to pixels in an image based on a shape mask according to some embodiments of the invention.

In some embodiments, the shape masking tool allows a user to use a shape mask to identify pixels in an image as either fully selected, not selected, or partially selected (e.g., as part of the transition region) so that different alpha values can be assigned to those pixels. FIGS. 33 and 34 illustrate examples of assigning different alpha values to pixels in an image based on a shape mask according to some embodiments of the invention.

As shown in FIG. 33, the GUI 2200 includes the image display area 2218 for displaying an image 3316, a user-selectable UI item 3320 for identifying pixels located within the inner shape 2226 of the shape mask 2244 as fully selected, and a user-selectable UI item 3322 for identifying pixels located outside of the outer shape 2228 of the shape mask 2244 as fully selected. As shown in the GUI 2200 of FIG. 33, the shape mask 2244 has been manipulated to cover a rectangular object below the statue in the image 3316. In this example, the user has selected the UI item 3320 (e.g., through a cursor operation such as clicking a mouse button, tapping a touchpad, or touching a touchscreen). When the user selects the UI item 3320, the media-editing application identifies pixels located inside of the inner shape 2226 of the shape mask 2244 as fully selected (also referred to as an inner mask), pixels located outside of the outer shape 2228 of the shape mask 2244 as not selected, and pixels located between the inner shape 2226 and the outer shape 2228 of the shape mask 2244 as partially selected.

3314 illustrates a graphical representation of alpha values being assigned to different pixels in the image 3316 based on the shape mask 2244. In 3314, the region 3330 that is inside the inner shape 2226 of the shape mask 2244 is shown in white, indicating that each of the pixels located in the region 3330 is assigned a maximum alpha value (i.e., fully selected). The region 3332 that is outside of the outer shape 2228 of the shape mask 2244 is shown in black, indicating that each of the pixels located in the region 3332 is assigned a minimum alpha value (i.e., not selected). The region 3334 that is between the inner shape 2226 and the outer shape 2228, also known as the transition region, is shown in grey, indicating that each of the pixels in the region 3334 is assigned an alpha value between the minimum alpha value and the maximum alpha value (i.e., partially selected). In this example, when a color correction operation is applied to the image 3316, the full extent of the color correction operation is applied to the pixels within the region 3330. The extent of the color correction operation that is applied to the pixels within the transition region 3334 is based on the position of the pixel with respect to the region 3330 and the region 3332. The closer the pixel is to the region 3330, the greater the extent of the color correction that is applied to the pixel. In addition, the color correction operation is not applied to the pixels within the region 3332 as those pixels are not selected.

3412 of FIG. 34 is similar to 3312 of FIG. 33, except, for the example illustrated in FIG. 34, the user has selected the UI item 3322 (e.g., through a cursor operation such as clicking a mouse button, tapping a touchpad, or touching a touchscreen). When the user selects the UI item 3322, the media-editing application identifies pixels located outside of the outer shape 2228 of the shape mask 2244 as fully selected (also referred to as an outer mask), pixels located inside of the inner shape 2226 of the shape mask 2244 as not selected, and pixels located between the inner shape 2226 and the outer shape 2228 of the shape mask 2244 as partially selected.

3414 illustrates a graphical representation of alpha values being assigned to different pixels in the image 3316 based on the shape mask 2244. In 3414, the region 3332 that is outside of the outer shape 2228 of the shape mask 2244 is shown in white, indicating that each of the pixels located in the region 3332 is assigned a maximum alpha value (i.e., fully selected). The region 3330 that is inside the inner shape 2226 of the shape mask 2244 is shown in black, indicating that each of the pixels located in the region 3330 is assigned a minimum alpha value (i.e., not selected). The region 3334 that is between the inner shape 2226 and the outer shape 2228, also known as the transition region, is shown in grey, indicating that each of the pixels in the region 3334 is assigned an alpha value between the minimum alpha value and the maximum alpha value (i.e., partially selected). In this example, when a color correction operation is applied to the image 3316, the full extent of the color correction operation is applied to the pixels within the region 3332. The extent of the color correction operation that is applied to the pixels within the transition region 3334 is based on the position of the pixel with respect to the region 3330 and the region 3332. The closer the pixel is to the region 3332, the greater the extent of the color correction that is applied to the pixel. Additionally, the color correction operation is not applied to the pixels within the region 3330 since those pixels are not selected.

C. Applying the Different Shapes of the Shape Mask

As mentioned some embodiments of the shape masking tool provides a shape mask that allows a user to identify a portion of an image (an area of interest) and apply a color correction operation to pixels in the portion of the image. Often times, the area of interest is not in a regular shape (i.e., a circle or a rectangle). Thus, the ability to manipulate a shape mask in various different shapes (e.g., an ellipse, an oval, a square with rounded edges, a rectangle with rounded edges, etc.) allows the user to customize the shape mask to fit different areas of interest.

Figure 36A:
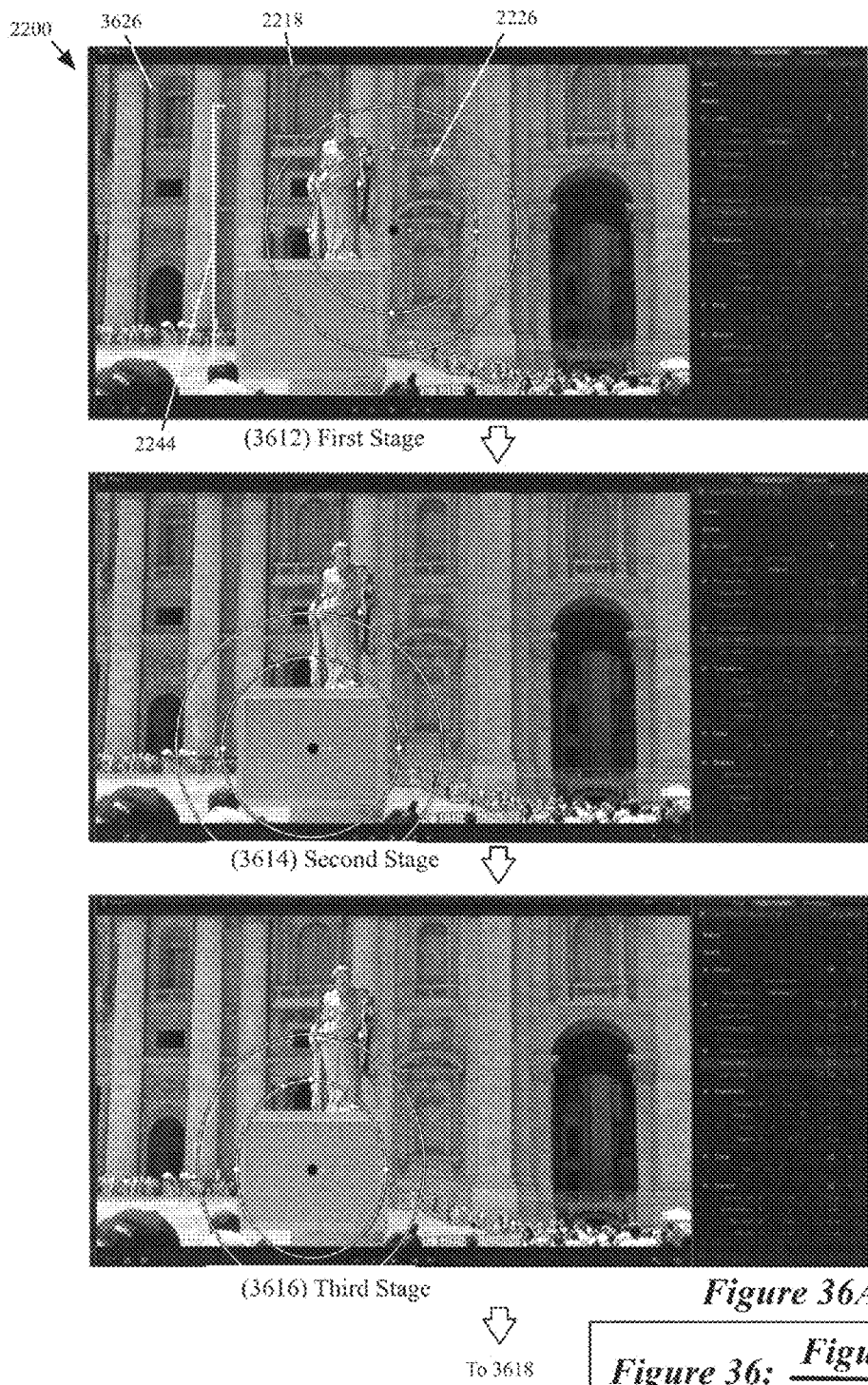
Figure 37A:
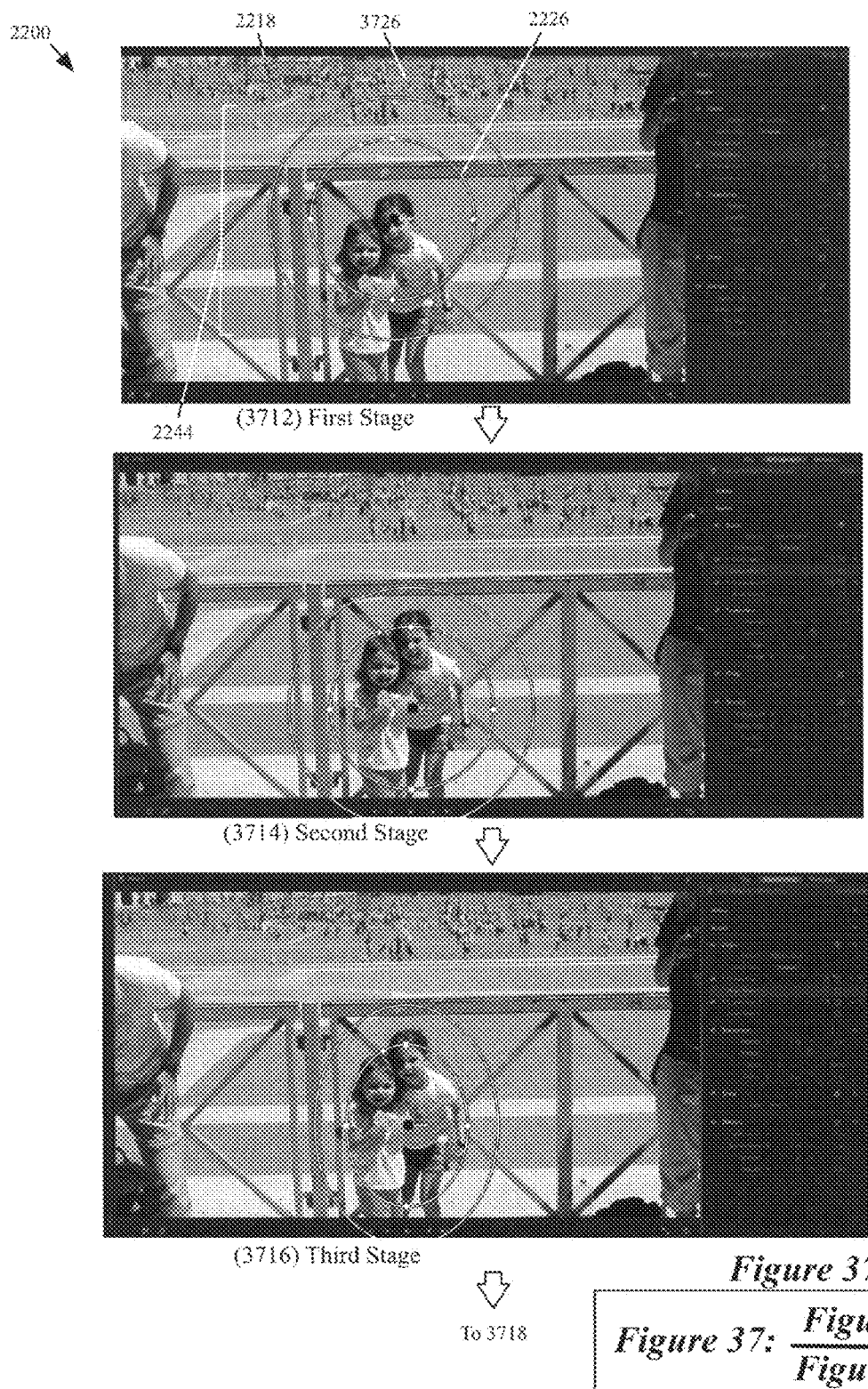

FIGS. 35-37 illustrate the operations of manipulating a shape mask to cover areas of interest of different sizes and shapes. It will be shown through these figures that a particular shape of the shape mask (i.e., an ellipse, a rectangle with rounded edges, or an oval) will be a good fit for each of the three areas of interest.

FIG. 35 illustrates the operation of manipulating the shape mask 2244 at six different stages 3512, 3514, 3516, 3518, 3520, and 3522 of the GUI 2200. As shown in the first stage 3512, the image display area 2218 displays an image 3526 that includes a statue in the foreground and a building in the background. In this example, the statue in the foreground in the image 3526 is the area of interest of the user. The first stage 3512 shows that the shape mask 2244 has been invoked and is displayed near the middle of the image display area 2218.

The second stage 3514 through the fifth stage 3520 illustrate the shape mask 2244 being manipulated through a series of operations (similar to the operations described above by reference to FIGS. 22-31) so that the shape mask 2244 fits the size and shape of the statue.

Specifically, the second stage 3514 illustrates that the shape mask 2244 has been moved from the middle of the image display area 2218 to the middle of the statue. In the third stage 3516, the shape of the shape mask 2244 has been horizontally shortened so that the width of the shape mask 2244 is better aligned with the width of the statue. The fourth stage 3518 illustrates that the shape mask 2244 has been rotated in a counter-clockwise direction so that the shape mask 2244 is better aligned with the statue. In the fifth stage 3520, the shape of the shape mask 2244 has been vertically adjusted so that the shape mask 2244 covers the entire height of the statue.

As shown in this example, the shape mask 2244 has been manipulated into an elliptical shape in order to provide a good fit for the area of interest in the image 3526. In the sixth stage 3522, the user has selected the UI item 3532 (e.g., through a cursor operation such as clicking a mouse button, tapping a touchpad, or touching a touchscreen) in order to apply to the image 3526 a color correction operation associated with the UI item 3532. When the user selects the UI item 3532, the media-editing application of some embodiments applies to the image 3526 the color correction operation associated with the UI item 3532. As shown in this example, the color correction operation has been applied to an inner mask option of the shape mask 2244 as indicated by an increased brightness of pixels within the shape mask 2244.

FIG. 36 illustrates the operation of manipulating the shape mask 2244 at six different stages 3612, 3614, 3616, 3618, 3620, and 3622 of the GUI 2200. The first stage 3612 illustrates the image display area 2218 displaying an image 3626 that includes a statue and a rectangular object below the statue in the foreground, and a building in the background. In this example, the rectangular object below the statue in the foreground in the image 3626 is the area of interest of the user. The first stage 3612 illustrates that the shape mask 2244 has been invoked and is displayed near the middle of the image display area 2218.

The second stage 3614 through the fifth stage 3620 illustrate the shape mask 2244 being manipulated through a series of operations (similar to the operations described above by reference to FIGS. 22-31) so that the shape mask 2244 fits the size and shape of the rectangular object.

In particular, the second stage 3614 illustrates that the shape mask 2244 has been moved from the middle of the image display area 2218 to the middle of the rectangular object. In the third stage 3616, the shape of the shape mask 2244 has been horizontally shortened so that the width of the shape mask 2244 is better aligned with the width of the rectangular object. The fourth stage 3618 illustrates that the shape of the shape mask 2244 has been vertically shortened so that the shape mask 2244 is better aligned with the height of the rectangular object. In the fifth stage 3620, the curvature of the shape mask 2244 has been decreased in order to manipulate the shape mask 2244 into a more rectangular shape to better fit the rectangular object.

As shown in this example, the shape mask 2244 has been manipulated into a rectangular shape with rounded corners in order to provide a good fit for the area of interest in the image 3626. In the sixth stage 3622, the user has selected the UI item 3632 (e.g., through a cursor operation such as clicking a mouse button, tapping a touchpad, or touching a touchscreen) in order to apply to the image 3626 a color correction operation associated with the UI item 3632. When the user selects the UI item 3632, the media-editing application of some embodiments applies to the image 3626 the color correction operation associated with the UI item 3632. As shown in this example, the color correction operation has been applied to an inner mask option of the shape mask 2244 as indicated by an increased brightness of pixels within the shape mask 2244.

FIG. 37 illustrates the operation of manipulating the shape mask 2244 at six different stages 3712, 3714, 3716, 3718, 3720, and 3722 of the GUI 2200. As shown in the first stage 3712, the image display area 2218 displays an image 3726 that includes two children in the foreground and a plaza in the background. In this example, the two children in the foreground of the image 3726 is the area of interest of the user. The first stage 3712 shows that the shape mask 2244 has been invoked and is displayed near the middle of the image display area 2218.

The second stage 3714 through the fifth stage 3720 illustrate the shape mask 2244 being manipulated through a series of operations (similar to the operations described above by reference to FIGS. 22-31) so that the shape mask 2244 fits the size and shape of the two children.

Specifically, the second stage 3714 illustrates that the shape mask 2244 has been moved from the middle of the image display area 2218 to the middle of the two children. In the third stage 3716, the shape of the shape mask 2244 has been horizontally shortened so that the width of the shape mask 2244 is better aligned with the width of the two children. The fourth stage 3718 illustrates that the shape of the shape mask 2244 has been vertically elongated so that the shape mask 2244 is better aligned with the height of the two children. In the fifth stage 3720, the curvature of the shape mask 2244 has been increased in order to manipulate the shape mask 2244 into a more oval shape to better fit the two children.

As shown in this example, the shape mask 2244 has been manipulated into an oval shape in order to provide a good fit for the area of interest in the image 3726. In the sixth stage 3722, the user has selected the UI item 3632 (e.g., through a cursor operation such as clicking a mouse button, tapping a touchpad, or touching a touchscreen) in order to apply to the image 3726 a color correction operation associated with the UI item 3632. When the user selects the UI item 3632, the media-editing application of some embodiments applies to the image 3726 the color correction operation associated with the UI item 3632. As shown in this example, the color correction operation has been applied to an inner mask option of the shape mask 2244 as indicated by an increased brightness of pixels within the shape mask 2244.

D. Two Alphas

The above FIGS. 33 and 34 illustrate applying a color correction operation based on an inner mask option of a shape mask and applying a color correction operation based on an outer mask option of the same shape mask. In some embodiments, the shape masking tool allows the user to simultaneously apply one color correction operation based on an inner mask option of a shape mask and another color correction operation based on an outer mask option of the shape mask.

Figure 38:
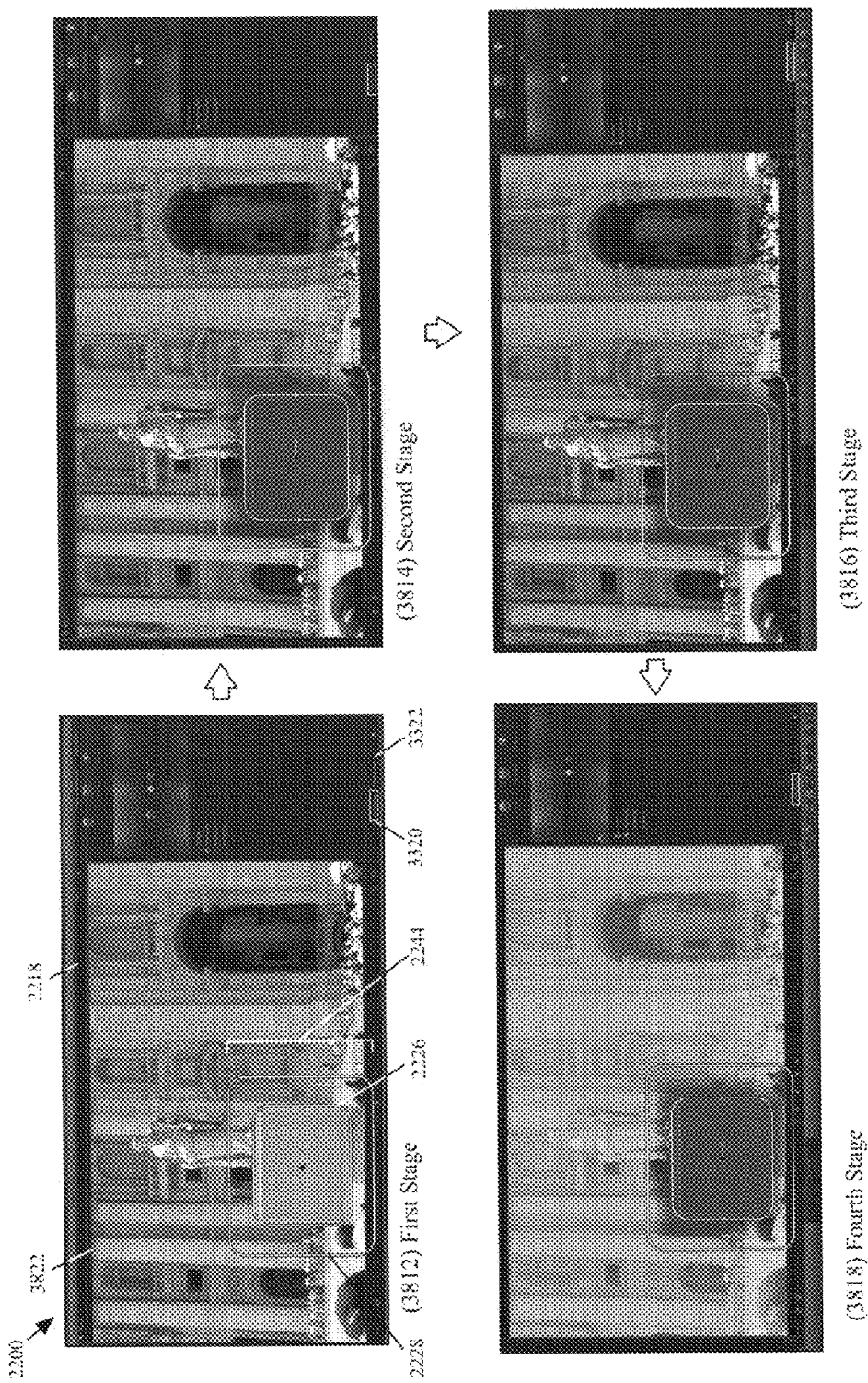
FIG. 38 illustrates simultaneously applying a color correction operation based on an inner mask option of a shape mask and another color correction operation based on an outer mask option of the shape mask according to some embodiments of the invention.

FIG. 38 illustrates such an operation at four different stages 3812, 3814, 3816, and 3818 of the GUI 2200. As shown in FIG. 38, the GUI 2200 includes the image display area 2218 for displaying an image 3822 that includes a statue and a rectangular object below the statue in the foreground, and a building in the background.

In the first stage 3812, the user has invoked a shape masking tool and has manipulated the shape mask 2244 to cover the rectangular object in the image 3822. In addition, the user has selected the UI item 3320, as indicated by a highlighting of the UI item 3320. When the user selects the UI item 3320, some embodiments of the media-editing application identify pixels located inside of the outer shape 2228 of the shape mask 2244 as fully selected, pixels located outside of the outer shape 2228 of the shape mask 2244 as not selected, and pixels located between the inner shape 2226 and the outer shape 2228 of the shape mask 2244 as partially selected.

The second stage 3814 illustrates that the user has applied a first color correction operation to the image 3822. As shown, a full extent of the first color correction operation has been applied to the pixels located inside the inner shape 2226 of the shape mask 2244, as indicated by a darkening of the region of the image 3822 inside the inner shape 2226. A lesser extent of the first color correction operation has been applied to the pixels located in the transition region (i.e., the region between the inner shape 2226 and the outer shape 2228). In addition, no effect has been applied to the pixels located outside of the outer shape 2228 of the shape mask 2244.

In the third stage 3816, the user has selected the UI item 3322, as indicated by a highlighting of the UI item 3322. When the user selects the UI item 3322, some embodiments of the media-editing application identify pixels located outside of the outer shape 2228 of the shape mask 2244 as fully selected, pixels located inside of the inner shape 2226 of the shape mask 2244 as not selected, and pixels located between the inner shape 2226 and the outer shape 2228 of the shape mask 2244 as partially selected.

The fourth stage 3818 illustrates that the user has applied a second color correction operation to the image 3822. As shown, a full extent of the second color correction operation has been applied to the pixels located outside of the outer shape 2228 of the shape mask 2244, as indicated by a brightening of the region of the image outside of the outer shape 3830. A lesser extent of the second color correction operation has been applied to the pixels located in the transition region (i.e., the region between the inner shape 2226 and the outer shape 2228). Lastly, no effect has been applied to the pixels located inside the inner shape 2226 of the shape mask 2244.

The examples illustrated above describe creating and adjusting a shape mask for a still image. As mentioned above, the shape masking tool can provide a shape mask for identifying a region in a frame (or field) of a video clip in some embodiments. In some of these embodiments, the shape mask identifies a region of a particular frame of a video clip and associates the identified region with the rest of the frames in the video clip. For instance, a user may create a shape mask, adjust the shape mask to identify a region of a frame of a video clip, and invoke a color correction operation on the frame of the video clip. When the user invokes the color correction operation on the frame, the shape masking tool of some embodiments applies the color correction to the identified region of the frame and automatically applies the color correction to the corresponding region of each of the other frames in the video clip. This way, the user only has to create a shape mask for one frame of a video clip (instead of creating a shape mask for each frame of the video clip) in order to apply a color correction operation to a region of each frame of the entire video clip.

III. Color Mask and Shape Mask Example

As described above in Section I, a masking tool of some embodiments allows a user to identify a portion of an image based on the colors in the image. Section II described a masking tool of some embodiments that allows a user to identify a portion of an image based on a spatial region in the image. However, some embodiments provide a masking tool that includes both color-based and spatial-based masking tools to provide a user with greater flexability and control in identifying a portion of an image. For example, a user may use the color-based masking tool to identify a color of an object of interest in the image to apply a color correction operation, but the image may include other objects with the same or similar color to which the user does not wish to apply the color correction operation. The user may use the shape-based masking tool to isolate the identification of the color to the object of interest in the image and, thereby, isolating the application of the color correction operation to the object of interest in the image.

Figure 39:
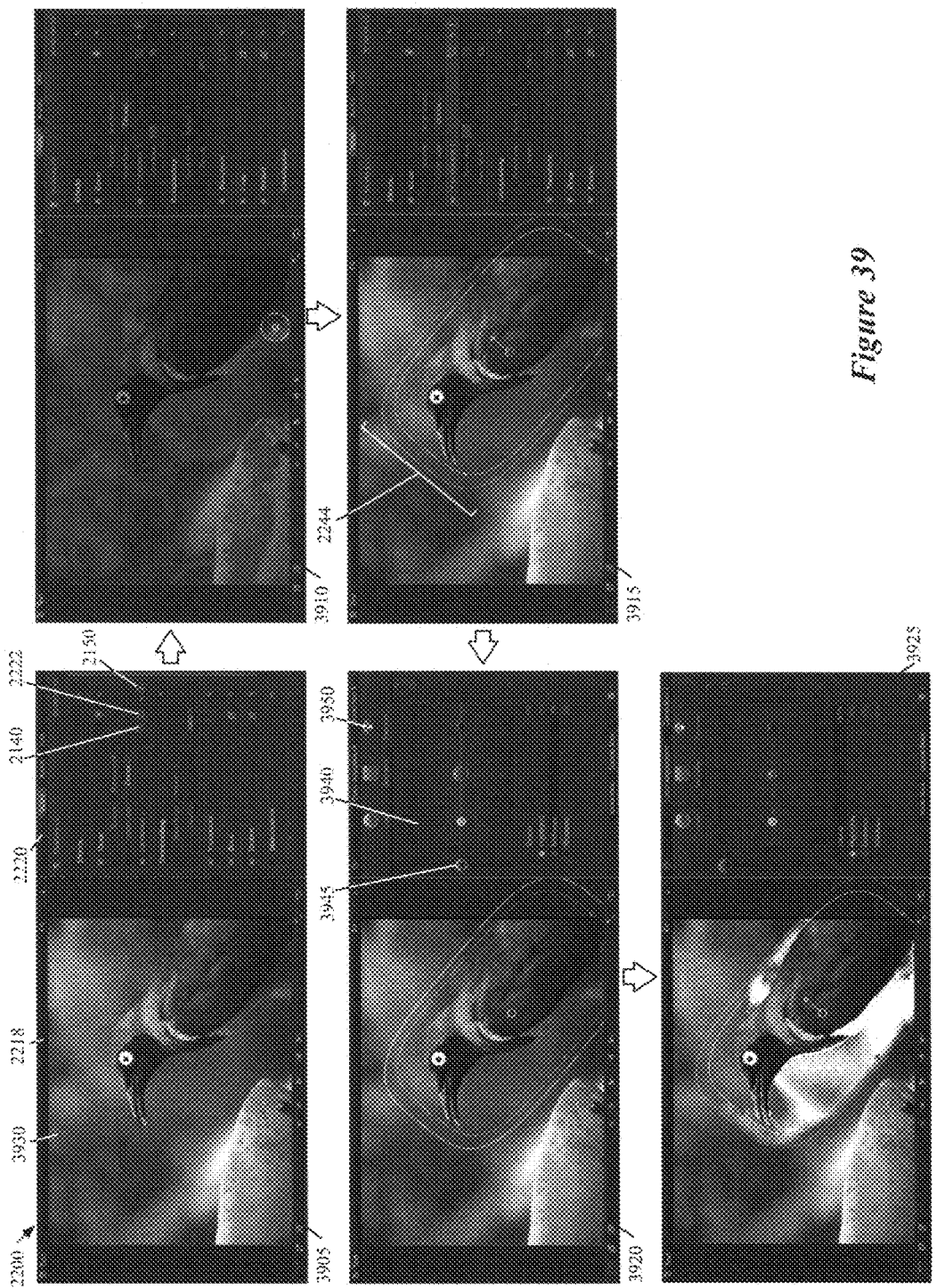
FIG. 39 conceptually illustrates a masking tool of some embodiments that includes a color masking tool and a shape masking tool.

FIG. 39 conceptually illustrates a masking tool of some embodiments that includes a color masking tool and a shape masking tool. Specifically, FIG. 39 conceptually illustrates the GUI 2200 at five different stages 3905-3925 of a masking operation that utilizes a color mask and a shape mask to identify a portion of an image 3930.

The first stage 3905 illustrates the GUI 2200, which includes the image display area 2218 and the adjustments panel 2220. As shown, the image display area 2218 is displaying the image 3930 of a bird and a piece of fruit next to the bird. In this example, the user wants to apply a color correction operation to only the feathers of the bird's belly, which is the same or similar color as the color of the fruit.

In the second stage 3910, the user has activated the masking tool's color masking tool by selecting the user-selectable UI item 2140 (e.g., by performing a cursor operation such as clicking a mouse button, tapping a touchpad, or touching a touchscreen). In addition, the user has selected a portion of the feathers of the bird's belly in order to create a color mask. Since the color of the fruit is the same or similar to the color of the feathers of the bird's belly, the color mask includes the fruit as well as the feathers of the bird's belly.

The third stage 3915 of the GUI 2200 illustrates that the user has invoked the masking tool's shape masking tool by selecting the UI item 2222 using a cursor (e.g., by performing a cursor operation such as clicking a mouse button, tapping a touchpad, or touching a touchscreen). Additionally, the third stage 3915 shows that the user has manipulated the shape mask 2244 through a series of operations (e.g., the operations described above by reference to FIGS. 22-31) to fit the shape mask around the bird, thereby isolating the colors of the color mask to only the portion of the image encompassed by the shape mask.

The fourth stage 3920 illustrates that the user has activated the color board tool of some embodiments by selecting the user-selectable UI item 2150 (e.g., by performing a cursor operation such as clicking a mouse button, tapping a touchpad, or touching a touchscreen). As shown in the fourth stage 3920, the adjustments panel 2220 displays a color board 3940. In some embodiments, when the media-editing application receives the selection of the UI item 2150, the media-editing application displays the color board 3940 in the adjustments panel 2220. In other embodiments, when the media-editing application receives the selection of the UI item 2150, the media-editing application displays the color board 2175 (not shown here) in the adjustments panel 2220. In some such embodiments, the user might have to select user-selectable tab 3950 in order to cause the media-editing application to transition from displaying the color board 2175 to displaying the color board 3940.

The color board 3940 includes several slider controls that can be movably positioned within the color board 3940 to adjust the exposure (e.g.; luminance, luma, brightness) of pixels in the image 3930. Different locations on the color board 3940 correspond to different levels of exposure. In this example, the middle of the color board 3940 represents no adjustment to the exposure of pixels in the image, positions above the middle of the color board 3940 represent increases to the exposure of pixels in the image, and positions below the middle of the color board 3940 represent decreases to the exposure of pixels in the image.

In the fifth stage 3925, the GUI 2200 shows that the user has moved the slider indicator of the slider control 3945 towards the upper portion of the slider control 3945 in order to increase the exposure of the pixels in the image. In some embodiments, the media-editing application increases the exposure of the pixels in the image when the media-editing application receives movement of the slider indicator of the slider control 3945. As shown in the fifth stage 3925, the color correction (the exposure adjustment in this example) is only applied to the colors included in the color mask that are inside the shape mask (the feathers of the bird's belly in this example), which is indicated by a highlighting of the feathers of the bird's belly.

The example illustrated in FIG. 39 describes creating and adjusting a color mask and a shape mask for a still image. As explained above, the masking tool can provide a shape mask for identifying a region in a frame (or field) of a video clip and define a color mask for the frame of the video clip, in some embodiments. In some of these embodiments, the masking tool defines a color mask for a particular frame of a video clip and identifies a region of the particular frame of the video clip. The masking tool associates the color mask and the identified region with the rest of the frames in the video clip. For instance, a user may create a color mask for a frame of a video clip, create a shape mask and adjust the shape mask to identify a region of a frame of a video clip, and invoke a color correction operation on the frame of the video clip. When the user invokes the color correction operation on the frame, the masking tool of some embodiments applies the color correction to the identified region of the frame using the color mask and automatically applies the color correction to the corresponding region of each of the other frames in the video clip using the color mask. In this manner, the user only has to create a color mask and a shape mask for one frame of a video clip (instead of creating a color mask and a shape mask for each frame of the video clip) in order to apply a color correction operation to a region of each frame of the entire video clip based on colors in the frames.

IV. Example Graphical User Interface

The figures described above illustrate different GUIs and portions of different GUIs that provide a color correction tool(s) of some embodiments. The following figure illustrates an example GUI of a media-editing application that may provide any number of the different color correction tools described above.

Figure 40:
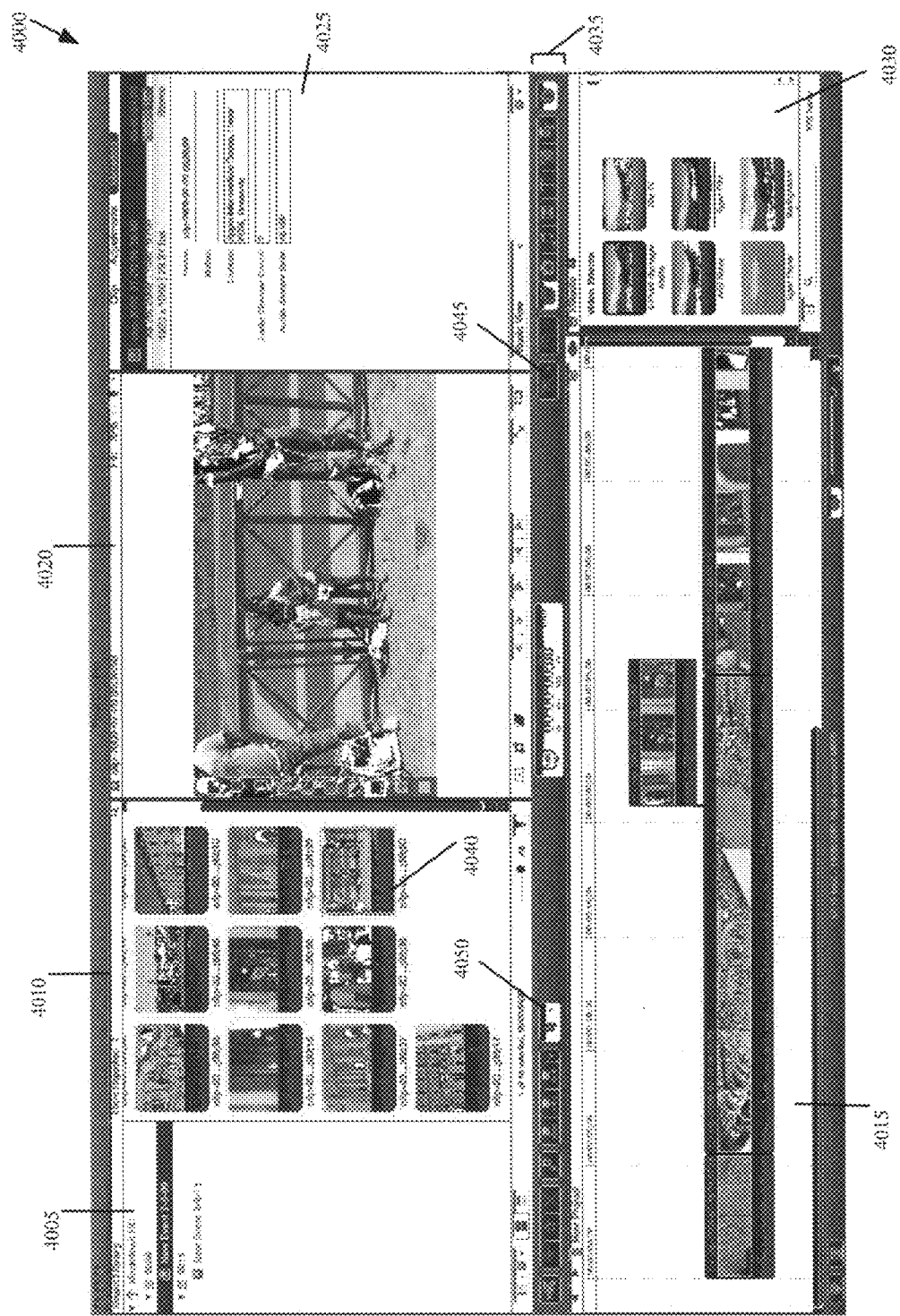
FIG. 40 illustrates a GUI of a media-editing application of some embodiments.

As shown, FIG. 40 illustrates a graphical user interface (GUI) 4000 of a media-editing application of some embodiments. One of ordinary skill in the art will recognize that the graphical user interface 4000 is only one of many possible GUIs for such a media-editing application. In fact, the GUI 4000 includes several display areas which may be adjusted in size, opened or closed, replaced with other display areas, etc. The GUI 4000 includes a clip library 4005, a clip browser 4010, a timeline 4015, a preview display area 4020, an inspector display area 4025, an additional media display area 4030, and a toolbar 4035.

The clip library 4005 includes a set of folders through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera). As shown, the clip library 4005 includes media clips from both years 2009 and 2011.

Within a storage device and/or date, users may group the media clips into "events", or organized folders of media clips. For instance, a user might give the events descriptive names that indicate what media is stored in the event (e.g., the "New Event Feb. 8, 2009" event shown in clip library 4005 might be renamed "European Vacation" as a descriptor of the content). In some embodiments, the media files corresponding to these clips are stored in a file storage structure that mirrors the folders shown in the clip library 4005.

Within the clip library 4005, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders for an event. These sub-folders may include media clips filtered based on tags (e.g., keyword tags). For instance, in the "New Event Feb. 8, 2009" event, all media clips showing children might be tagged by the user with a "kids" keyword, and then these particular media clips could be displayed in a sub-folder of the event that filters clips in this event to only display media clips tagged with the "kids" keyword.

The clip browser 4010 allows the user to view clips from a selected folder (e.g., an event, a sub-folder, etc.) of the clip library 4005. As shown in this example, the folder "New Event 2-8-11 3" is selected in the clip library 4005, and the clips belonging to that folder are displayed in the clip browser 4010. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. In addition, the user can command the application to play back the media file in the thumbnail filmstrip.

In addition, the thumbnails for the clips in the browser display an audio waveform underneath the clip that represents the audio of the media file. In some embodiments, as a user skims through or plays back the thumbnail filmstrip, the audio plays as well.

Many of the features of the clip browser are user-modifiable. For instance, in some embodiments, the user can modify one or more of the thumbnail size, the percentage of the thumbnail occupied by the audio waveform, whether audio plays back when the user skims through the media files, etc. In addition, some embodiments enable the user to view the clips in the clip browser in a list view. In this view, the clips are presented as a list (e.g., with clip name, duration, etc.). Some embodiments also display a selected clip from the list in a filmstrip view at the top of the browser so that the user can skim through or playback the selected clip.

The timeline 4015 provides a visual representation of a composite presentation (or project) being created by the user of the media-editing application. Specifically, it displays one or more geometric shapes that represent one or more media clips that are part of the composite presentation. The timeline 4015 of some embodiments includes a primary lane (also called a "spine", "primary compositing lane", or "central compositing lane") as well as one or more secondary lanes (also called "anchor lanes"). The spine represents a primary sequence of media clips which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

The user can add media clips from the clip browser 4010 into the timeline 4015 in order to add the clip to a presentation represented in the timeline. Within the timeline, the user can perform further edits to the media clips (e.g., move the clips around, split the clips, trim the clips, apply effects to the clips, etc.). The length (i.e., horizontal expanse) of a clip in the timeline is a function of the length of media represented by the clip. As the timeline is broken into increments of time, a media clip occupies a particular length of time in the timeline. As shown, in some embodiments the clips within the timeline are shown as a series of images. The number of images displayed for a clip varies depending on the length of the clip in the timeline, as well as the size of the clips (as the aspect ratio of each image will stay constant).

As with the clips in the clip browser, the user can skim through the timeline or play back the timeline (either a portion of the timeline or the entire timeline). In some embodiments, the playback (or skimming) is not shown in the timeline clips, but rather in the preview display area 4020.

The preview display area 4020 (also referred to as a "viewer") displays images from media files that the user is skimming through, playing back, or editing. These images may be from a composite presentation in the timeline 4015 or from a media clip in the clip browser 4010. In this example, the user has been skimming through the beginning of clip 4040, and therefore an image from the start of this media file is displayed in the preview display area 4020. As shown, some embodiments will display the images as large as possible within the display area while maintaining the aspect ratio of the image.

The inspector display area 4025 displays detailed properties about a selected item and allows a user to modify some or all of these properties. The selected item might be a clip, a composite presentation, an effect, etc. In this case, the clip that is shown in the preview display area 4020 is also selected, and thus the inspector displays information about media clip 4040. This information includes duration, file format, file location, frame rate, date created, audio information, etc. about the selected media clip. In some embodiments, different information is displayed depending on the type of item selected.

Some embodiments of the inspector display area 4025 also display various different tools for editing and modifying a selected item. For instance, some of these embodiments of the inspector display area 4025 display an adjustments panel (e.g., for activating color correction tools that are used for performing color correction operations) in the inspector display area 4025.

The additional media display area 4030 displays various types of additional media, such as video effects, transitions, still images, titles, audio effects, standard audio clips, etc. In some embodiments, the set of effects is represented by a set of selectable UI items, each selectable UI item representing a particular effect. In some embodiments, each selectable UI item also includes a thumbnail image with the particular effect applied. The display area 4030, in this example, is currently displaying a set of effects for the user to apply to a clip.

The toolbar 4035 includes various selectable items for editing, modifying what is displayed in one or more display areas, etc. The right side of the toolbar includes various selectable items for modifying what type of media is displayed in the additional media display area 4030. The illustrated toolbar 4035 includes items for video effects, visual transitions between media clips, photos, titles, generators and backgrounds, etc. In addition, the toolbar 4030 includes a user-selectable GUI item 4045 (e.g., an "Enhancements" button) for providing a pull-down menu that includes a user-selectable option (not shown) for invoking the display of an adjustments panel (e.g., the adjustments panel 2220 illustrated in FIG. 22) in the inspector display area 4025. As shown, the toolbar 4035 also includes user-selectable GUI item 4050 for providing a pull-down menu that includes user-selectable options (not shown) for invoking editing tools (e.g., trimming tools, blading tools, etc.).

The left side of the toolbar 4035 includes selectable items for media management and editing. Selectable items are provided for adding clips from the clip browser 4010 to the timeline 4015. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

One or ordinary skill in the art will also recognize that the set of display areas shown in the GUI 4000 is one of many possible configurations for the GUI of some embodiments. For instance, in some embodiments, the presence or absence of many of the display areas can be toggled through the GUI (e.g., the inspector display area 4025, additional media display area 4030, and clip library 4005). In addition, some embodiments allow the user to modify the size of the various display areas within the UI. For instance, when the additional media display area 4030 is removed, the timeline 4015 can increase in size to include that area. Similarly, the preview display area 4020 increases in size when the inspector display area 4025 is removed.

V. Software Architecture

Figure 41:
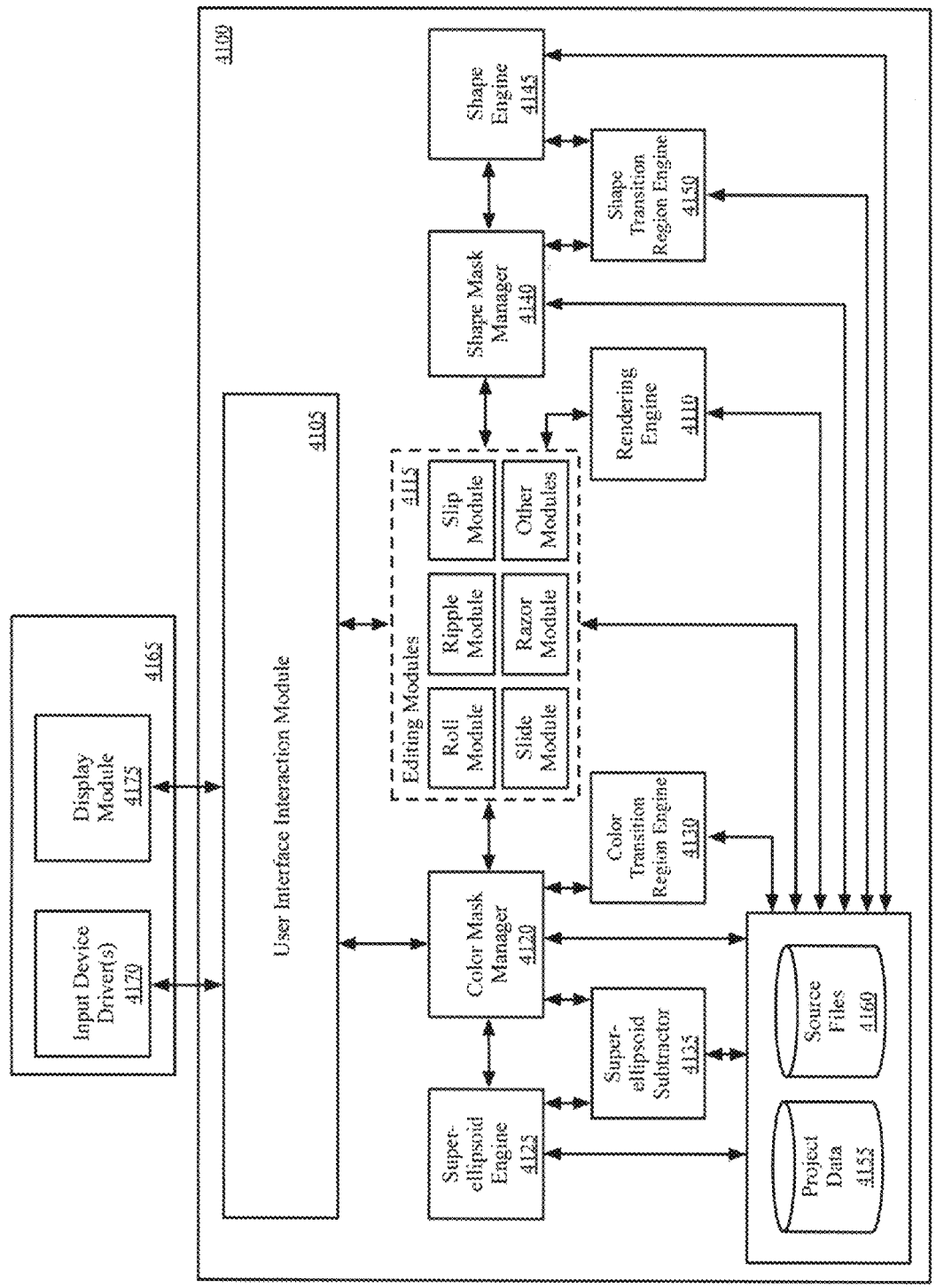
FIG. 41 conceptually illustrates a software architecture of a media-editing application of some embodiments.

In some embodiments, the processes described above are implemented as software running on a particular machine, such as a computer, a handheld device, or a tablet computing device, or stored in a machine readable medium. FIG. 41 conceptually illustrates a software architecture of a media-editing application 4100 of some embodiments. The media-editing application of some embodiments is a stand-alone application or is integrated into another application (e.g., a compositing application), while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided as a thick client. That is, the application is distributed from the server to the client machine and runs on the client machine.

As shown, the media-editing application 4100 includes a user interface (UI) interaction module 4105, a set of editing modules 4115, a color mask manager 4120, a superellipsoid engine 4125, a superellipsoid subtractor 4135, a color transition region engine 4130, a shape mask manager 4140, a shape engine 4145, a shape transition region engine 4150, and a rendering engine 4110. The media-editing application 4100 also includes project data 4155 and source files 4160. In some embodiments, the source files 4160 store the media content (e.g., text, audio, image, and video content) data of media clips. The project data 4155 stores data structures for composite presentations and media clips as well as color masks, superellipsoid shapes, color transition regions, shape masks, shape transition regions, etc. that include references to media content data stored as mov, avi, jpg, png, mp3, way, txt, etc. files in the source files 4160. In some embodiments, storages 4155 and 4160 are all stored in one physical storage. In other embodiments, the storages 4155 and 4160 are stored in separate storages. In some cases, for example, the source files 4160 may be stored across multiple hard drives, network drives, etc.

FIG. 41 also illustrates an operating system 4165 that includes input device driver(s) 4170 and display module 4175. In some embodiments, as illustrated, the input device drivers 4170 and display module 4175 are part of the operating system 4165 even when the media-editing application is an application separate from the operating system 4165.

The input device drivers 4170 may include drivers for translating signals from a keyboard, mouse, touchpad, drawing tablet, touch screen, etc. A user interacts with one or more of these input devices, which send signals to their corresponding device driver. The device driver then translates the signals into user input data that is provided to the UI interaction module 4105.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 4175 translates the output of a user interface for a display device. That is, the display module 4175 receives signals (e.g., from the UI interaction module 4105) describing what should be displayed and translates these signals into pixel information that is sent to the display device. The display device may be an LCD, a plasma screen, a CRT monitor, a touch screen, etc.

The UI interaction module 4105 of the media-editing application 4100 interprets the user input data received from the input device drivers 4170 and passes it to various modules, including the color mask manager 4120. The UI interaction module 4105 also manages the display of the UI and outputs this display information to the display module 4175. This UI display information may be based on information from the color mask manager 4120 or directly from input data (e.g., when a user moves an item in the UI that does not affect any of the other modules of the media-editing application 4100).

The color mask manager 4120 generates a color mask for an image (or a frame of a video clip) based on input that includes a selection of a portion of the image. The color mask manager 4120 may receive input from the UI interaction module 4105 (e.g., a set of pixels of the image) along with a request to create a color mask for the image. When the color mask manager 4120 receives such a request from the UI interaction module 4105, the color mask manager 4120 sends a request to the superellipsoid engine 4125 for a superellipsoid based on the input (e.g., the set of pixels of the image). When the color mask manager 4120 receives the superellipsoid from the superellipsoid engine 4125, the color mask manager 4120 identifies a portion of the image that is included in the color mask based on the superellipsoid.

In addition, the color mask manager 4120 manages the color mask for the image. For example, the color mask manager 4120 handles modifications (e.g., adding colors to the color mask or removing colors from the color mask) to the color mask. When the color mask manager 4120 receives from the UI interaction module 4105 input (e.g., a set of pixels of the image) and a request to add colors to the color mask, the color mask manager 4120 sends a request to the superellipsoid engine 4125 for a superellipsoid that includes colors of the existing color mask and colors to add to the existing color mask based on the input (e.g., the set of pixels of the image). When the color mask manager 4120 receives the superellipsoid from the superellipsoid engine 4125, the color mask manager 4120 identifies a portion of the image that is included in the color mask based on the superellipsoid. When the color mask manager 4120 receives from the UI interaction module 4105 input (e.g., a set of pixels of the image) and a request to remove colors from the color mask, the color mask manager 4120 sends a request to the superellipsoid subtractor 4135 for a superellipsoid that includes colors of the existing color mask and excludes the colors to be removed from the existing color mask based on the input (e.g., the set of pixels of the image). When the color mask manager 4120 receives the superellipsoid from the superellipsoid subtractor 4135, the color mask manager 4120 identifies a portion of the image that is included in the color mask based on the superellipsoid.

Furthermore, the color mask manager 4120 manages a transition region for a color mask. When the color mask manager 4120 receives input (e.g., a user moves a slider control to create or adjust a transition region) from the UI interaction module 4105 to create or adjust a transition region for the color mask, the color mask manager 4120 sends to the color transition region engine 4130 the color mask and the input to create or adjust a transition region for the color mask. When the color mask manager 4120 receives the transition region from the color transition region engine 4130, the color mask manager 4120 identifies a portion of the image that is included in the transition region of the color mask.

In addition, the color mask manager 4120 receives from the UI interaction module 4105 edits (e.g., color correction operations) to the image based on the color mask. In these cases, the color mask manager 4120 sends the color mask and the edits to the image to the appropriate editing module in the set of editing modules 4115 for applying the edit to the image based on the color mask. Also, the color mask manager 4120 may access the project data 4155 and/or the source files 4160 in order to perform some or all of the functions described above. For instance, the color mask manager 4120 might access the project data 4155 and/or the source files 4160 in order to identify a portion of the image that is included in the transition region of the color mask.

The superellipsoid engine 4125 generates a superellipsoid-based shape in a three-dimensional color space (e.g., a three-dimensional RGB color space) based on a set of colors (e.g., RGB component values of pixels in a selected portion of an image) in the three-dimensional color space. The superellipsoid engine 4125 may receive from the color mask manager 4120 a request for a superellipsoid and the set of colors. In some embodiments, the superellipsoid engine 4125 performs PCA on the set of colors in the three-dimensional colors space in order to generate the superellipsoid-based shape. The superellipsoid engine 4125 may, in some instances, access the project data 4155 and/or the source files 4160 in order to generate the superellipsoid-based shape.

The color transition region engine 4130 is responsible for handling a transition region for a color mask. For instance, the color transition region engine 4130 receives from the color mask manager 4120 input (e.g., a user moves a slider control to create or adjust a transition region) to generate a transition region. When the color transition region engine 4130 receives from the color mask manager 4120 such input, the color transition region engine 4130 translates the input to an offset amount. The color transition region engine 4130 sends a request to the superellipsoid engine 4125 for a scaled version of the superellipsoid defined for the color mask based on the offset amount. In some instances, the color transition region engine 4130 might access the project data 4155 and/or the source files 4160 in order to generate the transition region for the color mask.

The superellipsoid subtractor 4135 removes (i.e., subtracts) colors from a color mask. The superellipsoid subtractor 4135 of some embodiments removes colors form the color mask by generating a superellipsoid, which is defined for the color mask, that excludes the colors to be removed from the color mask. In some of these embodiments, the superellipsoid subtractor 4125 utilizes a collision detection technique (e.g., a triangle-triangle collision detection technique) to identify a bounding box in a three-dimensional color space that includes the colors originally in the color mask but excludes the colors to be removed from the color mask. The superellipsoid subtractor 4135 sends the identified bounding box to the superellipsoid engine 4125 for a superellipsoid based on the identified bounding box. In some embodiments, the superellipsoid subtractor 4135 accesses the project data 4155 and/or the source files 4160 in order to remove colors from a color mask.

The shape mask manager 4140 generates a shape mask for an image (or a frame of a video clip) based on input that includes a selection of a user-selectable UI item for creating (i.e., invoking) a shape mask. Some embodiments of the shape mask manager 4140 may receive from the UI interaction module 4105 input to create the shape mask. In some embodiments, when the shape mask manager 4140 receives from the UI interaction module 4105 input to create the shape mask, the shape mask manager 4140 generates a shape mask (e.g., by creating a data structure that defines the shape mask) and passes the shape mask to the UI interaction module 4105 for the display module 4175 to translate and send to a display device.

Further, the shape mask manager 4140 manages the shape mask for the image. For instance, the shape mask manager 4140 handles modifications (e.g., move, adjust dimensions, scale, rotate, adjust curvature) to the shape of the shape mask. When the shape mask manager 4140 receives from the UI interaction module 4105 input (e.g., a set of pixels of the image) to modify the shape of the shape mask, the shape mask manager 4140 sends to the shape engine 4145 the shape of the shape mask and a request to modify the shape of the shape mask. superellipsoid that includes colors of the existing color mask and colors to add to the existing color mask based on the input (e.g., the set of pixels of the image). When the color mask manager 4120 receives the superellipsoid from the superellipsoid engine 4125, the color mask manager 4120 identifies a portion of the image that is included in the color mask based on the superellipsoid. When the shape mask manager 4140 receives from the shape engine 4145 the modified shape of the shape mask, the shape mask manager 4140 passes the shape mask to the UI interaction module 4105 for the display module 4175 to translate and send to a display device.

In addition, the shape mask manager 4140 manages a transition region for a shape mask. When the shape mask manager 4140 receives input (e.g., when a user moves a user-adjustable shape mask control for adjusting the transition region) from the UI interaction module 4105 to adjust the transition region of the shape mask, the shape mask manager 4140 sends to the shape transition region engine 4150 the shape mask and a request to adjust the transition region for the shape mask. When the shape mask manager 4140 receives the shape mask from the shape transition region engine 4130, the color mask manager 4120 identifies a portion of the image that is included in the transition region of the shape mask.

The color mask manager 4120 also receives from the UI interaction module 4105 edits (e.g., color correction operations) to the image based on the shape mask. In these instances, the shape mask manager 4140 sends the shape mask and the edits to the image to the appropriate editing module in the set of editing modules 4115 for applying the edit to the image based on the shape mask. Additionally, the shape mask manager 4140 may access the project data 4155 and/or the source files 4160 in order to perform some or all of the functions described above. For example, the shape mask manager 4140 may access the project data 4155 and/or the source files 4160 in order to identify a portion of the image that is included in the transition region of the shape mask.

The shape engine 4145 performs modifications to the shape of a shape mask. The modification to the shape of the shape mask may include moving the shape of the shape mask, adjusting dimensions (e.g., x-dimension, y-dimension) of the shape of the shape mask, scaling the shape of the shape mask, rotating the shape of the shape mask, adjusting the curvature of the shape of the shape mask). When the shape engine 4145 receives from the shape mask manager 4140 a shape mask and a request to modify the shape of the shape mask, the shape engine 4145 performs the requested modification to the shape of the shape mask and sends the modified shape mask to the shape mask manager 4140.

The shape transition region engine 4150 handles the transition region for a shape mask. For example, the shape transition region engine 4150 receives from the shape mask manager 4150 input (e.g., a user moves a shape mask control to adjust the transition region of the shape mask) to adjust the transition region of the shape mask. When the shape transition region engine 4150 receives from the shape mask manager 4140 such input, the shape transition region engine 4150 sends a request to the shape engine 4145 for a scaled version of the shape of the shape mask based on the input. In some cases, the shape transition region engine 4150 may access the project data 4155 and/or the source files 4160 in order to adjust the transition region for the shape mask.

The set of editing modules 4115 receives the various editing commands (e.g., through editing tools in the UI) for editing media clips. As shown, the set of editing modules 4115 includes a roll module for rolling edit points of media clips, a ripple module for rippling edit points of media clips, a slip module for slipping in and out points of media clips, a slide module for sliding media clips that are in a sequence, a razor module for cutting (i.e., splitting) media clips, along with other editing modules. Based on edits to media clips, the set of editing modules 4115 creates and modifies the project data 4155 describing the affected media clips.

The rendering engine 4110 enables the storage or output of a composite media presentation from the media-editing application 4100. The rendering engine 4110 receives data from the editing modules 4115 and/or storages 4155 and 4160 and, in some embodiments, creates a composite media presentation from the source files 4160. The composite media presentation can be stored in one of the illustrated storages or a different storage.

While many of the features have been described as being performed by one module (e.g., the superellipsoid engine 4125 or the color transition region engine 4130), one of ordinary skill in the art would recognize that the functions might be split up into multiple modules. Similarly, the functions described as being performed by multiple different modules might be performed by a single module in some embodiments (e.g., the superellipsoid subtractor 4135 might be part of the superellipsoid engine 4125).

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 42:
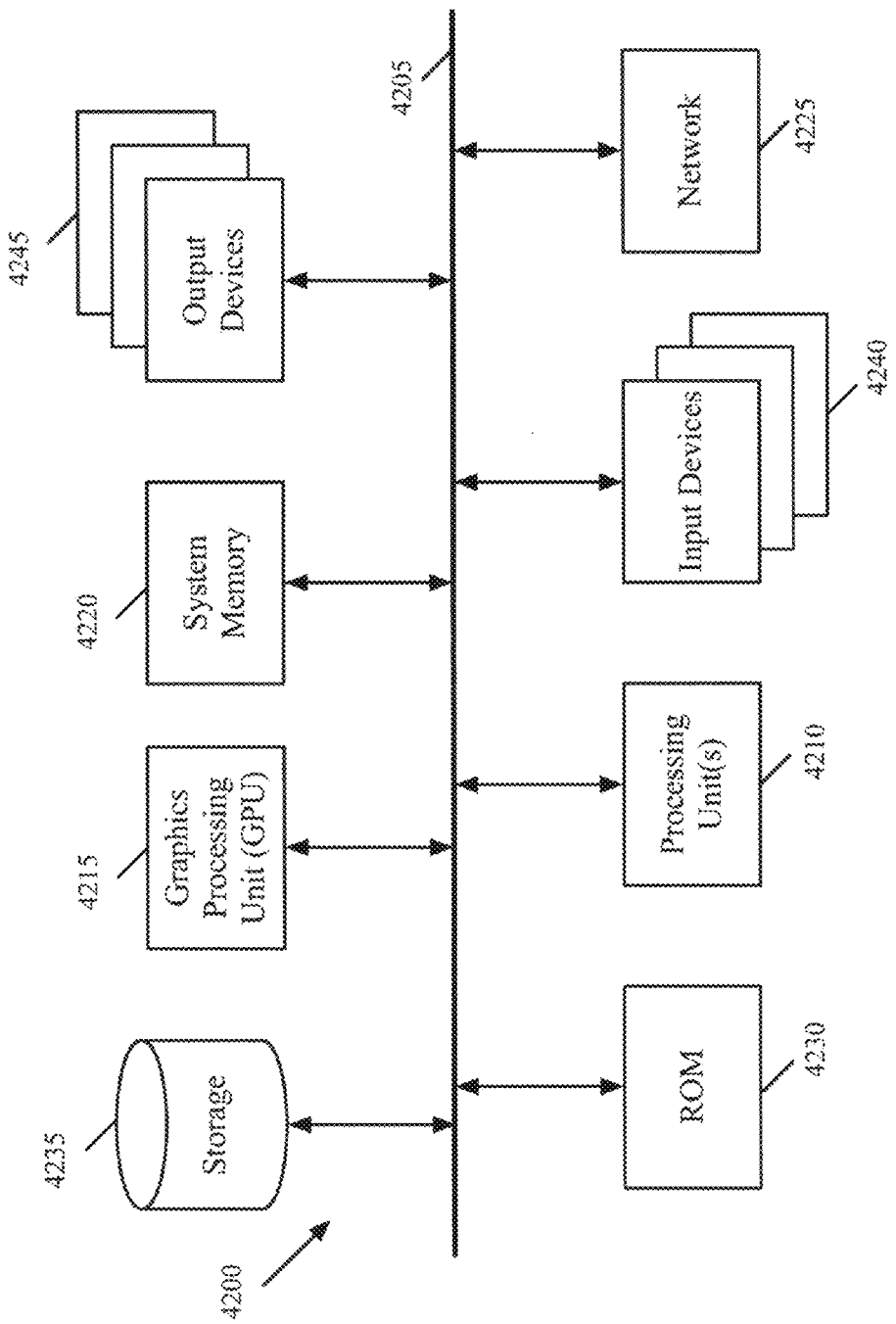
FIG. 42 conceptually illustrates an electronic system with which some embodiments of the invention are implemented.

FIG. 42 conceptually illustrates an electronic system 4200 with which some embodiments of the invention are implemented. The electronic system 4200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 4200 includes a bus 4205, processing unit(s) 4210, a graphics processing unit (GPU) 4215, a system memory 4220, a network 4225, a read-only memory 4230, a permanent storage device 4235, input devices 4240, and output devices 4245.

The bus 4205 collectively represents all system, peripheral, and chipset buses that communicatively connect the numerous internal devices of the electronic system 4200. For instance, the bus 4205 communicatively connects the processing unit(s) 4210 with the read-only memory 4230, the GPU 4215, the system memory 4220, and the permanent storage device 4235.

From these various memory units, the processing unit(s) 4210 retrieves instructions to execute and data to process in order to execute the processes of the invention. The processing unit(s) may be a single processor or a multi-core processor in different embodiments. Some instructions are passed to and executed by the GPU 4215. The GPU 4215 can offload various computations or complement the image processing provided by the processing unit(s) 4210. In some embodiments, such functionality can be provided using CoreImage's kernel shading language.

The read-only-memory (ROM) 4230 stores static data and instructions that are needed by the processing unit(s) 4210 and other modules of the electronic system. The permanent storage device 4235, on the other hand, is a read-and-write memory device. This device is a non-volatile memory unit that stores instructions and data even when the electronic system 4200 is off. Some embodiments of the invention use a mass-storage device (such as a magnetic or optical disk and its corresponding disk drive) as the permanent storage device 4235.

Other embodiments use a removable storage device (such as a floppy disk, flash memory device, etc., and its corresponding disk drive) as the permanent storage device. Like the permanent storage device 4235, the system memory 4220 is a read-and-write memory device. However, unlike storage device 4235, the system memory 4220 is a volatile read-and-write memory, such a random access memory. The system memory 4220 stores some of the instructions and data that the processor needs at runtime. In some embodiments, the invention's processes are stored in the system memory 4220, the permanent storage device 4235, and/or the read-only memory 4230. For example, the various memory units include instructions for processing multimedia clips in accordance with some embodiments. From these various memory units, the processing unit(s) 4210 retrieves instructions to execute and data to process in order to execute the processes of some embodiments.

The bus 4205 also connects to the input and output devices 4240 and 4245. The input devices 4240 enable the user to communicate information and select commands to the electronic system. The input devices 4240 include alphanumeric keyboards and pointing devices (also called "cursor control devices"), cameras (e.g., webcams), microphones or similar devices for receiving voice commands, etc. The output devices 4245 display images generated by the electronic system or otherwise output data. The output devices 4245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 42, bus 4205 also couples electronic system 4200 to a network 4225 through a network adapter (not shown). In this manner, the computer can be a part of a network of computers (such as a local area network ("LAN"), a wide area network ("WAN"), or an Intranet, or a network of networks, such as the Internet. Any or all components of electronic system 4200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 7, 11, 12, 16, and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine-readable medium storing a program which when executed by at least one processing unit provides a graphical user interface (GUI), the GUI comprising:
- a display area for displaying an image comprising a plurality of pixels;
- a selectable masking tool for displaying in the display area an adjustable closed curve to identify a region in the image to apply a color correction operation, the selectable masking tool comprising a selectable control for modifying the adjustable closed curve through a range of elliptical shapes that ranges from a pure ellipse to an approximate rectangle; and
- a selectable GUI item for applying the color correction operation based on the selectable masking tool.

2. The non-transitory machine-readable medium of claim 1, wherein the approximate rectangle is perceived as a rectangle with right angle corners.

3. The non-transitory machine-readable medium of claim 1, wherein the selectable GUI item is a first selectable GUI item, wherein the GUI further comprises a second selectable GUI item that, when selected, displays the adjustable closed curve in the display area.

4. The non-transitory machine-readable medium of claim 1, wherein the adjustable closed curve is a first adjustable closed curve, wherein the region is a first region, wherein the selectable control is a first selectable control, wherein the selectable masking tool is further for displaying in the display area a second adjustable closed curve to identify a second region in the image, the selectable masking tool comprising a second selectable control for modifying the second adjustable closed curve through a range of elliptical shapes that ranges from a pure ellipse to an approximate rectangle.

5. The non-transitory machine-readable medium of claim 1, wherein the identified region in the image is inside the closed curve.

6. The non-transitory machine-readable medium of claim 1, wherein the identified region in the image is outside the closed curve.

7. The non-transitory machine-readable medium of claim 6, wherein the region is a first region, wherein the adjustable closed curve is further to adjustably identify a second region in the image that is outside the adjustable closed curve.

8. The non-transitory machine-readable medium of claim 7, wherein the selectable GUI item is a first selectable GUI item, wherein the GUI further comprises a second selectable GUI item for switching the adjustable closed curve between identifying the first region in the image inside of the closed curve and identifying the second region in the image outside of the closed curve.

9. The non-transitory machine-readable medium of claim 8, wherein the color correction operation is a first color correction operation, wherein the GUI further comprises a third selectable GUI item for applying a second color correction operation to the second region in the image.

10. The non-transitory machine-readable medium of claim 1, wherein the color correction operation is a chrominance operation.

11. The non-transitory machine-readable medium of claim 1, wherein the color correction operation is an exposure operation.

12. The non-transitory machine-readable medium of claim 1, wherein the color correction operation is a saturation operation.

13. A method of providing a graphical user interface (GUI), the method comprising:
- providing a display area for displaying an image comprising a plurality of pixels;
- providing a masking tool for displaying in the display area an adjustable mask comprising a closed curve for identifying a set of pixels in the image;
- providing a first selectable GUI item for selecting a value from a range of values to cause the closed curve to take on a range of shapes from an approximate rectangle to an elliptical shape; and
- providing a second selectable GUI item for applying a color correction operation to the identified set of pixels in the image.

14. The method of claim 13, wherein the approximate rectangle is a rectangle with rounded corners.

15. The method of claim 13, wherein the approximate rectangle is an exact rectangle.

16. The method of claim 13, wherein a first value in the range of values is for adjusting the closed curve of the adjustable mask to the approximate rectangle and a second value in the range of values is for adjusting the closed curve of the adjustable mask to the elliptical shape.

17. The method of claim 16, wherein the values in the range of values between the first and second values are for adjusting the closed curve from the approximate rectangle to the elliptical shape.

18. The method of claim 13 further comprising providing a third selectable GUI item for moving a position of the closed curve within the display area.

19. The method of claim 13 further comprising providing a third selectable GUI item for rotating the closed curve with respect to the image displayed in the display area.

20. The method of claim 13 further comprising providing a third selectable GUI item for adjusting the closed curve along a dimension of the closed curve.

21. The method of claim 20, wherein the dimension is a first dimension, the method further comprising providing a fourth selectable GUI item for adjusting the closed curve along a second dimension of the closed curve.

22. The method of claim 21, wherein the first dimension and the second dimension are perpendicular to each other.

23. The method of claim 13 further comprising providing a third selectable GUI item for scaling the closed curve.

24. A non-transitory machine-readable medium storing a program which when executed by at least one processing unit provides a graphical user interface (GUI), the GUI comprising:
- a display area for displaying an image comprising a plurality of pixels;
- a masking tool for displaying in the display area an elliptical shape for identifying a set of pixels in the image;
- a first selectable GUI item for adjusting a curvature of the elliptical shape;
- a second selectable GUI item for adjusting a diametrical parameter that adjusts the size of the elliptical shape; and
- a third selectable GUI item for applying a color correction operation to the set of pixels in the image.

25. The non-transitory machine-readable medium of claim 24, wherein the diametric parameter is a first diametric parameter, wherein the GUI further comprises a fourth selectable GUI item for adjusting a second diametrical parameter that adjusts the size of the elliptical shape.

26. The non-transitory machine-readable medium of claim 25, wherein the first and second diametrical parameters of the elliptical shape are first and second semi-diameters of the elliptical shape.

27. The non-transitory machine-readable medium of claim 24, wherein the elliptical shape is a first elliptical shape, wherein the set of pixels is a first set of pixels, wherein the masking tool is further for displaying in the display area a second elliptical shape to define a transition region about the first elliptical shape and to identify a second set of pixels in the image in the transition region.

28. The non-transitory machine-readable medium of claim 27, wherein the first selectable GUI item is further for adjusting a curvature of the second elliptical shape.

29. The non-transitory machine-readable medium of claim 27, wherein applying the color correction operation to the first set of pixels comprises fully applying the color correction operation to the identified first set of pixels in the image, wherein the third selectable GUI item is further for partially applying the color correction operation to the identified second set of pixels in the image.

30. The non-transitory machine-readable medium of claim 27, wherein the second elliptical shapes is displayed concentric to the first elliptical shape.

31. The non-transitory machine-readable medium of claim 27, wherein the second elliptical shape is a scaled version of the first elliptical shape, wherein the GUI further comprises a fourth selectable GUI item for scaling the second elliptical shape with respect to the first elliptical shape.

32. The non-transitory machine-readable medium of claim 27, wherein the first selectable GUI item adjusts the curvature of the elliptical shape by modifying the elliptical shape between an ellipse and an approximate rectangle.

33. A method of providing a graphical user interface (GUI), the method comprising:
  providing a display area for displaying an image comprising a plurality of pixels;
  providing a masking tool for displaying an adjustable mask in the display area, the adjustable mask comprising a superellipse shape for identifying a set of pixels in the image;
  providing a first selectable GUI item for adjusting a curvature of the superellipse shape;
  providing a second selectable GUI item for adjusting the size of the superellipse shape along an axis of the superellipse shape; and
  providing a third selectable GUI item for applying a color correction operation to the identified set of pixels in the image.

34. The method of claim 33, wherein the axis of the superellipse shape is a first axis, the method further comprising providing a fourth selectable GUI item for adjusting the size of the superellipse shape along a second axis of the superellipse shape.

35. The method of claim 34, wherein the first axis of the superellipse shape is orthogonal to the second axis of the superellipse shape.

36. The method of claim 33, wherein the first selectable GUI item adjusts the curvature of the superellipse shape by modifying the superellipse shape between an elliptical shape and a shape that approximates a rectangle with rounded corners.

* * * * *